(12) United States Patent
Lurie

(10) Patent No.: US 7,937,439 B2
(45) Date of Patent: May 3, 2011

(54) APPARATUS AND METHOD FOR SCHEDULING LIVE ADVICE COMMUNICATION WITH A SELECTED SERVICE PROVIDER

(75) Inventor: Steven Lurie, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 219 days.

(21) Appl. No.: 10/032,518

(22) Filed: Dec. 27, 2001

(65) Prior Publication Data

US 2003/0126205 A1  Jul. 3, 2003

(51) Int. Cl.
*G06F 15/16* (2006.01)

(52) U.S. Cl. ............. 709/204; 705/8; 705/9; 705/14.16; 705/347

(58) Field of Classification Search .......... 709/200, 709/201–205, 225–229; 705/8–9, 14.1–14.39, 705/34, 342–348; 715/706–709, 716–717, 715/751–760
See application file for complete search history.

(56) References Cited

U.S. PATENT DOCUMENTS

| | | | |
|---|---|---|---|
| 4,313,035 | A | 1/1982 | Jordan et al. |
| 4,577,065 | A | 3/1986 | Frey et al. |
| 4,631,428 | A | 12/1986 | Grimes |
| 4,645,873 | A | 2/1987 | Chomet |
| 4,677,434 | A | 6/1987 | Fascenda |
| 4,723,283 | A | 2/1988 | Nagasawa et al. |
| 4,741,025 | A | 4/1988 | Maruyama et al. |
| 4,751,669 | A | 6/1988 | Sturgis et al. |
| 4,752,675 | A | 6/1988 | Zetmeir |
| 4,796,293 | A | 1/1989 | Blinken et al. |
| 4,847,890 | A | 7/1989 | Solomon et al. |
| 4,878,239 | A | 10/1989 | Solomon et al. |
| 4,969,185 | A | 11/1990 | Dorst et al. |
| 5,017,917 | A | 5/1991 | Fisher et al. |
| 5,058,152 | A | 10/1991 | Solomon et al. |
| 5,099,510 | A | 3/1992 | Blinken, Jr. et al. |
| 5,148,474 | A | 9/1992 | Haralambopoulos et al. |
| 5,155,743 | A | 10/1992 | Jacobs |
| 5,155,761 | A | 10/1992 | Hammond |

(Continued)

FOREIGN PATENT DOCUMENTS

AU   699785   5/1995

(Continued)

OTHER PUBLICATIONS

The Voice of Technology, Credit World, pp. 20-23, Jul. 1994.

(Continued)

*Primary Examiner* — Greg Bengzon
(74) *Attorney, Agent, or Firm* — Greenberg Traurig, LLP

(57) ABSTRACT

An apparatus and method for scheduling live advice communication with a selected service provider are described. The method includes receiving, from a service seeker, an appointment request for live advice from a selected service provider during a specified appointment time. Once the appointment is received, the appointment is provided to the selected service provider. The appointment is provided either via electronic mail or via an alert provided via a display screen, which is browsed by the service provider. Once received by the service provider, the service provider has the option to either accept or decline the appointment request. Consequently, once the appointment request is accepted, the service provider system schedules a live advice communications appointment between the service seeker and the selected service provider. Finally, the service provider system will connect the selected service provider with the service seeker for a live advice communication at the scheduled appointment time.

13 Claims, 39 Drawing Sheets

U.S. PATENT DOCUMENTS

| | | | |
|---|---|---|---|
| 5,182,769 A | 1/1993 | Yamaguchi et al. | |
| 5,206,903 A | 4/1993 | Kohler et al. | |
| 5,319,542 A | 6/1994 | King, Jr. et al. | |
| 5,325,424 A | 6/1994 | Grube | |
| 5,347,632 A | 9/1994 | Filepp et al. | |
| 5,359,508 A | 10/1994 | Rossides | |
| 5,361,295 A | 11/1994 | Solomon et al. | |
| 5,369,694 A | 11/1994 | Bales et al. | |
| 5,373,549 A | 12/1994 | Bales et al. | |
| 5,436,957 A | 7/1995 | McConnell | |
| 5,448,625 A | 9/1995 | Lederman | |
| 5,453,352 A | 9/1995 | Tachibana | |
| 5,459,779 A | 10/1995 | Backaus et al. | |
| 5,469,497 A | 11/1995 | Pierce et al. | |
| 5,483,352 A | 1/1996 | Fukuyama et al. | |
| 5,483,588 A | 1/1996 | Eaton et al. | |
| 5,497,502 A | 3/1996 | Castille | |
| 5,524,146 A | 6/1996 | Morrisey et al. | |
| 5,537,314 A | 7/1996 | Kanter | |
| 5,539,735 A | 7/1996 | Moskowitz | |
| 5,539,813 A | 7/1996 | Jonsson | |
| 5,544,237 A | 8/1996 | Bales et al. | |
| 5,555,298 A | 9/1996 | Jonsson | |
| 5,557,677 A | 9/1996 | Prytz | |
| 5,559,875 A | 9/1996 | Bieselin et al. | |
| 5,574,780 A | 11/1996 | Andruska et al. | |
| 5,574,781 A | 11/1996 | Blaze | |
| 5,589,892 A | 12/1996 | Knee et al. | |
| 5,590,197 A | 12/1996 | Chen et al. | |
| 5,596,634 A | 1/1997 | Fernandez et al. | |
| 5,602,905 A | 2/1997 | Mettke | |
| 5,604,803 A | 2/1997 | Aziz | |
| 5,608,786 A | 3/1997 | Gordon | |
| 5,615,213 A | 3/1997 | Griefer | |
| 5,619,148 A | 4/1997 | Guo | |
| 5,619,555 A | 4/1997 | Fenton et al. | |
| 5,619,570 A | 4/1997 | Tsutsui | |
| 5,619,725 A | 4/1997 | Gordon | |
| 5,619,991 A | 4/1997 | Sloane | |
| 5,623,536 A | 4/1997 | Solomon et al. | |
| 5,634,012 A | 5/1997 | Stefik et al. | |
| 5,638,432 A | 6/1997 | Wille et al. | |
| 5,644,715 A | 7/1997 | Baugher | |
| 5,651,058 A | 7/1997 | Hackett-Jones et al. | |
| 5,668,953 A | 9/1997 | Sloo | |
| 5,675,734 A | 10/1997 | Hair | |
| 5,689,553 A | 11/1997 | Ahuja et al. | |
| 5,694,163 A | 12/1997 | Harrison | |
| 5,694,537 A | 12/1997 | Montenegro et al. | |
| 5,694,549 A | 12/1997 | Carlin et al. | |
| 5,701,419 A | 12/1997 | McConnell | |
| 5,710,887 A | 1/1998 | Chelliah et al. | |
| 5,712,979 A | 1/1998 | Graber et al. | |
| 5,715,314 A | 2/1998 | Payne et al. | |
| 5,717,860 A | 2/1998 | Graber et al. | |
| 5,718,247 A | 2/1998 | Frankel | |
| 5,721,763 A | 2/1998 | Joseph et al. | |
| 5,722,418 A | 3/1998 | Bro | |
| 5,724,424 A | 3/1998 | Gifford | |
| 5,734,961 A | 3/1998 | Castille | |
| 5,740,231 A | 4/1998 | Cohn et al. | |
| 5,740,549 A | 4/1998 | Reilly et al. | |
| 5,745,681 A | 4/1998 | Levine et al. | |
| 5,768,348 A | 6/1998 | Solomon et al. | |
| 5,768,521 A | 6/1998 | Dedrick | |
| 5,774,534 A | 6/1998 | Mayer | |
| 5,778,367 A | 7/1998 | Wesinger, Jr. et al. | |
| 5,781,894 A | 7/1998 | Petrecca et al. | |
| 5,794,210 A | 8/1998 | Goldhaber et al. | |
| 5,794,221 A | 8/1998 | Egendorf | |
| 5,802,502 A | 9/1998 | Gell et al. | |
| 5,809,119 A | 9/1998 | Tonomura et al. | |
| 5,809,145 A | 9/1998 | Slik et al. | |
| 5,812,769 A | 9/1998 | Graber et al. | |
| 5,818,836 A | 10/1998 | DuVal | |
| 5,819,092 A | 10/1998 | Ferguson et al. | |
| 5,819,267 A | 10/1998 | Uyama | |
| 5,819,271 A | 10/1998 | Mahoney et al. | |
| 5,819,285 A | 10/1998 | Damico et al. | |
| 5,825,869 A | 10/1998 | Brooks et al. | |
| 5,825,876 A | 10/1998 | Peterson, Jr. | |
| 5,832,523 A | 11/1998 | Kanai et al. | |
| 5,835,896 A | 11/1998 | Fisher et al. | |
| 5,841,763 A | 11/1998 | Leondires et al. | |
| 5,842,212 A | 11/1998 | Ballurio et al. | |
| 5,850,433 A | 12/1998 | Rondeau | |
| 5,860,068 A | 1/1999 | Cook | |
| 5,862,223 A | 1/1999 | Walker et al. | |
| 5,864,871 A | 1/1999 | Kitain et al. | |
| 5,870,744 A | 2/1999 | Sprague | |
| 5,878,130 A | 3/1999 | Andrews et al. | |
| 5,884,032 A | 3/1999 | Bateman et al. | |
| 5,884,272 A | 3/1999 | Walker et al. | |
| 5,884,282 A | 3/1999 | Robinson | |
| 5,889,774 A | 3/1999 | Mirashrafi et al. | |
| 5,890,138 A | 3/1999 | Godin et al. | |
| 5,893,077 A | 4/1999 | Griffin | |
| 5,901,214 A | 5/1999 | Shaffer et al. | |
| 5,903,635 A | 5/1999 | Kaplan | |
| 5,903,877 A * | 5/1999 | Berkowitz et al. | 705/26 |
| 5,907,677 A | 5/1999 | Glenn et al. | |
| 5,911,132 A | 6/1999 | Sloane | |
| 5,914,951 A | 6/1999 | Bentley et al. | |
| 5,915,214 A | 6/1999 | Reece et al. | |
| 5,924,082 A | 7/1999 | Silverman et al. | |
| 5,937,390 A | 8/1999 | Hyodo | |
| 5,940,471 A | 8/1999 | Homayoun | |
| 5,940,484 A | 8/1999 | DeFazio et al. | |
| 5,943,422 A | 8/1999 | Van Wie et al. | |
| 5,946,646 A | 8/1999 | Schena et al. | |
| 5,948,054 A | 9/1999 | Nielsen | |
| 5,960,406 A * | 9/1999 | Rasansky et al. | 705/9 |
| 5,960,416 A | 9/1999 | Block | |
| 5,970,466 A * | 10/1999 | Detjen et al. | 705/8 |
| 5,974,141 A | 10/1999 | Saito | |
| 5,974,398 A | 10/1999 | Hanson et al. | |
| 5,982,863 A | 11/1999 | Smiley et al. | |
| 5,987,102 A | 11/1999 | Elliott et al. | |
| 5,987,118 A | 11/1999 | Dickerman et al. | |
| 5,987,430 A | 11/1999 | Van Horne et al. | |
| 5,991,394 A | 11/1999 | Dezonno et al. | |
| 5,999,609 A | 12/1999 | Nishimura | |
| 5,999,611 A | 12/1999 | Tatchell et al. | |
| 6,006,197 A | 12/1999 | d-Eon et al. | |
| 6,011,794 A | 1/2000 | Mordowitz et al. | |
| 6,014,439 A | 1/2000 | Walker et al. | |
| 6,014,644 A | 1/2000 | Erickson | |
| 6,016,478 A * | 1/2000 | Zhang et al. | 705/9 |
| 6,026,087 A | 2/2000 | Mirashrafi et al. | |
| 6,026,148 A | 2/2000 | Dworkin et al. | |
| 6,026,400 A | 2/2000 | Suzuki | |
| 6,028,601 A | 2/2000 | Machiraju et al. | |
| 6,029,141 A | 2/2000 | Bezos et al. | |
| 6,035,021 A | 3/2000 | Katz | |
| 6,035,278 A * | 3/2000 | Mansour | 705/9 |
| 6,046,762 A | 4/2000 | Sonesh et al. | |
| 6,055,513 A | 4/2000 | Katz et al. | |
| 6,058,379 A | 5/2000 | Odom et al. | |
| 6,064,978 A | 5/2000 | Gardener et al. | |
| 6,067,561 A | 5/2000 | Dillon | |
| 6,076,093 A * | 6/2000 | Pickering | 707/104.1 |
| 6,078,866 A | 6/2000 | Buck et al. | |
| 6,085,084 A | 7/2000 | Christmas | |
| 6,130,933 A | 10/2000 | Miloslavsky | |
| 6,131,085 A | 10/2000 | Rossides | |
| 6,144,670 A | 11/2000 | Sponaugle et al. | |
| 6,167,379 A * | 12/2000 | Dean et al. | 705/9 |
| 6,167,449 A | 12/2000 | Arnold et al. | |
| 6,173,279 B1 | 1/2001 | Levin et al. | |
| 6,175,619 B1 | 1/2001 | DeSimone | |
| 6,185,194 B1 | 2/2001 | Musk et al. | |
| 6,185,289 B1 | 2/2001 | Hetz et al. | |
| 6,188,673 B1 | 2/2001 | Bauer et al. | |
| 6,188,761 B1 | 2/2001 | Dickerman et al. | |
| 6,192,050 B1 | 2/2001 | Stovall | |
| 6,199,096 B1 | 3/2001 | Mirashrafi et al. | |
| 6,212,192 B1 | 4/2001 | Mirashrafi et al. | |

| | | | | | | |
|---|---|---|---|---|---|---|
| 6,212,268 B1 | 4/2001 | Nielsen | | 6,910,159 B2 | 6/2005 | Phillips et al. |
| 6,216,111 B1 | 4/2001 | Walker et al. | | 6,917,610 B1* | 7/2005 | Kung et al. ............... 370/352 |
| 6,223,165 B1* | 4/2001 | Lauffer ............... 705/8 | | 6,968,174 B1 | 11/2005 | Trandal et al. |
| 6,230,287 B1 | 5/2001 | Pinard et al. | | 6,990,183 B2 | 1/2006 | Holland et al. |
| 6,233,566 B1 | 5/2001 | Levine et al. | | 6,999,478 B2 | 2/2006 | D'Angelo |
| 6,243,684 B1 | 6/2001 | Stuart et al. | | 7,031,697 B2 | 4/2006 | Yang et al. |
| 6,246,875 B1 | 6/2001 | Seazholtz et al. | | 7,032,030 B1 | 4/2006 | Condignotto |
| 6,248,946 B1 | 6/2001 | Dwek | | 7,039,681 B2* | 5/2006 | Nolte et al. ............... 709/207 |
| 6,259,774 B1 | 7/2001 | Miloslavsky | | 7,046,782 B2 | 5/2006 | Miller |
| 6,266,651 B1 | 7/2001 | Wooston | | 7,249,045 B2 | 7/2007 | Lauffer |
| 6,269,336 B1 | 7/2001 | Ladd et al. | | 7,383,303 B1* | 6/2008 | Bort ............... 709/206 |
| 6,269,361 B1 | 7/2001 | Davis et al. | | 7,388,950 B2* | 6/2008 | Elsey et al. ............... 379/201.02 |
| 6,282,515 B1 | 8/2001 | Speicher | | 7,412,049 B1 | 8/2008 | Koch |
| 6,292,799 B1 | 9/2001 | Peek et al. | | 7,434,169 B2 | 10/2008 | Quillen et al. |
| 6,298,056 B1 | 10/2001 | Pendse | | 2001/0012357 A1 | 8/2001 | Mirashrafi et al. |
| 6,301,342 B1 | 10/2001 | Ander et al. | | 2001/0018178 A1 | 8/2001 | Sieffert |
| 6,301,350 B1 | 10/2001 | Henningson et al. | | 2001/0025274 A1 | 9/2001 | Zehr et al. |
| 6,304,637 B1 | 10/2001 | Mirashrafi et al. | | 2001/0026609 A1 | 10/2001 | Weinstein et al. |
| 6,310,941 B1 | 10/2001 | Crutcher et al. | | 2001/0027481 A1* | 10/2001 | Whyel ............... 709/218 |
| 6,311,231 B1 | 10/2001 | Bateman et al. | | 2001/0029482 A1 | 10/2001 | Tealdi et al. |
| 6,314,402 B1 | 11/2001 | Monaco et al. | | 2001/0032247 A1 | 10/2001 | Kanaya |
| 6,314,454 B1 | 11/2001 | Wang et al. | | 2001/0036822 A1 | 11/2001 | Mead et al. |
| 6,323,894 B1 | 11/2001 | Katz | | 2001/0037283 A1 | 11/2001 | Mullaney |
| 6,353,663 B1 | 3/2002 | Stevens et al. | | 2001/0044751 A1* | 11/2001 | Pugliese et al. ............... 705/26 |
| 6,385,583 B1 | 5/2002 | Ladd et al. | | 2001/0048737 A1 | 12/2001 | Goldberg et al. |
| 6,389,278 B1 | 5/2002 | Singh | | 2002/0003867 A1 | 1/2002 | Rothschild et al. |
| 6,389,541 B1 | 5/2002 | Patterson | | 2002/0010608 A1* | 1/2002 | Faber et al. ............... 705/8 |
| 6,393,117 B1 | 5/2002 | Trell | | 2002/0010616 A1* | 1/2002 | Itzhaki ............... 705/9 |
| 6,393,412 B1 | 5/2002 | Deep | | 2002/0024948 A1 | 2/2002 | Pendse |
| 6,400,806 B1 | 6/2002 | Uppaluru | | 2002/0029241 A1 | 3/2002 | Yokono et al. |
| 6,404,864 B1 | 6/2002 | Evslin et al. | | 2002/0038233 A1* | 3/2002 | Shubov et al. ............... 705/8 |
| 6,404,877 B1 | 6/2002 | Bolduc et al. | | 2002/0038293 A1* | 3/2002 | Seiden ............... 705/80 |
| 6,404,884 B1 | 6/2002 | Marwell et al. | | 2002/0042826 A1 | 4/2002 | Gaus et al. |
| 6,424,952 B1* | 7/2002 | Yinbal ............... 705/36 R | | 2002/0059202 A1* | 5/2002 | Moczygemba ............... 705/3 |
| 6,430,276 B1 | 8/2002 | Bouvier et al. | | 2002/0065959 A1 | 5/2002 | Kim et al. |
| 6,434,527 B1 | 8/2002 | Horvitz | | 2002/0071423 A1 | 6/2002 | Mirashrafi et al. |
| 6,463,136 B1 | 10/2002 | Malik | | 2002/0071426 A1 | 6/2002 | Karamchedu et al. |
| 6,470,079 B1 | 10/2002 | Benson | | 2002/0072974 A1 | 6/2002 | Pugliese et al. |
| 6,470,317 B1 | 10/2002 | Ladd et al. | | 2002/0073207 A1* | 6/2002 | Widger et al. ............... 709/227 |
| 6,470,338 B1 | 10/2002 | Rizzo et al. | | 2002/0087565 A1 | 7/2002 | Hoekman et al. |
| 6,477,246 B1* | 11/2002 | Dolan et al. ............... 379/211.02 | | 2002/0091607 A1* | 7/2002 | Sloan et al. ............... 705/36 |
| 6,484,148 B1 | 11/2002 | Boyd | | 2002/0094074 A1 | 7/2002 | Lurie |
| 6,493,437 B1 | 12/2002 | Olshansky | | 2002/0095331 A1 | 7/2002 | Osmar et al. |
| 6,493,671 B1 | 12/2002 | Ladd et al. | | 2002/0095359 A1 | 7/2002 | Mangetsu |
| 6,493,673 B1 | 12/2002 | Ladd et al. | | 2002/0107697 A1 | 8/2002 | Jensen |
| 6,510,417 B1 | 1/2003 | Woods et al. | | 2002/0112005 A1 | 8/2002 | Namias |
| 6,513,013 B1 | 1/2003 | Stephanou | | 2002/0116266 A1 | 8/2002 | Marshall |
| 6,519,570 B1 | 2/2003 | Faber et al. | | 2002/0120554 A1 | 8/2002 | Vega |
| 6,523,010 B2 | 2/2003 | Lauffer | | 2002/0128891 A1 | 9/2002 | McSherry |
| 6,523,101 B1 | 2/2003 | Nakata | | 2002/0133402 A1 | 9/2002 | Faber et al. |
| 6,529,878 B2 | 3/2003 | De Rafael et al. | | 2002/0133570 A1 | 9/2002 | Jacob et al. |
| 6,535,506 B1 | 3/2003 | Narain et al. | | 2002/0133571 A1 | 9/2002 | Michel |
| 6,539,359 B1 | 3/2003 | Ladd et al. | | 2002/0137490 A1 | 9/2002 | Gallant |
| 6,542,732 B1 | 4/2003 | Khazaka et al. | | 2002/0169836 A1* | 11/2002 | Hood et al. ............... 709/206 |
| 6,546,372 B2 | 4/2003 | Lauffer | | 2002/0191762 A1 | 12/2002 | Benson |
| 6,549,889 B2 | 4/2003 | Lauffer | | 2002/0193094 A1 | 12/2002 | Lawless et al. |
| 6,560,576 B1 | 5/2003 | Cohen et al. | | 2002/0193135 A1 | 12/2002 | Nakano |
| 6,563,915 B1 | 5/2003 | Salimando | | 2003/0005126 A1* | 1/2003 | Schwartz et al. ............... 709/227 |
| 6,606,376 B1 | 8/2003 | Trell | | 2003/0014295 A1* | 1/2003 | Brookes et al. ............... 705/9 |
| 6,609,106 B1* | 8/2003 | Robertson ............... 705/26 | | 2003/0041255 A1 | 2/2003 | Chen et al. |
| 6,611,501 B1 | 8/2003 | Owen et al. | | 2003/0043981 A1 | 3/2003 | Lurie et al. |
| 6,625,595 B1 | 9/2003 | Anderson et al. | | 2003/0046161 A1 | 3/2003 | Kamangar et al. |
| 6,636,590 B1 | 10/2003 | Jacob et al. | | 2003/0061094 A1* | 3/2003 | Banerjee et al. ............... 705/14 |
| 6,658,389 B1 | 12/2003 | Alpdemir | | 2003/0112944 A1 | 6/2003 | Brown et al. |
| 6,668,286 B2 | 12/2003 | Bateman et al. | | 2003/0115089 A1 | 6/2003 | Lurie |
| 6,704,403 B2 | 3/2004 | Lurie et al. | | 2003/0195838 A1* | 10/2003 | Henley ............... 705/37 |
| 6,731,625 B1 | 5/2004 | Eastep et al. | | 2003/0220866 A1 | 11/2003 | Pisaris-Henderson et al. |
| 6,732,183 B1 | 5/2004 | Graham | | 2003/0223565 A1 | 12/2003 | Montemer |
| 6,741,691 B1 | 5/2004 | Ritter et al. | | 2003/0225682 A1 | 12/2003 | Montemer |
| 6,757,364 B2 | 6/2004 | Newkirk | | 2004/0006511 A1 | 1/2004 | Montemer |
| 6,771,760 B1 | 8/2004 | Vortman et al. | | 2004/0010518 A1 | 1/2004 | Montemer |
| 6,775,359 B1 | 8/2004 | Ron et al. | | 2004/0023644 A1 | 2/2004 | Montemer |
| 6,798,753 B1* | 9/2004 | Doganata et al. ............... 370/260 | | 2004/0038673 A1 | 2/2004 | Dunn et al. |
| 6,801,899 B2 | 10/2004 | Lauffer | | 2004/0054741 A1 | 3/2004 | Weatherby et al. |
| 6,807,532 B1 | 10/2004 | Kolls | | 2004/0066927 A1 | 4/2004 | Horvath et al. |
| 6,832,321 B1 | 12/2004 | Barrett | | 2004/0083133 A1 | 4/2004 | Nicholas et al. |
| 6,836,225 B2 | 12/2004 | Lee et al. | | 2004/0096110 A1 | 5/2004 | Yogeshwar et al. |
| 6,865,540 B1 | 3/2005 | Faber et al. | | 2004/0162757 A1 | 8/2004 | Pisaris-Henderson |
| 6,898,435 B2 | 5/2005 | Milman | | 2004/0204997 A1 | 10/2004 | Blaser et al. |

| | | | |
|---|---|---|---|
| 2004/0234049 | A1 | 11/2004 | Melideo |
| 2004/0234064 | A1 | 11/2004 | Melideo |
| 2004/0236441 | A1 | 11/2004 | Melideo |
| 2004/0252820 | A1 | 12/2004 | Faber et al. |
| 2004/0254859 | A1 | 12/2004 | Aslanian, Jr. |
| 2004/0258048 | A1 | 12/2004 | Melideo |
| 2004/0260413 | A1 | 12/2004 | Melideo |
| 2005/0010795 | A1 | 1/2005 | Tagawa et al. |
| 2005/0021744 | A1 | 1/2005 | Haitsuka et al. |
| 2005/0044238 | A1 | 2/2005 | Jacob et al. |
| 2005/0048961 | A1 | 3/2005 | Ribaudo et al. |
| 2005/0065811 | A1 | 3/2005 | Chu et al. |
| 2005/0071509 | A1 | 3/2005 | Faber et al. |
| 2005/0080878 | A1 | 4/2005 | Cunningham et al. |
| 2005/0086104 | A1 | 4/2005 | McFadden |
| 2005/0119957 | A1 | 6/2005 | Faber et al. |
| 2005/0165666 | A1 | 7/2005 | Wong et al. |
| 2005/0203799 | A1 | 9/2005 | Faber et al. |
| 2005/0209874 | A1 | 9/2005 | Rossini |
| 2005/0216341 | A1 | 9/2005 | Altberg et al. |
| 2005/0216345 | A1 | 9/2005 | Altberg et al. |
| 2005/0220289 | A1 | 10/2005 | Reding |
| 2005/0222908 | A1 | 10/2005 | Altberg et al. |
| 2005/0251445 | A1 | 11/2005 | Wong et al. |
| 2006/0031516 | A1 | 2/2006 | Kumer |
| 2006/0075104 | A1 | 4/2006 | Kumer |
| 2006/0095343 | A1 | 5/2006 | Clark et al. |
| 2006/0184378 | A1 | 8/2006 | Agarwal et al. |
| 2006/0215826 | A1 | 9/2006 | Lurie et al. |
| 2007/0067391 | A1* | 3/2007 | Masciantonio et al. ...... 709/204 |
| 2008/0212756 | A1 | 9/2008 | Faber et al. |
| 2009/0006174 | A1 | 1/2009 | Lauffer |
| 2010/0208028 | A1 | 8/2010 | Lauffer |

FOREIGN PATENT DOCUMENTS

| | | |
|---|---|---|
| EP | 04253389.3 | 9/2004 |
| EP | 1489529 | 12/2004 |
| GB | 2329046 A | 10/1999 |
| JP | 409233441 A | 9/1997 |
| JP | 409319812 A | 12/1997 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | 0057326 | 9/2000 |
| WO | WO 00/73960 | 12/2000 |
| WO | WO 01/01217 | 1/2001 |
| WO | 0120518 | 3/2001 |
| WO | 0127825 | 4/2001 |
| WO | WO 01/28141 | 4/2001 |
| WO | WO 01/44973 | 6/2001 |
| WO | 0184415 | 11/2001 |
| WO | 0213110 | 2/2002 |
| WO | 0237470 | 5/2002 |
| WO | WO 02/44870 | 6/2002 |
| WO | PCT/US01/51181 | 3/2003 |

OTHER PUBLICATIONS

Telecommunications Buyers Guide and Directory, Editor & Publisher, pp. 29TC-38TC, Feb. 1994.
Aspect Telecomm: Aspect Integrates the Web into the Call Center, M2 Presswire, Aug. 1996.
Information, Bid and Asked, Forbes, Aug. 20, 1990, 92.
Attachmate Ready to Answer 'Net questions, Network World, Apr. 8, 1996, 37.
US Courts to Launch First Federal 900 Service, Federal Computer Week, Sep. 28, 1992, 8.
Company Devoted to Hot-Line Support, Computer Reseller News, Oct. 21, 1991, 48.
For Telesphere's Clients, Dial '1-900 TUF LUCK',Business Week, Sep. 9, 1991, 88.
When Business Plan and real World Clash, Wall Street Journal, Jun. 9, 1999, B1.
Hidden Cost of Tech Support, PC World, May 1995, 143.
NetBazaar: Networked Electronic Markets for Trading Computation and Information Services, ECDL 1998—Research and Advanced Technology for Digital Libraries, 839.
Multimedia Collaborative Remote Consultation Tools via Gigabit WAN in Teleradiology, IEEE 1994 Phoenix, 417.
Multimedia Communication in a Medical Environment, IEEE 1991 Singapore I.C. on Networks, 166.
A New Teleconsultation Terminal System Using ISDN, NTT Review, Jul. 1991, 37.
MiniPay: Charging Per Click on the Web, CNISDN, 1997 v29, 939.
Caring for Customers: Real-time text chat and telephony provide personalized customer support and turn queries into sales leads, Internet World Media, Sep. 1999.
Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.
Masahiko Hase, Shuji Kawakubo and Mineo Shoman, "Advanced Videophone System Using Synchronized Video Filing Equipment," NTT Review, vol. 3, No. 4 Jul. 1991, pp. 29-36.
Franco Mercalli and Roberto Negrini, "The ESSAI Teleshopping System: An Example of a Broadband Multimedia Application," Publication No. 0-7803-1820-X/94, IEEE, 1994, pp. 572-576.
Abhaya Asthana and Paul Krzyzanowski, "A Small Domain Communications System for Personalized Shopping Assistance," Proceedings of ICPWC'94, Publication No. 0-7803-1996-6/94, IEEE, 1994, pp. 199-203.
Linda Littleton, "Meet the Shadowy Future," Proceedings ACM SIGUCCS User Services Conference XXII, Ypsilanti, Michigan Oct. 16-19, 1994, pp. 205-210.
L. F. Ludwig and D.F. Dunn, "Laboratory for Emulation and Study of Integrated and Coordinated Media Communication," Conference on Office Information Systems, Mar. 23-25, 1988, Sponsored by ACM SIGOIS and IEEECS TC-OA in cooperation with IFIP W.G. 8.4, pp. 283-291.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.
ISDN Tutorial:Definitions, http://www.ralphb.net/ISDN/defs.html, printed on Apr. 21, 2000.
ISDN Tutorial: Interfaces, http://www.ralphb.net/ISDN/ifaces.html, printed on Apr. 21, 2000.
"USA Global Link Brings Interactively to Internet Shopping", Business Wire., Oct. 1998.
"Lucent Technology and Netscape Team to Deliver Lucent Ecommerce Solutions", Business Wire, Sep. 1998.
"TriNet's, Help Me, I'm Stuck, Internet Voice Button Services Pushes Web Pages to Online Users", Business Wire, Mar. 1998.
Tehrani, Rich, "e-Rip Van Winkle and the 60 second Nap", Call Center Solution, vol. 18, No. 2, pp. 16(3)., Aug. 1999.
"Netcall Internet Call Buttons Enhance E-Commerce Customer Service and Sales", PR Newswire, p. 7431., Aug. 1999.
"Connecting to On-Line Car Shoppers: Auto Sellers Use Netcall Internet Call-Button Technology to Turn Clicks into Interactive Sales", Business Wire, p. 4089., Jul. 1999.
Davey, Tom, "Wheeling and Dealing Online", PC Week, vol. 13, No. 45, pp. 1, 129., Nov. 1996.
Collett, Stacey & Julie King, "Why Online Browsers Don't Become Buyers", Computerworld, vol. 33, No. 48, p. 14.
Information about Expertcity.com retrieved from the Internet [URL: http://www.expertcity.conm] on Apr. 9, 2000.
"Rent-An Expert on the Web", Information Week, p. 75, Sep. 1999.
"Expercity.com Launches Premier Online Marketplace for Expert Services", PR Newswire, Aug. 1999.
Information about keen.com retrieved form the Internet [URL: http://www.keen.com], on Oct. 24, 2000.
Cynthia Hodgson, "Online Expert Databases & Services", Econtent, Dec. 1999, p. 48-53.
Jeff Peline, "Net Firm to Connect Users by phone", CNET News.com, [retrieved from http://news.cnet.com on Oct. 24, 2001.
"Keen.Com Launches First Live Answer Community", Press release retrieved from http://www.keen.com on Oct. 24, 2000.
John Healey, "From A-Z, "You Can Sell Advice Online", Mercury News [retrieved from "http://wwwO.mercurycenter.com on Oct. 24, 2001.

Joseph Menn, "An Expert? There's Now a Home for You on the Internet", Los Angeles Times [retrieved from http://www.denverpost.com on Oct. 24, 2001.
"Walker Digital Issued Landmark U.S. Patent No. 5,862,223 for Global Internet Marketplace for Experts", Business Wire, Jan. 26, 1999.
Qcircuit Web Site (www.qcircuit.com).
Infomarkets.com Web Site (www.infomarkets.com).
Intellect Exchange Web Site (www.intellectexchange.com).
Answers.com Web Page (www.answers.com).
Chris Ott, "Making Good on the Information Economy", Denver Business Journal, Dec. 17, 1999, p. 27.
Michael Rogers et al, "Experts abound at New Web Sites", Library Journal, Mar. 1, 2000, pp. 22-24.
"Surfbrains.com: Brains online save time & money", M2 Presswire, Jul. 11, 2000.
Michael Kanellos, "Do You Want to Know the Meaning of Life?", Computer Reseller News, Mar. 3, 1997, pp. 72-74.
"Applying Technology News", Acccounting Technology, Feb./Mar. 1997, p. 14.
Ellen Greenblatt,"Have you ever wondered . . . ", Datamation, Oct. 1997, p. 126.
"Information for sale: Commercial Digital Reference and AskA Services", Virtual Reference Desk, Sep. 20, 1999, at www.vrd.org/AskA/commAskA.html.
EXP.com Web Site at www.exp.com/.
The Web Site at www.experts-exchange,com/.
Electronic Emissary at www.tapr.org/emissary/.
The Web Site at www.allexperts.com/.
U.S. Appl. No. 09/596,466, filed Jun. 19, 2000, Agdeppa, Hector A.
U.S. Appl. No. 60/198,642, filed Apr. 20, 2000, Rothschild et al.
U.S. Appl. No. 60/471,535, filed May 19, 2003, Melideo.
Big Green Blog: Jan. 2005 Archives, Feb. 21, 2006.
Information about Expertcity.com retrieved from the Internet [http://www.expertcity.com] on Nov. 6, 2000.
Ingenio Press Archives for 2004, www.ingenio.com, Feb. 21, 2006.
"Introducing 1-800-FREE411: First Nationwide Free Telephone Directory Assistance Service" Jingle Networks. Inc., Huntington Beach, Calif., Sep. 20, 2005.
"Jambo Launches to Connect People and businesses From the Internet to the Phone", Agoura Hills, Calif. May 3, 2005.
"Jambo Names Netzero Co-founder Stacy Haitsuka to New Post of Chief Information Officer", Agoura Hills, Calif., Jul. 5, 2005.
"Jambo Receives $5 Million in Financiing from Kline Hawkes & Co., Westlake Venture Partners, Others", Agoura Hills, Calif., Oct. 17, 2005.
*Keen.com, Inc. v. InfoRocket.com, Inc.*, Complaint for Patent Infringement, Trade Dress Infringement and Unfair Competition; Demand for Jury Trial filed Aug. 31, 2001, pp. 1-8 plus 17 pgs. of attachments.
*Keen.com, Inc. v. InfoRocket.com, Inc.*, Preliminary Injunction Hearing, pp. 286-289 (Jan. 8, 2002).
Keen.com Feb. 4, 2006.
Keen.com Plans Web Service Allowing Customers to Hold Private Phone Chats, Don Clark, Wall Street Journal, Nov. 8, 1999.
Keen.com raises $60 Million from Prestigious . . . , Business Wire, Jan. 11, 2000.
PCT Search Report for PCT Application No. PCT/US01/48284, filed Oct. 30, 2001 (corresponding to U.S. Appl. No. 09/702,217) mailed May 13, 2002 (7 pgs.).
Sell and buy advice online, The Ottawa Citizen, Nov. 29, 1999.
"UpSnap Selects LookSmart to Sell Premium Listings on FREE 411 Service for Text-Enabled Cell Phones", Nov. 4, 2004.
"Welcome to Jambo—the leader in Pay-per-Call Solutions" (search results) Oct. 17, 2005.
ISA/US, International Search Report for International Application No. PCT/US05/12061, 3 pages, Nov. 17, 2006.
USPTO Transaction History of U.S. Appl. No. 08/702,833, filed Aug. 23, 1996, entitled "Method for Establishing Anonymous Communication Links," now U.S. Patent No. 5,907,677.
USPTO Transaction History of U.S. Appl. No. 09/414,710, filed Oct. 8, 1999, entitled "System for Providing Services in Real-Time Over the Internet."
USPTO Transaction History of U.S. Appl. No. 09/488,130, filed Jan. 20, 2000, entitled "Method and Apparatus to Connect Consumer to Expert," now U.S. Patent No. 6,223,165.
USPTO Transaction History of U.S. Appl. No. 09/733,872, filed Dec. 8, 2000, entitled "Assistance Method and Apparatus," now U.S. Patent No. 6,523,010.
USPTO Transaction History of U.S. Appl. No. 09/782,925, filed Feb. 13, 2001, entitled "Assistance Method and Apparatus," now U.S. Patent No. 6,549,889.
USPTO Transaction History of U.S. Appl. No. 09/782,984, filed Feb. 13, 2001, entitled "Assistance Method and Apparatus," now U.S. Patent No. 6,546,372.
USPTO Transaction History of U.S. Appl. No. 10/107,743, filed Mar. 26, 2002, entitled "Assistance Method and Apparatus," now U.S. Patent No. 6,801,899.
USPTO Transaction History of U.S. Appl. No. 10/460,776, filed Jun. 12, 2003, entitled "Systems and Methods for Arranging a Call," now U.S. Patent No. 7,359,498.
USPTO Transaction History of U.S. Appl. No. 10/923,396, filed Aug. 20, 2004, entitled "Gate Keeper."
USPTO Transaction History of U.S. Appl. No. 10/951,502, filed Sep. 27, 2004, entitled "Method and System to Connect Consumers to Information," now U.S. Patent No. 7,249,045.
USPTO Transaction History of U.S. Appl. No. 11/772,525, filed Jul. 2, 2007, entitled "Method and System to Connect Consumers to Information."
USPTO Transaction History of U.S. Appl. No. 12/026,488, filed Feb. 5, 2008, entitled "System and Methods for Arranging a Call."
Sterling, Greg, "Ingenio's Ether—Pay Per Professional Advice," Search Engine Journal, Mar. 3, 2006.
International Application No. PCT/US00/10730, International Search Report, Jan. 3, 2001.
International Application No. PCT/US00/06849, International Search Report, May 16, 2000.

* cited by examiner

KEEN™.com
Your Personal Advisor

Sign Out

Home    Get Advice    My Keen    Give Advice    Help

Travel & Recreation > Sports & Recreation > Water Sports    Tell a Friend and get $25    What is Keen?

[Search] Find a Keen Member ☐ This category only

Live Advice    Recorded Advice    New Listings    Sort results by: [Top Available ▼]    More Listings >

| Availability | Name | Title | Rating | Rate |
|---|---|---|---|---|
| 💡 Call Now | Turtle | Surfboard Design | 60 | $10.00 |
| ☎ Away Request Appt. | Bodazafa | 📷✓ SoCal Surfing | 70 | $1.50 |
| 📞 Busy Request Appt. | Chandler | 📷✓ Surf Hawaii | 80 | $8.50 |
| ☎ Away Send Mail | Burkhart | 📷✓ Competition Surfing | 48 | $5.00 |

502, 504, 510, 518, 526, 512, 506, 514, 508, 516, 524, 520, 527, 522, 528, 529

More Listings >

💡 = Live Advice    🎧 = Recorded Advice    ☎ Away = Away From Phone    📞 Busy = On The Phone    📷 = Picture Available    ✓ = Verified Credential

*Note: Rate is per minute.

Home | Get Advice | My Keen | Give Advice | Help

About Keen | Jobs at Keen | Privacy | Join our Affiliate Program
Keen does not intend for any information from KeenSpeakers to constitute professional advice for which professional licensure is required. Use of this website constitutes acceptance of this and all other terms of our Member Agreement
©1999-2001 Keen Inc., All Rights Reserved. Trademark Notice

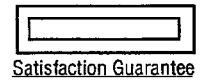 Satisfaction Guarantee    Secure Site

CATEGORY LISTING PAGE 500    FIG. 3

KEEN™.com
Your Personal Advisor

Sign Out

Home     Get Advice     My Keen     Give Advice     Help

Travel & Recreation > Sports & Recreation > Water Sports          What is Keen?

~506       ~508
Turtle    Sufboard Design

532 Call Now

I've been shaping surfboards for 50 years. I can teach you the tricks in no-time.

Rate: $10.00 per min.

Performance
Rating:                                60 ☆

Satisfaction Guaranteed

You've Got $5FREE on Keen

Learn More

Feedback

| Date | Rated By | Rating | Feedback |
|------|----------|--------|----------|
| 10/26/2000 | Novice | ★★★★★ | good knowledge of location; savvy and thorough explanation; |

▫ Read feedback

Availability for Turtle

Send a request for an appointment to talk live at your convenience

| Request Appointment | ~536

✉ Send Keen Mail

▫ Get Notified when this Speaker is Available

- Sunday: 6:00 am to 6:00pm
- Tuesday: 6:00 am to 11:45 pm
- Wednesday: 8:00 am to 11:00 pm
- Thursday: 7:00 am to 12:15 pm
- Friday 6:00 am to 8:30 pm
- Saturday: 8:00 am to 10:00 pm Time Zone  Pacific Standard Time (US/Canada)

▫ Tell a Friend and get $25
▫ Send Gift Certificate
▫ Request Appointment ~534
▫ 1-800-ASK-KEEN
   extension: 0056

~538

Home | Get Advice | My Keen | Give Advice | Help

About Keen | Jobs at Keen | Privacy | Join our Affiliate Program
Keen does not intend for any information from KeenSpeakers to constitute professional advice for which professional licensure is required. Use of this website constitutes acceptance of this and all other terms of our Member Agreement
©1999-2001 Keen Inc., All Rights Reserved. Trademark Notice Satisfaction Guarantee     Secure Site

AVAILABLE SPEAKER EXPANDED LISTING PAGE 530

FIG. 4

KEEN™.com
*Your Personal Advisor*

Sign Out

Home    Get Advice    My Keen    Give Advice    Help

Travel & Recreation > Sports & Recreation > Water Sports      What is Keen?

Bodazofa    Surf SoCal

552
Request an Appointment

Complete advise on everything having to do with the best breaks in Socal. 30 years experience in Socal surfing. Want to learn how to surf? I can help.

Rate: $10.00 per min.

Performance

Satisfaction Guaranteed

You've Got $5FREE on Keen

Rating:                  70 ✩

Feedback

Learn More

Availability for Bodazofa

Send a request for an appointment to talk live at your convenience

[ Request Appointment ]  ⌐ 556

✉ Send Keen Mail

- Sunday: 8:30 am to 10:00 pm
- Tuesday: 8:00 am to 10:00 pm
- Wednesday: 8:00 am to 10:00 pm
- Thursday: 8:00 am to 10:00 pm
- Friday 8:00 am to 10:00 pm
- Saturday: 8:00 am to 10:00 pm □ Tell a Friend and get $25
□ Send Gift Certificate Time Zone: (GMT -05:00) Eastern Time (US & Canada)

□ Request Appointment ⌐ 554

□ 1-800-ASK-KEEN
extension: 0075

|  | Midnight 12 | 2 | 4 | 6 | 8 | 10 | Noon 12 | 2 | 4 | 6 | 8 | 10 | Midnight 12 |
|---|---|---|---|---|---|---|---|---|---|---|---|---|---|
| Sunday |  |  |  |  |  |  |  |  |  |  |  | ▨ |  |
| Monday |  |  |  |  |  |  |  |  |  |  |  | ▨ |  |
| Tuesday |  |  |  |  |  |  |  |  |  |  |  | ▨ |  |
| Wednesday |  |  |  |  |  |  |  |  |  |  |  |  |  |
| Thursday |  |  |  |  |  |  |  |  |  |  |  | ▨ |  |
| Friday |  |  |  |  |  |  |  |  |  |  |  |  |  |
| Saturday |  |  |  |  |  |  |  |  |  |  |  | ▨ |  |

⌐ 558

Home | Get Advice | My Keen | Give Advice | Help

About Keen | Jobs at Keen | Privacy | Join our Affiliate Program
Keen does not intend for any information from KeenSpeakers to constitute professional advice for which professional licensure is required. Use of this website constitutes acceptance of this and all other terms of our Member Agreement
©1999-2001 Keen Inc., All Rights Reserved. Trademark Notice

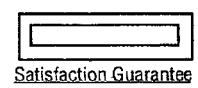
Satisfaction Guarantee

Secure Site

UNAVAILABLE SPEAKER EXPANDED LISTING PAGE 550

FIG. 5

Live, immediate sadvice for your everday life

We're sorry, Burkhart is not available for a Keen Call right now. You can send Burkhart a Keen Mail by filling out the information below. We will also notify you via Keen Mail when this Speaker becomes available.

Subject: [A request to talk on the phone with you]

Include specific information about the advice you are seeking

Your message:

572

☐ Check here if you want to request an appointment with Burkhart

[Continue] ∼574

About Keen | Jobs at Keen | Privacy | Join our Affiliate Program
Keen does not intend for any information from KeenSpeakers to constitute professional advice for which professional licensure is required. Use of this website constitutes acceptance of this and all other terms of our Member Agreement
©1999-2001 Keen Inc., All Rights Reserved. Trademark Notice

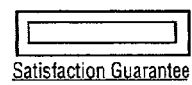
Satisfaction Guarantee

APPOINTMENT E-MAIL OPTION SCREEN 570

FIG. 6

| Request an Appointment |
|---|

Step 1: Choose a Time → Request any time for an appointment which is set only when San Fran Steven accepts your request. Keen will call you and connect you with San Fran Steven at your appointment time.
Step 2: Check a phone number
Step 3: Place a Deposit
Step 4: Send Request Date: [October ▼] [32 ▼]
Start Time: [12 ▼] [00 ▼] [PM ▼]
Length: [30 ▼] Minutes
Your Time Zone: [Pacific Standard Time (US/Canada) ▼]
☑ Adjust for Daylight Savings Time 602 ~[Continue] [Cancel]~ 604

REQUEST A TIME PAGE 600

FIG. 7A

| Request an Appointment |
|---|

Step 1: Join Keen → To request an appointment, please enter the information requested below. Keen keeps all your personal information private
Step 2: Choose a Time
Step 3: Place a Deposit
Step 4: Check Phone Number
Step 5: Send Request Join Now
And get $5 toward FREE* CALLS on Keen!

If you've used Keen before, please click here          New to Keen?
Email Address: [            ]
Create Password: [            ]

☑ Email me about special offers and promotions

Continue if you agree to the terms of our Member Agreement
612 ~[Continue] [Cancel]~ 614

*Click here for compete offer rules

JOIN NOW PAGE 610

FIG. 7B

| Request an Appointment |
|---|

| Step 1: Choose a Time | Request any time for an appointment which is set only when San Fran Steven accepts your request. Keen will call you and connect you with San Fran Steven at your appointment time. |
|---|---|
| Step 2: Check a phone number | |
| Step 3: Price a Deposit | |
| Step 4: Send Request | |

We're sorry. The time you requested has been reserved for another appointment
Please select from among the suggested times below or select another time (all times are in your time zone)

Next Closest Times

○ Monday October 18 from 11:16am - 12:15pm

○ Monday October 18 from 11:30pm - 1245pm

Same Time on Another Day

○ Tuesday October 19 from 3-4pm

Select Your Own Time

○ Date: October ▼  32 ▼

Start Time: 12 ▼  00 ▼  PM ▼

Length: 30 ▼  Minutes

Your Time Zone: Pacific Standard Time (US/Canada) ▼

☑ Adjust for Daylight Savings Time

622 — [Continue]  [Cancel] — 624

SELECT ANOTHER TIME PAGE 620

FIG. 8

Request an Appointment

Step 1: Choose a Time
Step 2: Check a phone number
Step 3: Price a Deposit
Step 4: Send Request → Keen will call you at your appointment time at the following number Phone Number U.S./Canada: Please enter the phone number where you would like Keen to call you.

Call me at this number ☐ - ☐ - ☐ ext. (optional) ☐

International Customers Change your info here.

☐ I use the same line for phone calls and online access

632 ~[ Continue ] [ Cancel ]~ 634

Home | Get Advice | My Keen | Give Advice | Help

SERVICE SEEKER TELEPHONE NUMBER REQUEST SCREEN 630

FIG. 9A

Request an Appointment

Step 1: Choose a Time
Step 2: Check a phone number
Step 3: Price a Deposit
Step 4: Send Request → Keen will call you at your appointment time at the following number Phone Number U.S./Canada: Please enter the phone number where you would like Keen to call you Call me at this number Work: ⊙ [415] - [284] - [4014]  ext. (optional) ☐
Home: ○ ☐ - ☐ - ☐
Mobile: ○ ☐ - ☐ - ☐  ext. (optional) ☐

International Customers Change your info here.

☐ I use the same line for phone calls and online access

642 ~[ Continue ] [ Cancel ]~ 644

Home | Get Advice | My Keen | Give Advice | Help

SERVICE SEEKER TELEPHONE NUMBER VERIFICATION SCREEN 640

FIG. 9B

| Request an Appointment |
|---|

Step 1: Choose a Time
Step 2: Check a phone number
| Step 3: Price a Deposit |
Step 4: Send Request → | Place a deposit to reserve your appointment. |

(Satisfaction guaranteed or your money back)    🔒 This page is secure

> Bodazafa has requested that you make a deposit to reserve your appointment
>
> $10.00
>
> The deposit is non-refundable.
>
> The deposit is sent to Bodazafa unless the appointment is cancelled or missed by Bodazafa or you cancel up to 24 hours before the call.
> When the call starts, the whole deposit is sent.
>
> We will use the following        Visa: XXXX-XXXX-XXXX-3298
> credit card:                     Expiration Date: 09/01
>                                  Billing Zip Code: 94123
>                                  Update or change the credit card

[Continue] [Cancel]

About Keen | Jobs at Keen | Privacy | Join our Affiliate Program
Keen does not intend for any information from KeenSpeakers to constitute professional advice for which professional licensure is required. Use of this website constitutes acceptance of this and all other terms of our Member Agreement
©1999-2001 Keen Inc., All Rights Reserved. Trademark Notice

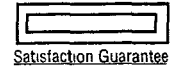 
Satisfaction Guarantee    Secure Site

APPOINTMENT DEPOSIT REQUEST SCREEN 650-A

FIG. 10A

| Request an Appointment |
|---|

Step 1: Choose a Time
Step 2: Check a phone number
| Step 3: Price a Deposit |
Step 4: Send Request → | Add $10 to your Keen Account to ensure that you can start your appointment call |

(Satisfaction guaranteed or your money back)    🔒 This page is secure

> Add $10 to your Keen Account
>
> By clicking the Continue button, you ensure that you can start your call by placing enough money in your Keen Account.
>
> You are only billed when your call begins.
>
> Visa: XXXX-XXXX-XXXX-3208
> Expiration Date: 09/02
> Billing Zip Code: 94123
> Update or change the credit card

[Continue] [Cancel]

About Keen | Jobs at Keen | Privacy | Join our Affiliate Program
Keen does not intend for any information from KeenSpeakers to constitute professional advice for which professional licensure is required. Use of this website constitutes acceptance of this and all other terms of our Member Agreement
©1999-2001 Keen Inc., All Rights Reserved. Trademark Notice

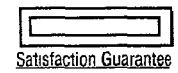 
Satisfaction Guarantee    Secure Site

APPOINTMENT DEPOSIT REQUEST SCREEN 650-B

FIG. 10B

| Request an Appointment |
|---|

Step 1: Choose a Time
Step 2: Check a phone number
| Step 3: Place a Deposit | → | Place a deposit to reserve your appointment |
Step 4. Confirm Request

Satisfaction guaranteed
or your money back

Add a Credit / Debit Card    🔒 This page is secure

Bodazafa has requested that you make a deposit to reserve your appointment of:
$10.00
Enter your credit card information below.

The deposit is non-refundable  The deposit is sent to Bodazafa unless the appointment is cancelled or missed by Bodazafa or you cancel up to 24 hours before the call  When the call starts, the whole deposit is sent <u>Learn why it is safe to use your credid card on Keen</u>

Card Information; This will be your default payment account
(All fields are required)

Name on Card:  [Steven Lurie]
    Card Number:   [            ]
    Type of Card:  [VISA      ▼]
    Expiration Date: [10▼] / [2001▼]

Billing Address (All fields are required)
The address you enter below must match your card's billing address.

Name: [Steven Lurie]

SELECT DEPOSIT PAYMENT TYPE SCREEN <u>660-A</u>

FIG. 10C

| Request an Appointment |
|---|

Step 1: Choose a Time
Step 2. Check a phone number
| Step 3: Place a Deposit | → | Ensure that you can start your appointment call. |
Step 4: Send Request

Satisfaction guaranteed
or your money back

Add a Credit / Debit Card    🔒 This page is secure

By entering your credit card information now, you ensure that you can start your call by placing $10 in your Keen Account.
You are only billed when your call begins Why this is safe

Card Information; This will be your default payment account
(All fields are required)

Name on Card:  [Steven Lurie]
    Card Number:   [            ]
    Type of Card:  [VISA      ▼]
    Expiration Date: [10▼] / [2001▼]

Billing Address (All fields are required)
The address you enter below must match your card's billing address.

Name: [Steven Lurie]

SELECT DEPOSIT PAYMENT TYPE SCREEN <u>660-B</u>

FIG. 10D

APPOINTMENT REQUEST REVIEW SCREEN 670

Your request for an appointment has been sent to Bodazafa

The appointment will only be confirmed San Fran Steven accepts your request. you will be notified via Keen Mail if this happens.

You can check the status of your appointment on your My Keen page in the My Appointments section.

OK — 682

APPOINTMENT CONFIRMATION SCREEN 680

KEEN™.com
Your Personal Advisor | Home | Get Advice | My Keen | Give Advice | Help My Keen > My Appointments Request an Appointment

Appointments you have requested with KeenSpeakers
22 accepted· 17 requests for appointments   Learn more about appointments Cancel

692 more appointments >

| | Status | Appointment Date | Start Time | End Time | Length | Speaker | Deposit |
|---|---|---|---|---|---|---|---|
| ☐ | Accepted | Thursday October 25, 2001 | 8:45pm | 8:45pm | 15 minutes | lik614141 | $40.00 |
| ☐ | Accepted | Thursday October 25, 2001 | 1.10pm | 1:10pm | 1 hour, 15 minutes | Shelly26+1 | $0.00 |
| ☐ | ▸ Pending | Thursday October 25, 2001 | 12pm | 12pm | 15 minutes | rhirson | $20.00 |
| ☐ | Accepted | Thursday October 25, 2001 | 11:33pm | 11:33pm | 1 hour, 15 minutes | escott | $20.00 |
| ☐ | Accepted | Friday October 26, 2001 | 8 45pm | 8.45pm | 15 minutes | TostStevenlune | $0.00 |
| ☐ | ▸ Pending | Friday October 26, 2001 | 7 10pm | 7:10pm | 1 hour, 15 minutes | saurabhmital | $10.00 |
| ☐ | ▸ Pending | Friday October 26, 2001 | 12pm | 12pm | 15 minutes | jerry2jusa08 | $40.00 |
| ☐ | ▸ Pending | Friday October 26, 2001 | 11·23pm | 11:23pm | 1 hour, 15 minutes | For Fun Call Tom | $10.00 |
| ☐ | Accepted | Saturday October 27, 2001 | 8:45pm | 8:45pm | 15 minutes | Lady Capper | $10.00 |
| ☐ | ▸ Pending | Saturday October 27, 2001 | 7 10pm | 7:10pm | 1 hour, 15 minutes | bbtalk | $20 00 |
| ☐ | Accepted | Saturday October 27, 2001 | 12pm | 12pm | 15 minutes | Serentity5 Chamber | $0 00 |
| ☐ | Accepted | Saturday October 27, 2001 | 11.23pm | 11:23pm | 1 hour, 15 minutes | DocTalk is here | $40 00 | more appointments >

Cancel

Home | Get Advice | My Keen | Give Advice | Help

SERVICE SEEKER APPOINTMENTS SCREEN 690

FIG. 12

KEEN™.com
Your Personal Advisor

Home    Get Advice    My Keen    Give Advice    Help

Sign Out

My Keen

"IMAGE"

Welcome back: Bodazafa

Change my phone number | See my special offers

My Personal Info

My Account
Balance: $5.00  Acct. activity
add to balance

Satisfaction Guaranteed
You've Got
$5FREE
on Keen
Learn More

Try these KeenSpeakers!

| Computing & Internet | | Rate | Rating |
|---|---|---|---|
| Call Now | Microsoft Certified Systems E... | $1.65 | 977 |
| Call Now | 24 Hour LIVE Windows Technica... | $1.65 | 641 |

Health & Therapy

| | | | |
|---|---|---|---|
| Call Now | A state licensed therapist ca... | $1.20 | 701 |
| Call Now | Professional Counselor, Not a... | $1.59 | 271 |

702

My Availability
Accept calls?    Call me at:
○ Yes      ○ work
● No      ● cell
☐ Use Schedule ☐ Notify me of incoming Keen calls
☐ Change my home number ☐ Use Reminder Call  706

Search

Get Advice on... [        ] [Search]
(by subject)

Find a Person... [        ] [Search]
(by first name, last name, or member name)

My Appointments

You have 12 pending appointments

Your next appointment is with:
San Fran Steven on
Tuesday, November 12, 2001
at 10:30am.
Learn more about appointments Home | Get Advice | My Keen | Give Advice | Help About Keen | Jobs at Keen | Privacy | Join our Affiliate Program
Keen does not intend for any information from KeenSpeakers to constitute professional advice for which professional licensure is required. Use of this website constitutes acceptance of this and all other terms of our Member Agreement
©1999-2001 Keen Inc., All Rights Reserved. Trademark Notice Keen Mail

[        ] Secure Site
Satisfaction Guarantee

SERVICE PROVIDER MANAGEMENT SCREEN 700

My Availability
Accept calls?    Call me at:
○ Yes      ○ work
● No      ● cell
☐ Use Schedule ☐ Notify me of incoming Keen calls
☐ Change my home number  712
☐ Start accepting appointments ☐ Use Reminder Call Keen Mail

FIG. 13B

KEEN™.com
Your Personal Advisor | Home | Get Advice | My Keen | Give Advice | Help My Keen > My Appointments

My Appointments

My Assignments | Preferences ⌒721

To get started, go to the Prefences link above and either:   Learn more about appointments
1. Display links on your listing for customers to request appointments
and/or
2. Send mail to particular customers to invite them to make appointments with you.

| Action | ▽ Status | △ Appointment Date | Start Time | End Time | Length | Customer |
|---|---|---|---|---|---|---|

No appointments

Home | Get Advice | My Keen | Give Advice | Help

APPOINTMENT OPTION INVITATION SCREEN 720

KEEN™.com
Your Personal Advisor | Home | Get Advice | My Keen | Give Advice | Help My Keen > My Appointments

My Appointments

Let your Customers Make Appointments with You

Ensure that your best customers can reach you at a time most convenient for them and you.
⌒723

① Let customers make request for appointments
  ▫ Display links on your listings for customers to request appointments:  ○ Yes  ● No
  and/or  ⌒724
  ▫ Send Keen Mail to invite your customers to make appointments ② Respond to the requests for appointments.
  ▫ Manage your appointments (accept, decline, and cancel) on:
    My Keen>My Availability>My Appointments  ⌒726

③ At the appointment time, Keen will call your customers and then you so you can talk live.
  Learn more about appointments ④ Set the deposit amount for your customers to reserve appointments with you.
  If they miss the call, then you receive the deposit amount.
  This way, you can help ensure that the appointments are honored by your customers.
  Set the deposit amount to:  [$10 ▽]  ⌒728

Home | Get Advice | My Keen | Give Advice | Help

APPOINTMENT ACTIVATION SCREEN 722

FIG. 14B

E-MAIL APPOINTMENT INVITE SCREEN 730

FIG. 15

KEEN™.com
*Your Personal Advisor* | Home | Get Advice | My Keen | Give Advice | Help My Keen > My Appointments Request an Appointment

Appointments you have requested with you
22 accepted. 17 requests for appointments   Learn more about appointments

How to get Request for Appts.
Display links on your listings for customers to request appointments  ○ Yes  ● No
Use Keen Mail to invite your customers to make appointments next≥

| Action | | Status | Appointment Date | Start Time | End Time | Length | Speaker | |
|---|---|---|---|---|---|---|---|---|
| Cancel | | Accepted | Thursday October 25, 2001 | 1:10pm | 1:10pm | 1 hour, 15 minutes | Shelly26+1 | view note |
| Accept | Decline | ▸ Pending | Thursday October 25, 2001 | 12pm | 12pm | 15 minutes | rhirson | |
| Cancel | | Accepted | Thursday October 25, 2001 | 11:33pm | 11:33pm | 1 hour, 15 minutes | escott | |
| Cancel | | Accepted | Friday October 28, 2001 | 8:45pm | 8:45pm | 15 minutes | TostStevenJune | view note |
| Accept | Decline | ▸ Pending | Friday October 26, 2001 | 7:10pm | 7:10pm | 1 hour, 15 minutes | saurabhmital | |
| Accept | Decline | ▸ Pending | Friday October 26, 2001 | 12pm | 12pm | 15 minutes | jerry2jusa08 | |
| Accept | Decline | ▸ Pending | Friday October 26, 2001 | 11:23pm | 11:23pm | 1 hour, 15 minutes | For Fun Call Tom | |
| Cancel | | Accepted | Saturday October 27, 2001 | 8:45pm | 8:45pm | 15 minutes | Lady Capper | |
| Accept | Decline | ▸ Pending | Saturday October 27, 2001 | 7:10pm | 7:10pm | 1 hour, 15 minutes | bbtalk | view note |
| Cancel | | Accepted | Saturday October 27, 2001 | 12pm | 12pm | 15 minutes | Serentity5 Chamber | |
| Cancel | | Accepted | Saturday October 27, 2001 | 11:23pm | 11:23pm | 1 hour, 15 minutes | DocTalk is here | view note next≥ |

Home | Get Advice | My Keen | Give Advice | Help

SPEAKER VIEW OF APPOINTMENTS SCREEN 740

FIG. 16A

KEEN™.com
*Your Personal Advisor* | Home | Get Advice | My Keen | Give Advice | Help My Keen > My Appointments Request an Appointment

Appointments KeenSeekers have requested with you
22 accepted· 17 requests for appointments   Learn more about appointments
You also have requested appointments with KeenSpeakers   Check now

How to get Request for Appts.
Display links on your listings for customers to request appointments  ○ Yes  ● No
Use Keen Mail to invite your customers to make appointments next≥

| Action | | Status | Appointment Date | Start Time | End Time | Length | Speaker | |
|---|---|---|---|---|---|---|---|---|
| Cancel | | Accepted | Thursday October 25, 2001 | 1:10pm | 1:10pm | 1 hour, 15 minutes | Shelly26+1 | view note |
| Accept | Decline | ▸ Pending | Thursday October 25, 2001 | 12pm | 12pm | 15 minutes | rhirson | |
| Cancel | | Accepted | Thursday October 25, 2001 | 11:33pm | 11:33pm | 1 hour, 15 minutes | escott | |
| Cancel | | Accepted | Friday October 28, 2001 | 8:45pm | 8:45pm | 15 minutes | TostStevenJune | view note |
| Accept | Decline | ▸ Pending | Friday October 26, 2001 | 7:10pm | 7:10pm | 1 hour, 15 minutes | saurabhmital | |
| Accept | Decline | ▸ Pending | Friday October 26, 2001 | 12pm | 12pm | 15 minutes | jerry2jusa08 | |
| Accept | Decline | ▸ Pending | Friday October 26, 2001 | 11:23pm | 11:23pm | 1 hour, 15 minutes | For Fun Call Tom | |
| Cancel | | Accepted | Saturday October 27, 2001 | 8:45pm | 8:45pm | 15 minutes | Lady Capper | |
| Accept | Decline | ▸ Pending | Saturday October 27, 2001 | 7:10pm | 7:10pm | 1 hour, 15 minutes | bbtalk | view note |
| Cancel | | Accepted | Saturday October 27, 2001 | 12pm | 12pm | 15 minutes | Serentity5 Chamber | |
| Cancel | | Accepted | Saturday October 27, 2001 | 11:23pm | 11:23pm | 1 hour, 15 minutes | DocTalk is here | view note next≥ |
| Done | | | | | | | | |

Home | Get Advice | My Keen | Give Advice | Help

COMBINED SPEAKER AND SEEKER VIEW OF APPOINTMENTS SCREEN 750

FIG. 16B

ACCEPT/DECLINE APPOINTMENT E-MAIL SCREEN 780

KEEN™.com
Your Personal Advisor | Home | Get Advice | My Keen | Give Advice | Help My Keen > My Appointments

My Appointments

Congratulations. You have accepted an appointment with <Seeker Name in bold>
You will be called live on <Date -- eg. Saturday October 27, 2001 at <time and time zone -- e.g. 2:00am Pacific Standard Time (US/Canada)
You can check your My Appointments page in My Keen to manage this and other appointments Do you want to include comments with your response?

772 ⟶ ⊙ Yes, include comments with my response
774 ⟶ ○ No, do not include comments with my response 776 ⟶ [OK] [Cancel] ⟵ 778

About Keen | Jobs at Keen | Privacy | Join our Affiliate Program

SPEAKER ACCEPTS APPOINTMENT SCREEN 770

FIG. 18A

KEEN™.com
Your Personal Advisor | Home | Get Advice | My Keen | Give Advice | Help My Keen > My Appointments

My Appointments

Are you sure you wnat to decline this request for an appointment?
The request is with <Seeker Name in bold>
for <Date -- e.g. Saturday October 27, 2001 at <time and time zone -- e.g. 2:00am Pacific Standard Time (US/Canada)

Do you want to include comments with your response?

782 ⟶ ⊙ Yes, include comments with my response
784 ⟶ ○ No, do not include comments with my response 786 ⟶ [OK] [Cancel] ⟵ 788

About Keen | Jobs at Keen | Privacy | Join our Affiliate Program

SPEAKER DECLINES APPOINTMENT SCREEN 780

FIG. 18B

APPOINTMENT NOTES SCREEN 790

APPARATUS AND METHOD FOR SCHEDULING LIVE ADVICE COMMUNICATION WITH A SELECTED SERVICE PROVIDER

FIELD OF THE INVENTION

The invention relates generally to the field of live advice communication. More particularly, the invention relates to a method and apparatus for scheduling live advice communication with a selected service provider.

BACKGROUND OF THE INVENTION

Consumers interested in acquiring services must first identify a service provider who is capable of providing the required services. At present, this usually means perusing a telephone directory, which can become frustrating and time-consuming if the service providers telephoned are not immediately available. In addition, a simple telephone call does not enable the service provider to charge a fee according to the time spent with his/her customers.

Systems now exist that enable providers of services to charge fees for the time spent delivering the service. 1-900 phone numbers will charge the seeker of services according to the time spent receiving the service and will transfer this payment, or a portion of it, to the provider. Each 1-900 number, however, has a very narrow scope—"Hear your Horoscope," for instance. If a seeker would like to hear an entirely different service—"Your Local Weather," for instance—he/she would have to dial a completely different 1-900 number. Similarly, each 1-900 number is quite rigid in the price, quality, and specificity of its service.

However, current systems (service provider systems) now exist that enable seekers to locate service providers according to a wide range of price, quality and specificity of service (U.S. application Ser. No. 09/414,710 and U.S. application Ser. No. 09/702,217). Such systems also make it possible for the service provider and buyer to be connected and communicate in real time. Such systems, provide service seekers the capability to select service providers via the Internet, assuming the service seeker owns or has access to the necessary computer hardware to browse the internet. In addition, a service seeker can be matched to a wide array of service providers with specific skills using only a simple audio-transmission medium such as the telephone.

The systems described above, such as for example, the service provider systems, are designed to generate capital for both the owners of the systems, as well as the service providers, which provider their services via the systems. As such, the more requests and live conversations the service provider engages in, the more money the service providers will generate. Accordingly, the more money generated by the service providers, the more money that will be generated for the service provider system. As such, the system described above not only aspire to attract as many customers as possible, but where possible, to have as many repeat customers as possible.

Accordingly, as systems such as the service provider system described above begin to generate additional repeat business, certain ones of the various service providers available from such systems may become popular. As such, users of the systems will eventually determine certain service providers, which are the favorites. As a result, certain service providers of the system will have increased popularity as compared to other service providers available from the system. Therefore, the availability of these popular service providers may be quite diminished due to their increased demand. In addition, such service providers cannot always be available. Their windows of availability may be small when compared to those of the users that are requesting their services. In addition, due to either illness, unforeseen circumstances or the like, the service providers may be unavailable during their indicated times of availability.

Consequently, the service provider systems, as described above, can generate a benefit from some sort of mechanism for enabling users to schedule receipt of service from such service providers. Such a scheduling system would enable more efficient allocation of the service provider's times, as well as provide improved efficiency to users in accessing their desired service providers. In addition, a service provider could gauge interest with reference to the service provider based on the amount of scheduling requests received. Therefore, there remains a need to overcome one or more of the limitations in the above-described existing.

SUMMARY OF THE INVENTION

The present provides a method and apparatus for scheduling live advice communication with a selected service provider. The method includes receiving, from a service seeker (seeker), an appointment request for a live advice communication with a selected service provider (speaker) during a specified appointment time. Once the request is received, the appointment request is provided to the selected service provider. The selected service provider then has the option of either accepting or rejecting the appointment request. As a result, once the appointment request is accepted, the service provider system schedules a live advice communication appointment between the service seeker and the selected service provider. Once scheduled, the service provider system will connect the service seeker and the selected service provider for a live advice communication at the scheduled appointment time.

Accordingly, service seekers that desire to receive live advice communications from more popular service providers can now schedule an appointment time with the desired service provider, which provides service seekers additional flexibility. In addition, the service providers may gauge interests in the live advice, which the service provider engages in by determining a number of appointment requests received. Moreover, the service provider is provided with additional flexibility to select or decline the appointments in which to engage.

Advantages of the invention include a service provider system, which enables customers to select an appointment time for engaging in a live advice communication with the selected service provider. This provides customers with the flexibility to schedule times that are mutually beneficial to both the service seeker and the selected service provider. As a result, in situations where a service provider is extremely popular, a service seeker can ensure that they will engage in a live advice communication with the service provider by scheduling an appointment in order to engage in a live advice communication with the selected service provider at a selected appointment time.

However, if the service provider is unavailable at the scheduled appointment time, the service provider system will connect the service seeker with a highest ranking service provider within a relevant field of service and connect the selected service provider with the selected service seeker for a live advice communication. Once the communication is complete, the service provider system will compensate the service seeker with a gift from the initially selected service provider. Furthermore, the appointment scheduling system described provides service providers with the flexibility to gauge interest in the services they provide. In addition, service providers are given the flexibility to select or decline the appointment which they desire to engage.

BRIEF DESCRIPTION OF THE DRAWINGS

The present invention is illustrated by way of example, and not by way of limitation, in the figures of the accompanying drawings and in which:

FIG. 3 depicts a category listing page enabling online requests of appointment with a selected service provider in accordance with one embodiment of the present invention.

FIG. 4 depicts an available speaker expanded listing screen in accordance with a further embodiment of the present invention.

FIG. 5 depicts an unavailable speaker expanded listing screen in accordance with a further embodiment of the present invention.

FIG. 6 depicts an appointment e-mail option screen in accordance with a further embodiment of the present invention.

FIG. 7A depicts a screen for selecting an appointment time with a selected service provider in response to an appointment request in accordance with one embodiment of the present invention.

FIG. 7B depicts a screen for joining a service provider system, such as depicted in FIGS. 1, 2A and 2B, in accordance with a further embodiment of the present invention.

FIG. 8 depicts an appointment time selection screen when a service provider is unavailable at a previously selected appointment time in accordance with an exemplary embodiment of the present invention.

FIGS. 9A and 9B depict service seeker telephone number verification screens for verifying a service seeker telephone number in response to receipt of an appointment request for a selected service provider in accordance with a further embodiment of the present invention.

FIGS. 10A-10D depict appointment deposit request screens and payment screens in response to an appointment request for a selected service provider in accordance with a further embodiment of the present invention.

FIG. 12 depicts a service seeker appointment screen listing pending and accepted appointments requested by a service seeker in accordance with an exemplary embodiment of the present invention.

FIGS. 13A and 13B depict a service provider management screen utilized by a service provider to either begin accepting appointments or to provide a brief summary of pending, as well as next appointments, in accordance with a further embodiment of the present invention.

FIGS. 14A and 14B depict an appointment option activation screen and service provider schedule screen in accordance with a further embodiment of the present invention.

FIG. 15 depicts an e-mail appointment invite screen utilized by a service provider in order to invite service seekers to request appointments with the service provider in accordance with an exemplary embodiment of the present invention.

FIGS. 16A and 16B depict service provider appointment screens, including accepted and pending appointment requests, as well as appointment requests made by the service provider to other service providers available from the service provider system in accordance with an exemplary embodiment of the present invention.

FIGS. 18A-18C depict service provider appointment acceptance screens in accordance with an exemplary embodiment of the present invention.

DETAILED DESCRIPTION

Figure 1:
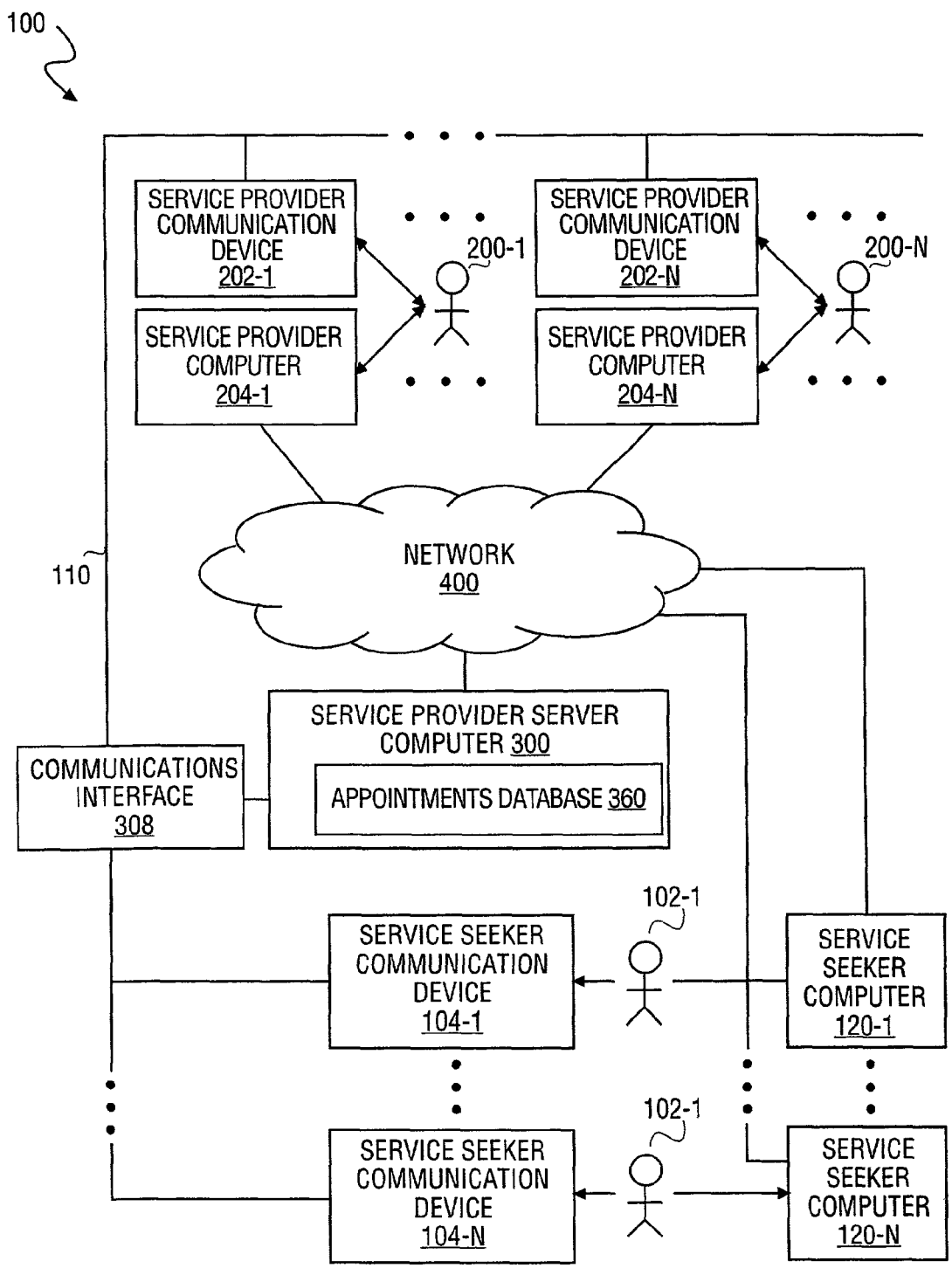
FIG. 1 depicts a block diagram illustrating a system in which a service provider system enabling online service provider appointment scheduling, in accordance with one embodiment of the present invention, may be implemented.

A method and apparatus for scheduling live advice communication with a selected service provider are described. The method includes the receipt, from a service seeker, of an appointment request for a live advice communication with a selected service provider during a specified appointment time. Once the request is received, the appointment request is provided to the selected service provider. The appointment request may be provided either via electronic mail or via an alert provided via a display screen, which is browsed by the service provider. As such, once received by the service provider, the service provider has the option to either accept or decline the appointment request. Consequently, once the appointment request is accepted, the service provider system schedules a live advice communications appointment between the service seeker and the selected service provider. Finally, the service provider system will connect the selected service provider with the service seeker to engage in a live advice communication at the scheduled appointment time.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software.

One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System Architecture

FIG. 1 depicts one embodiment of a service provider system architecture 100 in which the systems and methods of the present invention may be incorporated. The service provider system 100 includes one or more service seeker computers 120 (120-1, ..., 120-N) connected through a network 400 (such as an Intranet, an Extranet, a LAN or a WAN such as the Internet) to a host computer or web server ("service provider server computer") 300. One or more service provider computers 204 are also connected to the service provider server computer 300 via the network 400. Persons skilled in the art will recognize that the service provider server computer 300 may include one or more computers working together to provide the server computer functions described herein.

The system 100 also includes one or more service providers (speakers) 200 (200-A, ..., 200-N) each having a communications device 202 (202-1, ..., 202-N) that is connected to a communications network 110. Accordingly, one or more service seekers (seeker) 102 (102-1, ..., 102-N) access the service provider system via either communications devices 104 (104-A, ..., 104-N) that are connected to the communications network 110 or service seeker computers 120. In accordance with the teachings of the present invention, a seeker 102 can send a request 106 (106-A, ..., 106-N) via the communications device 104 or service seeker computer 120, which is received by the service provider server computer 300.

As described in further detail below, the service provider server computer 300 can then automatically connect the seeker 104 to a selected speaker 200 for a live conversation either via the communication devices 104 and 202 or the computers 120 and 204. Accordingly, when the request 106 is provided via a communication device 104, the request 106 may be in the form of either a voice command or keypad entry. As described in further detail below, the service provider server computer 300 can then connect the service seeker 102 to a selected service provider 200 for a live conversation via the communications interface 308.

The communications network 110 generally refers to any type of wire or wireless link enabling the transmission of voice data such as, but not limited to, a public switched telephone network, a wireless communications network, a local area network, a wide area network or a combination of networks. The communications devices 104 and 200 generally refer to any type of device capable of receiving speech or keypad entry from a user and providing the speech/keypad entry to a destination via a communications network, such as the communications network 110. In an embodiment of the present invention, the communications network 110 is a public switched telephone network and the communications device 104 and 200 are telephones.

However, in contrast to service provider systems described in U.S. patent application Ser. No. 09/414,710 and U.S. patent application Ser. No. 09/702,217, service provider system 100, as depicted in FIG. 1, includes an appointments database 360. The appointments database contains a record for each scheduled appointment between a service seeker and a selected service provider as well as all pending appointment requests for a live advice communication between a seeker 102 and a speaker 200. As will be described in further detail below, the advice communication may be in the form of a live advice conversation as described above, a recorded advice communication, as well as a written advice communication via, for example, electronic mail. In addition, the terms "seeker" and "service seeker", as all as the terms "speaker" and "service provider" are used interchangeably, as described herein.

Accordingly, as each appointment request and subsequent advice communication occurs between service seekers and service providers, a record is generated in the appointments database 360 in order to enable appointment generation procedures, as will be described in further detail below, to provide service seeker with the ability to schedule advice communications with the selected service providers at a designated time. In addition, the service providers may gauge interests in the live advice, which the service provider engages in, by determining a number of appointment requests received. Moreover, the service provider is provided with additional flexibility to select or decline the appointments in which to engage.

Using the various procedures provided, the service providers can provide incentives to service seekers in order to induce the service seekers to engage in additional receipt of advice communication, thereby generating additional compensation to the service providers, as well as providing additional compensation to the service provider system 100. In addition, the appointment generation procedures provide further functionality when the service provider is unavailable at the scheduled appointment time. When unavailable, the service provider system will select a highest ranking, alternate service provider within a relevant field of service and connect the alternate service provider with the service seeker for a live advice communication. Once the communication is complete, the service provider system will compensate the service seeker with a gift from the initially selected service provider, as will be described in further detail below.

Figure 2A:
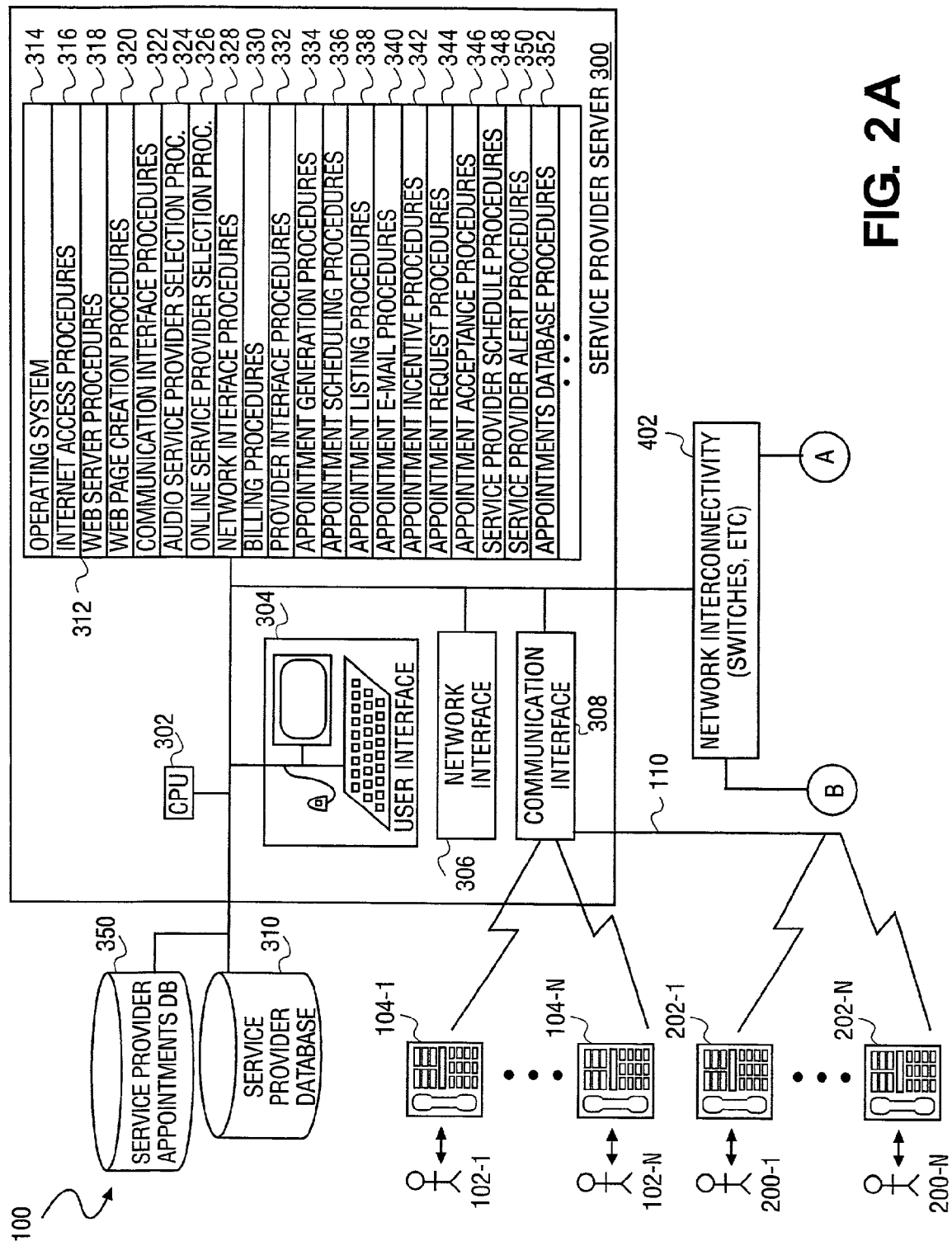
FIGS. 2A and 2B depict block diagrams further illustrating the service provider system as depicted in FIG. 1.

Referring now to FIG. 2A, FIG. 2A further illustrates the service provider system 100, including the service provider server computer 300, as well as the service provider communication devices 202 and the service seeker communication devices 104 coupled to the communications interface 308. The service provider server computer 300 includes a central processing unit (CPU) 302, a user interface 304, a network interface 306, a communications interface 308, a service provider database (DB) 310, an appointments DB 350 and a memory 312. The service provider server computer 300 can be any type of computing device, such as, but not limited to, desktop computers, work stations, lap tops and/or mainframe computers.

The communications interface 308 is used to communicate with seekers 102 and speakers 200, as well as other system resources not shown. In one embodiment, the communications interface 308 receives an audio request 106 provided by seeker 102 through a communications device 104, which is provided over the communications network 110. The communications interface 308 provides digitized voice requests to the audio portal server computer 300 for interactive voice recognition (IVR), including voice processing, speech recognition and text-to-speech processing. In addition, communications interface 308 provides digitized keypad responses to the service computer for decoding of dual tone multi-frequency (DTMF) signals.

The network interface 306 is used to connect a seeker computer 120 to a selected service provider computer 202 for real-time communication, such as voice over Internet Protocol (IP), video over-IP, or the like. The memory 312 of the service provider server computer 300 may be implemented as RAM (random access memory), SRAM (synchronous RAM), SDRAM (synchronous data RAM) or a combination of RAM and non-volatile memory, such as one or more memory modules, storage volumes, or magnetic disk storage units. The memory can contain any of the following:

- an operating system 314;
- internet access procedures 316;
- web server procedures 318;
- web creation procedures 320;
- communications interface procedures 322 for receiving an audio request (voice/keypad entry) 106 from the user 102 via the communications interface 308 and utilizing either integrated voice recognition (IVR) for voice requests or dual tone multi-frequency (DTMF) decoding for keypad entry request to provide the user with a selected service provider and connect the service seeker 102 with the selected service provider 200 for a live conversation;
- audio service provider selection procedures 324 for providing the service seeker 102 with keypad entry options for direct service provider connection by entering a service provider extension or browsing fields of service from an auditory list of fields of service providers provided by the system 100, including corresponding keypad entry codes, auditory lists of service providers matching a field of service selected by the user 102, as well as receiving various descriptors for narrowing the search of service providers, including acceptable price ranges, acceptable quality ratings, specific languages, as well as a service provider ID of a specific service provider when known by the service seeker 102;
- online service provider selection procedures 324 for providing the service seeker 102 with an online interface for providing listing of fields of service available from the audio portal system 100, as well as receiving various descriptors for narrowing the search of service providers, including acceptable price ranges, acceptable quality ratings, specific languages, as well as a service provider ID of a specific service provider when known by the service seeker 102;
- network interface procedures 326 for directing the network interface 306 to connect a user computer 120 to a selected service provider computer 202 for real-time communication, such as voice over Internet Protocol (IP), video over-IP, or the like, once a service provider is selected;
- billing procedures 330 for billing the service seeker 102 following an advice communication exchange with the service provider 200, as well as compensating the service provider 200 for the advice communication exchange and collecting a premium fee for the service provider system 100;
- provider interface procedures 332 for providing an on-line interface, as well as an audio interface (e.g., via telephone), to service providers 200 requesting inclusion in the service provider database 310 in order to provide live services via the audio portal system 100 to perspective seekers 102 and allowing service providers 200 to update information in the service provider database 310, including times of availability;
- appointment generation procedures 334 for providing service seekers with the option to request an appointment with a selected service provider that is either unavailable or available at a time which is unfavorable to the service seeker, such that once the service seeker provides an appointment request to the service provider system and the appointment request is accepted by the selected service provider, the communications interface 308 connects the service provider with the service seeker for a live advice communication at a selected appointment time;
- appointment scheduling procedures 336 for providing received appointment requests to selected service providers via, for example, appointment listing alerts, such that once the appointment is accepted by the selected service provider, the system 100 will schedule an appointment within the appointments database and contact both the service seeker and the selected service provider at the specified appointment time via communication medium that are linked via communication interface 308 once the seeker 104 and speaker 200 accept the communications request;
- appointment listing procedures 338 for providing both service seekers and service providers with listings of both pending, as well as accepted, appointments with various service seekers and service providers;
- appointment e-mail procedures 340 for enabling service seekers to request appointments via e-mail, as well as allowing service providers to provide service seekers with the option to select and request appointments via e-mail;
- appointment incentive procedures 342, which are utilized by the appointment e-mail procedures to provide service seekers with incentives for enticing the service seekers to request appointments with respective selected service providers, and when an appointment is selected, once the live advice conversation therebetween is completed, compensating the service seeker with the incentive indicated by the service provider;
- appointment request procedures 344 for providing service seekers with an online interface for requesting appointments for selected service providers when either desired by the service seeker or when the selected service provider is unavailable at a time of the service seeker's live advice request and for providing appointment requests to selected service seekers for display via appointment display screens;
- appointment acceptance procedures 346 utilized by appointment scheduling procedures 336 for receiving acceptance or rejection of appointment requests made to various selected service providers, which are displayed as alerts via an appointments display screen;
- service provider schedule procedures 348 for providing service providers with the ability to schedule times available for live advice communications, as well as with the option to enable appointment requests, such that service providers of the service provider system 100 may select the option to accept appointment requests via either service provider listing screens, service provider management screens or the like or limit appointment requests to e-mail or decline appointment request all together;

service provider alert procedures 350 for alerting service providers of appointment requests made by service seekers, as well as e-mail requests for contact provided by service seekers when the service provider has opted to disable receipt of appointment requests;

appointment database procedures 352 for generating transaction records for each appointment request and acceptance received and provided via respective service seekers and service providers, as well as querying the database for various pending and accepted appointments for display via the appointment listing procedures 338; and other procedures and files.

Figure 2B:
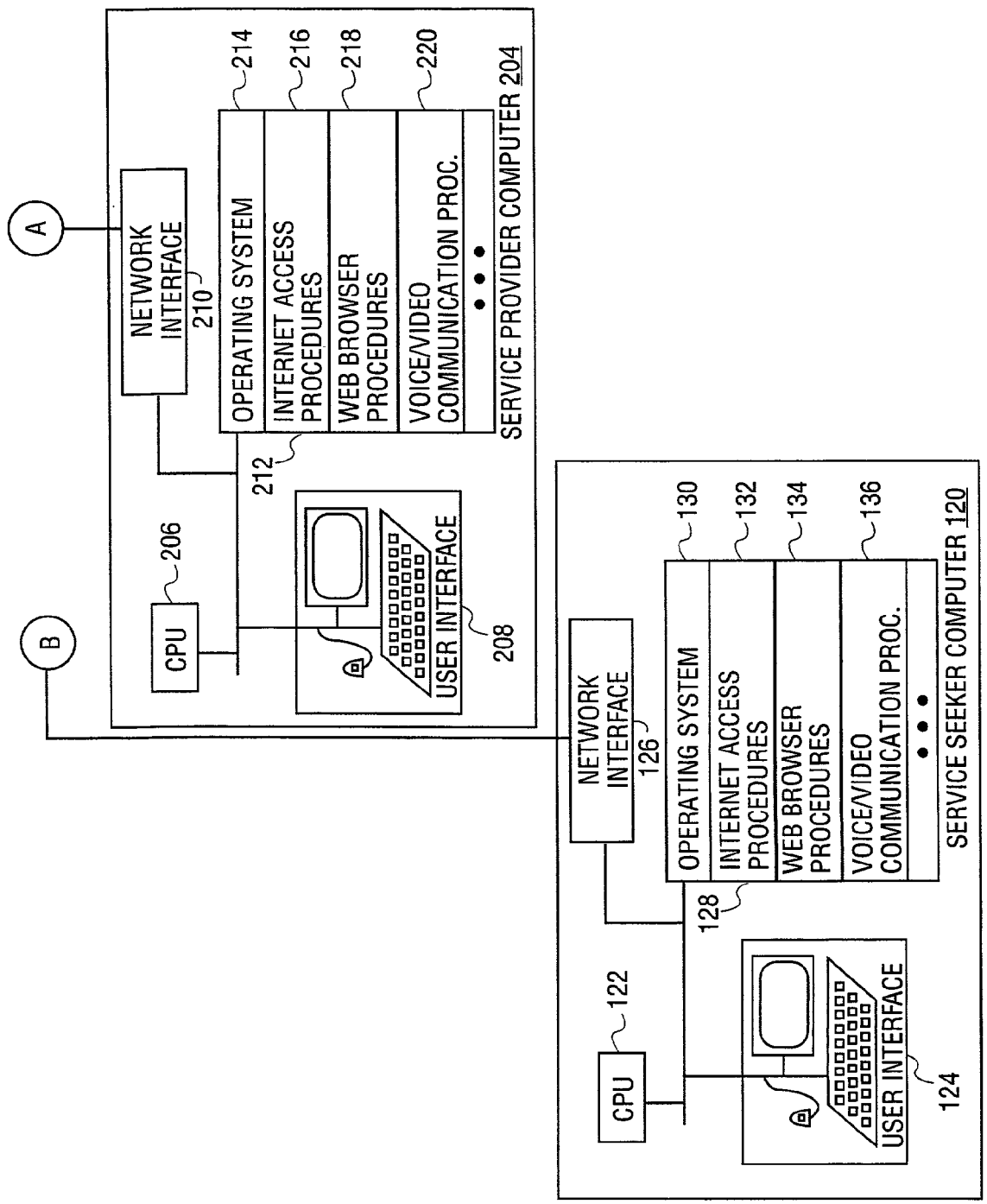

FIG. 2B illustrates the service seeker computer 120, which includes a CPU 122, a user interface 124, a memory 128 and a communications interface 126. The communications interface 126 is used to communicate with the service provider server computer 300, as well as other system resources not shown. Additionally, the service seeker computer may include a microphone as well as a digital video camera, utilized by voice/video procedures 136, for enabling voice over-IP or video over-IP communication between a user 102 and a selected service provider 200.

The memory 128 of the service seeker computer 120 may be implemented as RAM (random access memory) or a combination of RAM, SRAM (synchronous RAM), SDRAM (synchronous data RAM) and non-volatile memory, such as one or more memory modules, storage volumes, or one or more magnetic disk storage units. The memory 128 can contain the following:

an operating system 130;
internet access procedures 132;
web browser procedures 134 for accessing online applications, such as service provider computer 300;
voice/video communication procedures 136 for enabling voice over-IP or video over-IP communication between a user 102 and a selected service provider 200; and
other procedures and files.

FIG. 2B also illustrates the service provider computer 202, which includes a CPU 204, a user interface 206, a memory 210 and a communications interface 208. The communications interface 208 is used to communicate with the voice portal server computer 300, as well as other system resources not shown. Additionally, the service provider may include a microphone as well as a digital video camera, utilized by voice/video communication procedures 220, for enabling voice over-IP or video over-IP communication between a user 102 and a selected service provider 200.

The memory 210 of the service provider computer 202 may be implemented as RAM (random access memory) or a combination of RAM and non-volatile memory, such as SRAM (synchronous RAM), SDRAM (synchronous data RAM) and one or more magnetic disk storage units. The memory 210 can contain the following:

an operating system 212;
internet access procedures 214;
web browser procedures 216 for accessing online applications, such as service provider computer 300;
voice/video communication procedures 216 for enabling voice over-IP or video over-IP communication between a user 102 and a selected service provider 200; and
as well as other procedures and files.

The embodiments depicted in FIGS. 2A and 2B include a service provider database 310 containing information about a wide array of service providers 200. In order to present themselves to their potential clients (service seekers), service providers 200 list themselves in this database 310. In one embodiment, this is done through the use of an Internet web site, via web pages (not shown) provided by the service provider interface procedures 332. The service provider 200 registers his/her name and phone number using the web page, along with a description of the service that he/she offers. The description includes key words describing the field of service. The description also includes a price for rendering the service, most commonly, but not restricted to a per-minute price.

The service provider 200 then informs the system 100 of the times when he/she is available to receive calls. Switching service provider 200 availability status can be done online or through a communications device, such as a telephone. Once the database 310 contains the phone numbers of service providers, descriptions of their services, their prices, and their real-time availability statuses, the audio portal system 100 can provide services to users 102 desiring corresponding services.

In one embodiment a telephone is used as part of the delivery mechanism or communications device 104 and 202 of the system 100. A seeker 102 seeking services (service seekers) dials a central telephone number and then listens to a series of options, including entry of verification information, such as a personal information number (PIN) code. The seeker can select keypad request or voice request to indicate the type of service he would like to receive by speaking the name of a profession, such as "psychiatrist," which is processed by the system's audio interface 308 using audio interface procedures 322.

In an alternate embodiment, the service seeker 102 can listen to a series of professions and press the numerical keypad to select one by selecting a field of service browse option. Accordingly, the system accepts keypad or voice response from a service seeker 102 and continues until the desired field of service is selected. In addition, when known, the service seeker 102 can select a direct connection and provide a service provider ID (telephone extension) of a desired service provider for immediate connection with the selected service provider (as described above).

Once the user 102 has indicated a field of service using the service provider selection procedures 324/326, the system 100 searches its database 310 for service providers in that field. The service provider selection procedures 324/326 allow the user 102 to further narrow the search for a service provider 200 by speaking—or pressing into the telephone keypad—a price, such as "50 cents per minute." The server computer 300 will then narrow the search in the database 310 for service providers 200 that match the price range.

The service seeker 102 can further narrow the search for a service provider 200 by speaking—or pressing into the telephone keypad—a quality rating, such as "three stars or higher." The server computer 300 will then narrow the search in the database 340 for service providers 200 which match the quality rating range. Finally, the user 102 can further narrow the search for a service provider by speaking—or pressing into the telephone keypad—the name of a language, such as "Spanish." The server computer 300 will then narrow the search in the database 310 for service providers 200 who can speak this language.

Once converted, the service provider selection procedures 324 will query the service provider database 310 using the seeker selection in order to provide either service providers within a field of service selected by the user or corresponding service provider selected by the user. Accordingly, in certain embodiments, prior seekers may enter a service provider code number for immediate connection to the service provider. Accordingly, the seeker can avoid delays provided via interface prompts required by new seekers in order to familiarize users with the fields of service available from the audio portal system 100. In one embodiment, if the service provider is not available, the seeker is given the option to connect with the highest rated service provider within the corresponding category. As such, the service provider selection procedures 324/326 include both IVR software, as well as DTMF decoding software, depending on whether the user's responses are provided as voice responses or keypad entry.

Once a service provider 200 with the desired characteristics has been chosen, the service provider system 100 will automatically connect the service seeker 102 with the selected service provider 200, assuming the service provider is available. Once both the service seeker 102 and provider 200 are on the phone line 110, the system 100 conferences the two phone calls together, enabling services to be rendered in a live conversation. The system keeps track of the time spent on the phone call using the conversation monitoring procedures 340. The service seeker 102 is then billed accordingly, and the funds are transferred to the provider 200 using the billing procedures 328. In addition, a transaction record is generated within the transaction by using the transaction DB procedures 348.

Referring now to FIG. 3, FIG. 3 depicts a category listing page 500, which is utilized by service seekers in order to select service providers within a category desired by the service seeker in accordance with one embodiment of the present invention. As described above, a service seeker views the screen 500 via an online interface of the service provider system 100, as depicted in FIGS. 1-2B. As indicated, the service seeker has selected the category "water sports" within "Sports and Recreation" and has received a listing of four service seekers.

However, in contrast to the live advice communication connection methods described above, the category listings within listings page 500 include the capability to request an appointment with a selected service provider. For example, referring to record 502, the service provider is "Turtle" 506, with a category of Surfboard Design 508. At the time that the service seeker is viewing the listing page 500, Turtle is available and can be contacted by clicking on the "Call Now" button 504. Accordingly, this record coincides with the methods for live advice communication described above.

Conversely, referring to record 510, the service provider "Bodazafa" 514 is currently away, but has selected the option to request appointments, as indicated by the request appointments link 510. As such, a service seeker may request an appointment with Bodazafa, which is received, scheduled and eventually performed utilizing the appointment generation procedures 334, as described above utilizing, for example, the appointment request procedures 344, the appointment acceptances procedures 346 and the appointment schedule procedures 336.

Referring now to FIG. 4, FIG. 4 depicts an available speaker expanded listing page 530, which is presented to a service seeker after clicking on the Surfboard Design link 508. As such, the expanded listing page 530 lists the selected service provider Turtle 506 with a description of what Turtle can provide. As can be seen in the embodiment described, Turtle is currently available, so live advice communication can be immediately selected, such that the service seeker can be immediately connected with Turtle for a live advice communication via communications devices, such as for example, telephones. However, if the service seeker desires to request an appointment with Turtle, the service seeker can either click the Request Appointment link 534 or click on the Request Appointment button 536 based on a review of the service provider's schedule 538.

As depicted, the service provider Turtle 506 has elected to select the online appointments option and therefore enable service seekers to request appointments for the service provider at their desired times. However, referring again to FIG. 3, record 526 illustrates the service provider "Burkhart" 528, which has declined to select the receive appointments option. As a result, record 526 is limited to the Send Mail option 524. As a result, service seekers can send an e-mail to Burkhart indicating their desire to engage in an appointment or receive e-mail contact from the selected service provider to engage in an advice communication.

Referring now to FIG. 5, FIG. 5 depicts an unavailable speaker expanded listing page 550, which is presented to the user following clicking on the "Socal Surfing" link 516 of the selected service provider Bodazafa 514. In contrast to FIG. 4, Bodazafa is currently unavailable, however, the service seeker can request an appointment with Bodazafa by clicking on the Request Appointment button 552 or 556 or clicking on the link 554 following review of the service provider Bodazafa's schedule 558. Accordingly, these options provide service seekers with the ability to receive live advice communication at a time that is more suitable to their schedule.

In one embodiment, the speaker may limit selected appointment times to the speaker's scheduled times of availability 558. Alternatively, the seeker may select any appointment time for engaging in an advice communication with the selected speaker. Accordingly, by selecting the receive appointments option, the service provider can choose the appointments that he/she desires to engage in and can use this feature to filter out undesired service seekers. In addition, by providing service seekers with the ability to select any desired appointment time, the speaker can gauge which appointment times are most popular with seekers and adjust speaker's schedule accordingly.

Referring now to FIG. 6, FIG. 6 depicts an appointment e-mail option screen 570 which is presented to a seeker when clicking on a call button at that external web site (not shown). Assuming that the service provider Burkhart 528 had selected the Request Appointment Receipt option, the service provider receives appointment requests, via e-mail, by enabling service seekers to click the checkbox 572, which indicates "check here if you want to request an appointment with Burkhart". In one embodiment, the speaker is also provided the option to request an appointment, via e-mail, in response to an e-mail screen, for example, as depicted in FIG. 6. This features enables the service provider to present seekers with the option requests appointment when initiating a line advice call from an external web page for an unavailable speaker.

Referring now to FIG. 7A, FIG. 7A depicts an appointment time selection page screen 600, which is presented to a service seeker in response to an appointment request. In one embodiment, the service seeker is limited to selecting appointment times that fall within the service provider's schedule. Alternatively, the seeker can select any appointment time in which the service seeker desires to engage in a live advice communication with the selected service provider (as described above). In the embodiment depicted, and as will be illustrated by screens 7A through 11B, the service seeker is required to chose a time, verify the service seeker's telephone number, place a deposit and once the deposit is placed, send the appointment request to the selected service provider.

However, as illustrated in FIG. 7B, if the service seeker is a first time user, the service seeker is presented with the service provider system membership screen 610 for opening up a membership with the service provider system. Once such information is provided, the user may be presented a service provider unavailable at appointment time screen 620 (see FIG. 8), which is provided when the appointment time selected by the service seeker overlaps with a schedule line advice communication appointment time of the selected speaker. In one embodiment, screen 620 is also presented to the seeker when a selected appointment time does not coincide with the selected service provider's appointment schedule. As such, the service seeker will be presented with the screen 620 until an available time of the service provider coincides with a desired appointment time of the service seeker.

Once an appointment time is selected, the service seeker is presented with a service seeker telephone number request screen 630, as illustrated in FIG. 9A, assuming that the system does not have a current telephone number for the service seeker. Such would be the case for new users of the service provider system 100. Alternatively, as depicted in FIG. 9B, a service seeker telephone number verification screen 640 is presented to the service seeker in order to verify that the system telephone number for the service seeker is correct. As such, once the telephone number of the service seeker is verified, the service seeker is presented with an appointment deposit request screen 630, as depicted in FIG. 9A.

As depicted in FIG. 10A, the appointment deposit request screen 650-A is presented to a requesting seeker when the selected service provider has elected to require a non-refundable deposit amount from requesting seekers. As illustrated, FIG. 10A is presented to requesting seekers when the seekers has payment card on file with the system, such as a credit card. However, when a requesting seeker does not have a payment card on file, the select deposit payment type screen 650-B, as depicted in FIG. 10C, is presented to the seeker. In one embodiment, the deposit is non-refundable unless the appointment is cancelled or missed by the speaker or cancelled by the seeker up to a predetermined amount of time prior to the selected appointment time such as, for example, 24 hours. In one embodiment, the predetermined time is selected by the service provider.

Alternatively, as depicted in FIG. 10B, the system 100 generates a deposit amount to be added to the service seeker's account in order to ensure that the service seeker can engage in a live advice communication with the service provider at the selected appointment time. Accordingly, appointment deposit request screen 650-B (FIG. 10B) is presented to the requesting seeker when the seeker has a payment card on file with the system. Otherwise, the select deposit payment type screen 660-B is presented to the seeker. In one embodiment, the system will require a deposit when the seeker has less than a pre-determined amount in their account. Accordingly, as depicted in FIGS. 10C and 10D, the service seeker will enter in a credit card or debit card number, which is utilized by the system in order to provide a deposit equal to the service provider selected amount or the system generated deposit amount, respectively.

Figure 11A:
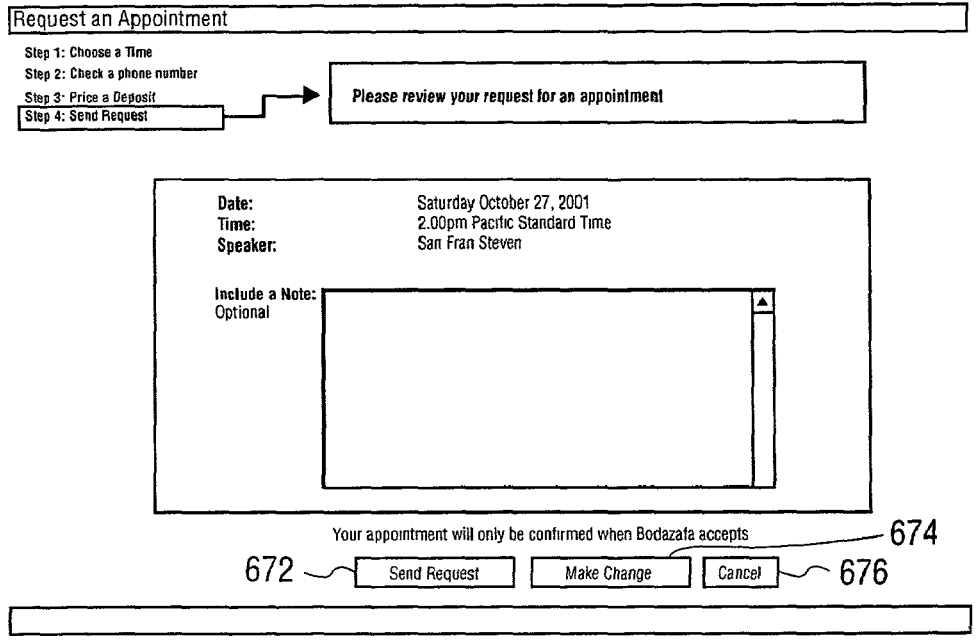
FIGS. 11A and 11B depict appointment request review screens and confirmation screens in response to an appointment request for a selected service provider in accordance with an exemplary embodiment of the present invention.
Figure 11B:
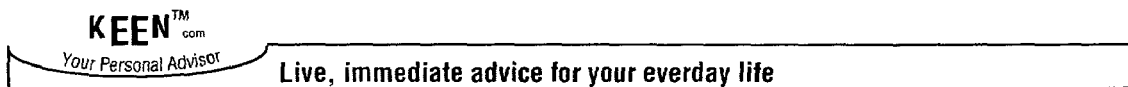

Finally, referring to FIG. 11A, once the deposit amount is complied with, the appointment request review screen 670 will illustrate the appointment request. Once illustrated, the user can make changes, send the request or cancel by clicking on the various options from the screen. Once the request is sent, the appointment confirmation screen 680, as depicted in FIG. 11B, is presented to the user. However, until the service provider accepts the appointment, the appointment confirmation screen is really a pending appointment.

Referring now to FIG. 12, FIG. 12 depicts a service seeker appointment screen 690, which illustrates each appointment request that the service seeker has made to a selected service provider and will indicate a status of the request. As illustrated, the status is either "Accepted", "Pending" or "Cancelled" (see col. 690). This enables the service seeker to keep track of their various appointment requests and to determine whether appointment requests have been accepted by the selected service provider. As such, the service seeker can expect a call from the service provider system 100 for all accepted appointments. The appointments screen 690 also includes any required deposit amount in column 694.

Referring now to FIG. 13A, FIG. 13A depicts a service provider management screen 700, in accordance with one embodiment of the present invention. As illustrated, the service provider management screen is for service provider Bodazafa. As such, Bodazafa may view the service provider management screen and select availability options 702, as well as view any pending appointments, as well as next scheduled appointments under the "My Appointments" portion 706. However, as illustrated in FIG. 13B, the "My Availability" portion of the service provider management screen 700 includes an option to start accepting appointments 712. Such an option is presented to service providers that have elected to decline receipt of appointments from service seekers.

As illustrated by FIGS. 14A and 14B, if the service provider (speaker) desires to start accepting appointments by clicking on the appointments option 712 (FIG. 13B), the service provider will be presented with the appointment option limitation screen 720. Next, the speaker would click on the "Preferences" link 721 to display the appointment activation screen 722. The appointments activation screen 720 enables the service provider to select two options for receiving appointments. The first option enables the service provider to display links on the service provider's listings for customers (see category listing page 500 FIG. 3) to request appointments by clicking on buttons 722 as either a yes or no to the option.

Figure 15:
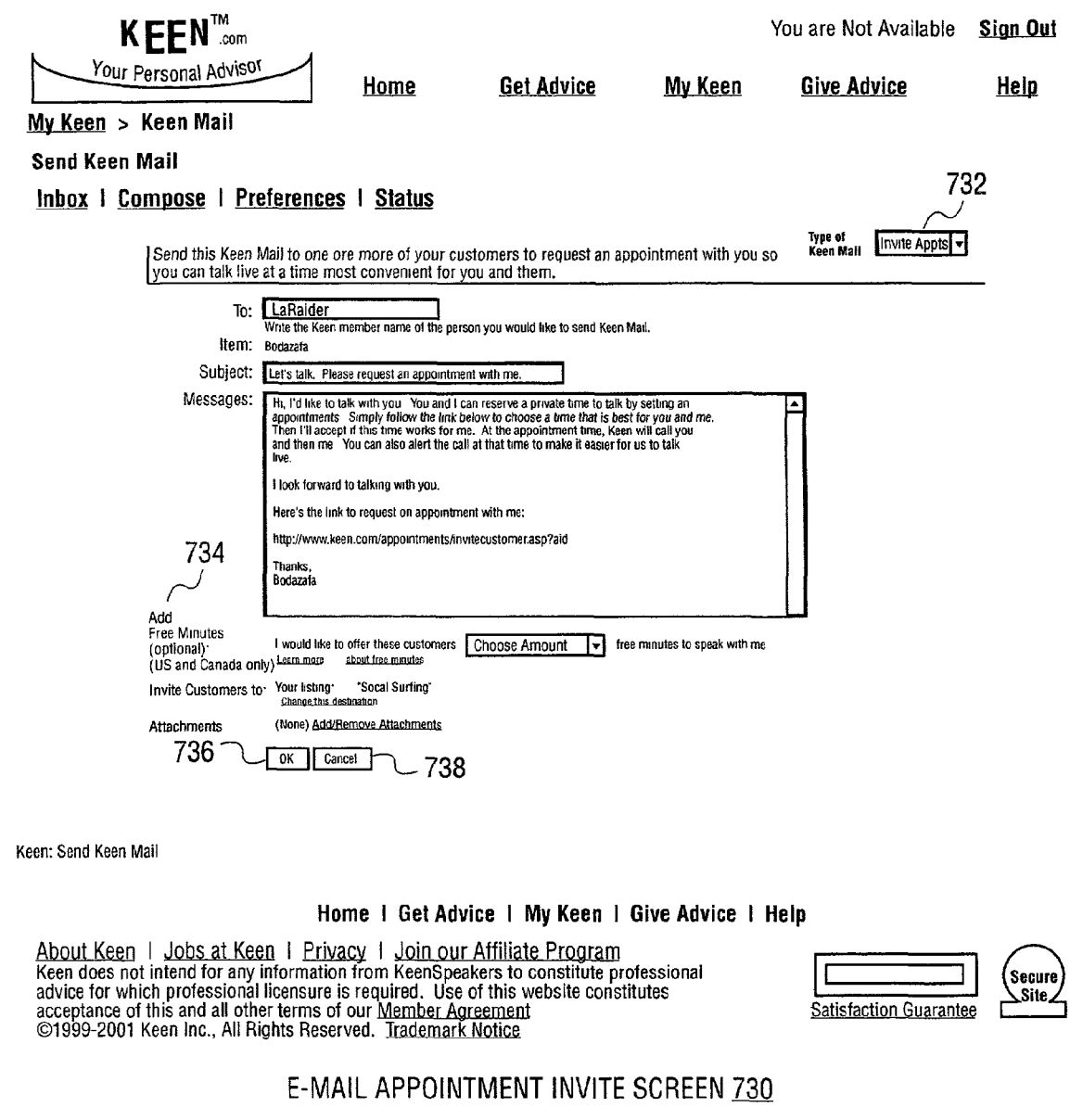

In addition, or alternatively, the service provider may select the "Send Keen Mail" option 724 to invite seekers to request appointments, for example, as depicted in FIG. 15. In addition, the appointment activation screen 722 includes a link 726 to a service provider appointment screen as will be described in further detail below. Finally, the activation screen 722 enables the speaker to require the requesting seeker to provide a deposit amount, which is non-refundable assuming a live advice communication is completed therebetween, as described.

Referring now to FIG. 15, FIG. 15 depicts an e-mail appointment invite screen 730, which is utilized by service providers to invite service seekers to request appointments with the service provider. This option will be used for service seekers that are not familiar with the appointments option and can be selected by selecting the link "Invite Appointments" 732. In addition, the service provider may select the "Add Free Minutes" option 734 in order to provider service seekers with incentives for requesting appointments. Once the e-mail appointment invite screen is filled-in, the user (service provider 514) can send the invite to one or more service seekers.

Referring now to FIGS. 16A and 16B, FIG. 16A depicts a service seeker appointment screen 740, which illustrates each appointment requested or accepted by the service provider, as well as all pending appointments which the service provider has not chosen to accept or decline. In addition, as depicted in FIG. 16B, service providers may also become service seekers by requesting appointments with additional service providers available from the service provider system 100. Accordingly, the appointment screens 740 and 750 enable service providers to gauge interest in the category information they provide and also enable service providers with the option to accept the appointments they desire.

Figure 17:
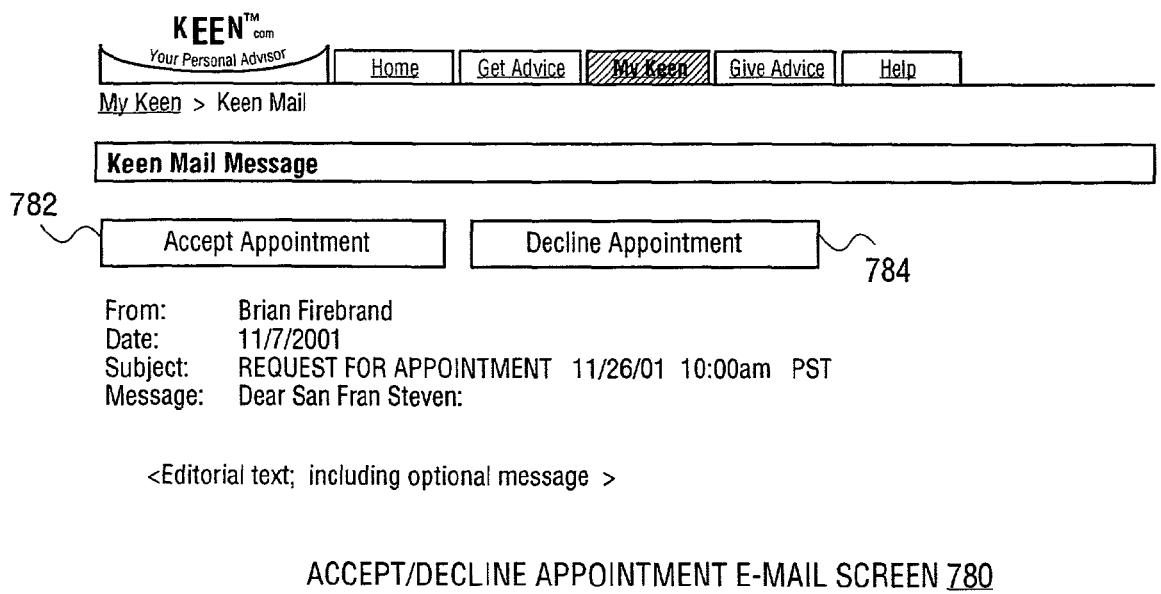
FIG. 17 depicts an e-mail appointment request screen in accordance with a further embodiment of the present invention.

In fact, in one embodiment, a service provider could completely eliminate live advice availability and strictly limit contact to service seekers via appointment requests. This capability to accept or decline appointments is further illustrated via the "ACCEPT/DECLINE Appointment E-Mail" screen 760, as depicted in FIG. 17. In one embodiment, once the seeker confirms their appointment request (see FIG. 11B), the service provider will receive an e-mail including a button 622 for accepting the appointment or button 624 for declining the appointment. In addition, the appointment request may be accepted via screens 740 and 750 (FIGS. 16A and 16B).

Figure 18C:
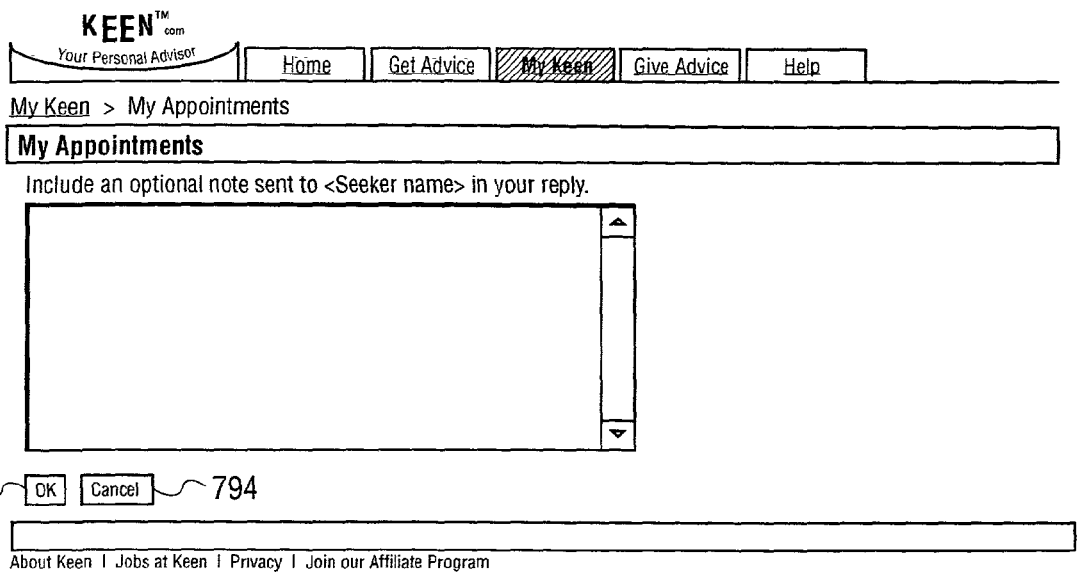

Once the speaker decides to either accept or decline the appointment request, the speaker will be presented with either FIG. 18A, for a service provider acceptance screen, or FIG. 18B, the service provider declination appointment screen 780. Once the option is performed or selected, as depicted in FIG. 18C, the service provider has the option to include some notes within the Notes Appointment screen 790, based on their response to the appointment request. As such, the various screens described from FIG. 3 through FIG. 18C, enable service providers with the option to receive appointment requests. These appointment requests may be utilized by service providers to select times which are ideal for the service provider.

In addition, the service providers are able to gauge interests in the category information with which they are familiar as well as determining which appointment times are popular with seekers and adjusting their schedule accordingly. Therefore, service seekers of the service provider system can receive live advice at a time that is both beneficial to themselves as well as the service provider. In addition, the service seekers are provided with the option to ensure a live advice communication with more popular service providers. In doing so, the service provider system will ensure that live advice communications are performed, which will generate increased commissions for both the service provider system, as well as the service providers themselves. Procedural methods for implementing the teachings of the present invention are now described.

Operation

Figure 19:
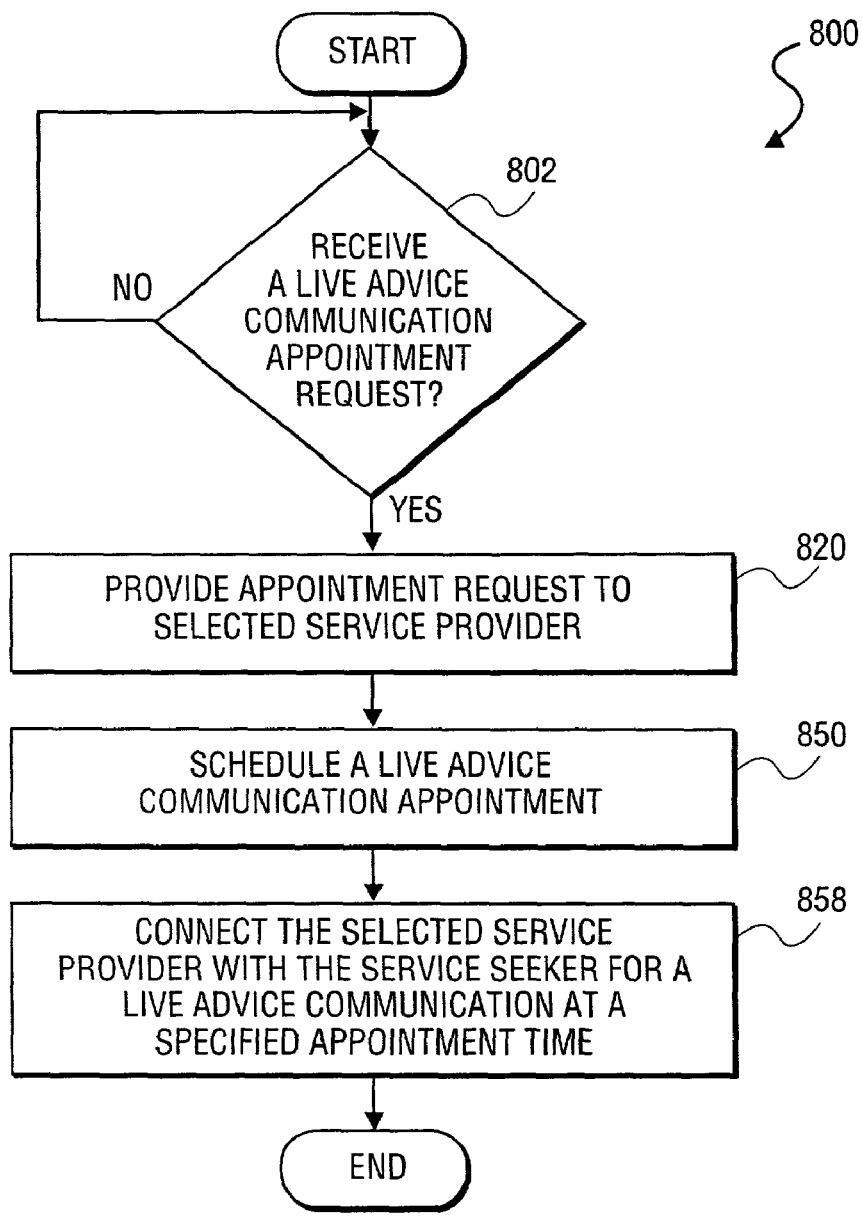
FIG. 19 depicts a flowchart illustrating a method for scheduling appointments with a selected service provider available from a service provider system in accordance with one embodiment of the present invention.

Referring now to FIG. 19, FIG. 19 depicts a flowchart illustrating a method 800 for requesting an appointment with a selected service provider (speaker 200) to engage in a live advice communication with a requesting service seeker (seeker 102) at a specified appointment time within, for example, the service provider system 100, as depicted in FIGS. 1 through 2B. As will be described in further detail below, the appointment request option can be utilized when a selected service provider is unavailable. However, in situations where the service provider is available, the service seeker is still afforded the option to select an appointment time that is desired by the service seeker when this option is elected by the service provider.

Accordingly, at process block 802, an appointment request is received from a service seeker, including a specified appointment time. Once received, at process block 820, the appointment request is provided to the selected service provider. As such, once the appointment request is accepted by the selected service provider, at process block 850, the service provider system will schedule a live advice communication appointment between the service seeker and the selected service provider. Finally, at process block 858, the service provider system will connect the service seeker and the selected service provider for a live advice communication at the specified appointment time.

Figure 20:
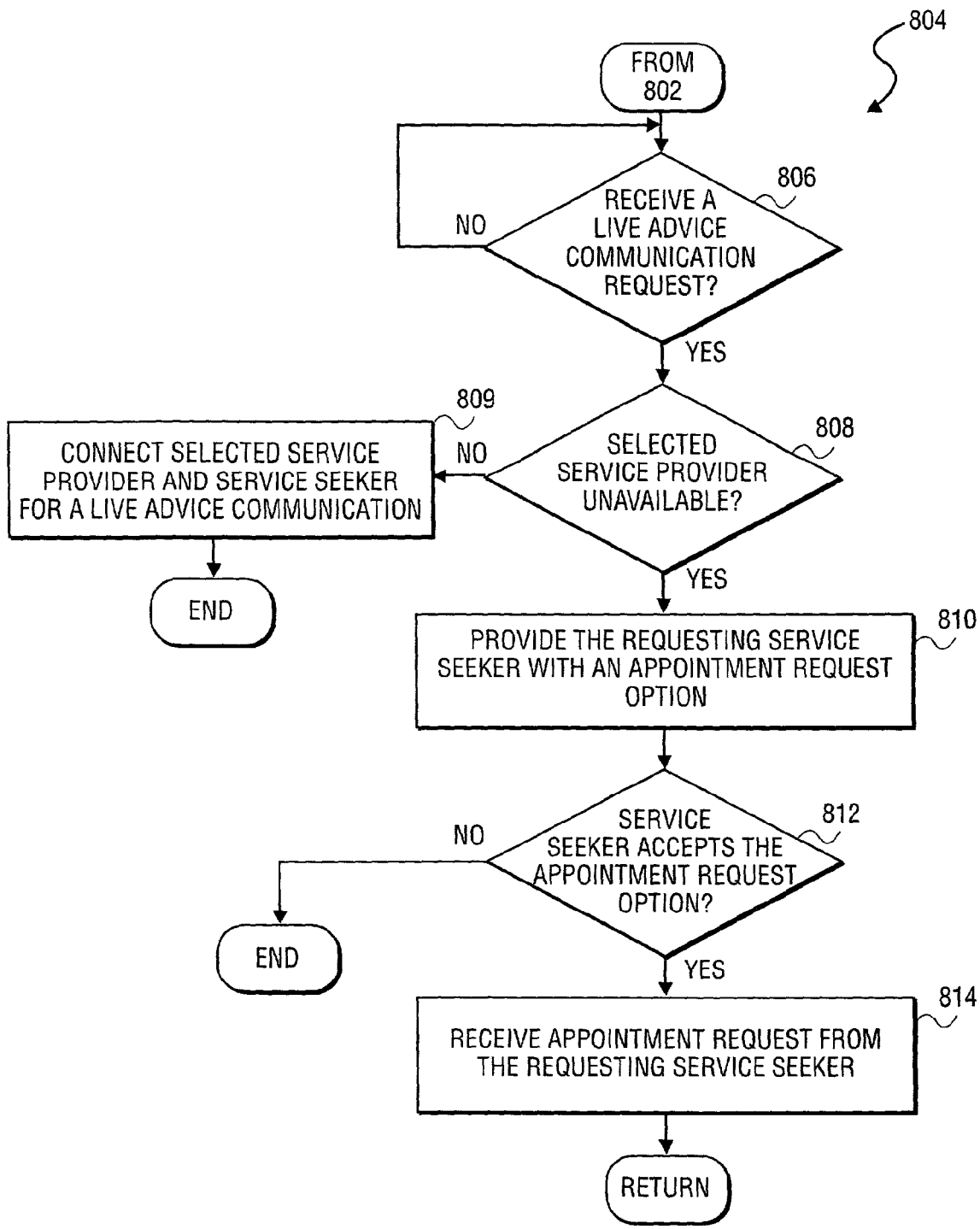
FIG. 20 depicts a flowchart illustrating an additional method for receiving an appointment request in accordance with a further embodiment of the present invention.

Referring now to FIG. 20, FIG. 20 depicts a flowchart illustrating an additional method 804 for receiving the appointment request of process block 802, as depicted in FIG. 19. At process block 806, it is determined whether a live advice communication request is received, utilizing, for example, the appointment request procedures 344. Once received, at process block 808, it is determined whether the service provider is available at the requested appointment time. If the service provider is unavailable at the selected appointment time, at process block 810, the service seeker is presented with an appointment request option, utilizing, for example, the appointment generation procedures 334. Next, at process block 812, it is determined whether the service seeker has accepted the appointment request option. Once the appointment request option is accepted, at process block 814, the service provider system will receive an appointment request from the requesting service seeker.

Figure 21:
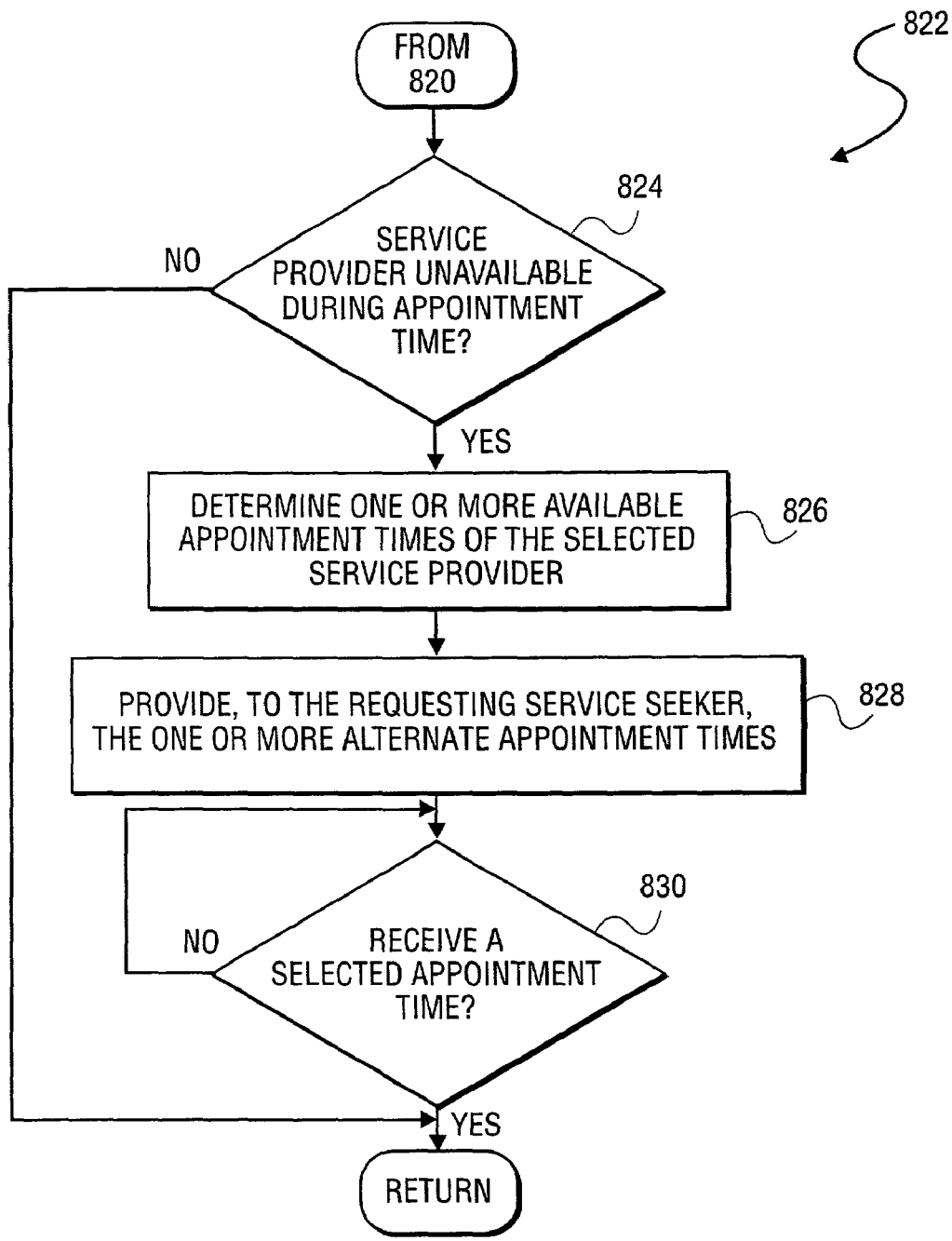
FIG. 21 depicts a flowchart illustrating an additional method for providing appointment requests to a service provider in accordance with a further embodiment of the present invention.

Referring now to FIG. 21, FIG. 21 depicts a flowchart illustrating an additional method 822 for providing the appointment requests to the selected service provider of process block 820, as depicted in FIG. 19. At process block 824, it is determined whether the service provider is available during the specified appointment time. Availability times generally include non-scheduled appointment times, but may also be limited to the times listed in the selected speaker's schedule. When the service provider is unavailable during the appointment time, the appointment request procedures 344 will determine one or more alternate appointment times for the service provider. Once determined, at process block 828, the alternate appointment times are provided to the requesting service seeker. Next, at process block 830, it is determined whether the requesting service seeker has selected an appointment time from the one or more alternate appointment times. Once selected, control flow returns to process block 820, as depicted in FIG. 19.

Figure 22:
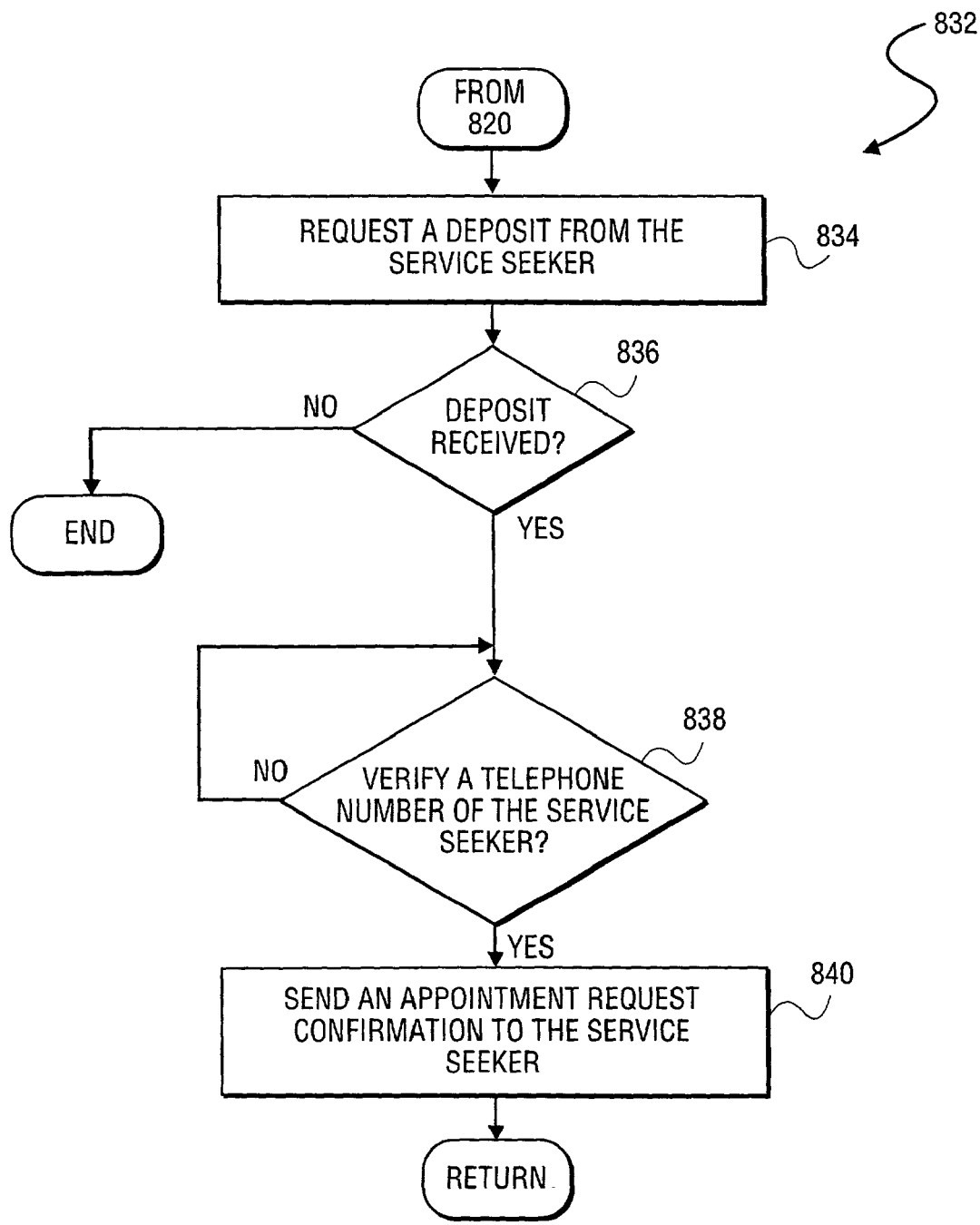
FIG. 22 depicts a flowchart illustrating an additional method for providing an appointment request to a selected service provider in accordance with a further embodiment of the present invention.

Referring now to FIG. 22, FIG. 22 depicts a flowchart illustrating an additional method 832 for providing the appointment request to the selected service provider of process block 820, as depicted in FIG. 19. At process block 834, a deposit is requested from the service seeker. In one embodiment, the deposit may be requested by either the selected service provider, or the system 100, when the seeker has less than a pre-determined amount in their account. Next, at process block 836, it is determined whether a deposit is received from the service seeker. Once received, at process block 838, it is determined whether a system telephone number of the service seeker is correct. Once the telephone number is verified, at process block 840, an appointment request confirmation is sent to the service seeker. As such, process block 834 through 840, in one embodiment, are performed by the appointment acceptance procedures 346.

Figure 23:
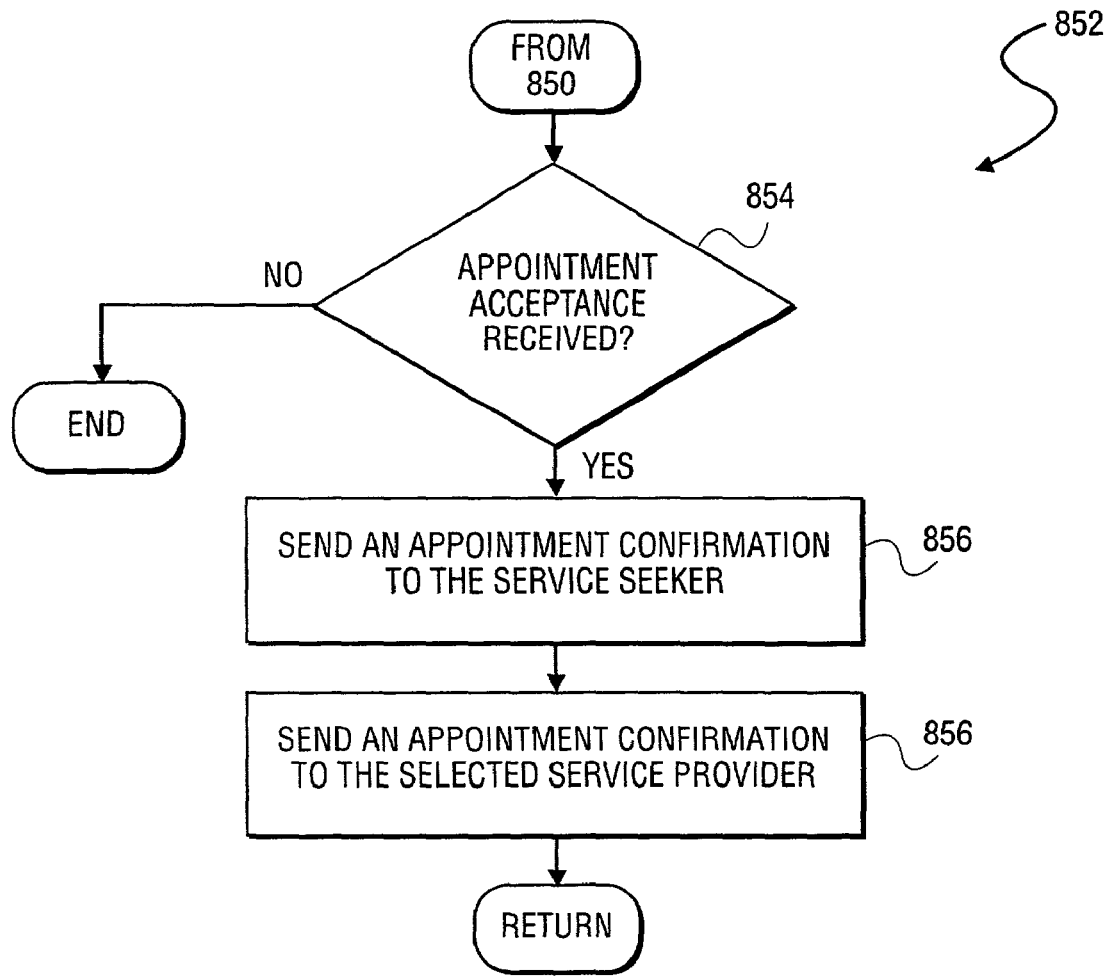
FIG. 23 depicts a flowchart illustrating an additional method for scheduling a live advice communication in response to an accepted appointment request in accordance with a further embodiment of the present invention.

Referring now to FIG. 23, FIG. 23 depicts a flowchart illustrating an additional method for scheduling the live advice communication appointment of process block 850, utilizing, for example, the appointment scheduling procedures 336. At process block 854, it is determined whether an appointment acceptance is received from the selected service provider. Once received, at process block 856, an appointment confirmation is sent to the service seeker. Finally, at process block 856, an appointment confirmation is sent to the selected service provider. As such, once confirmations are performed using the appointment acceptance procedures 346, the appointment scheduling procedures will schedule a live advice communication. Accordingly, when the service provider system 100 determines that the selected appointment time has arrived, the system 100 will contact both the service seeker and the selected service provider for a live advice communication via communications mediums, such as for example, telephones.

Figure 24:
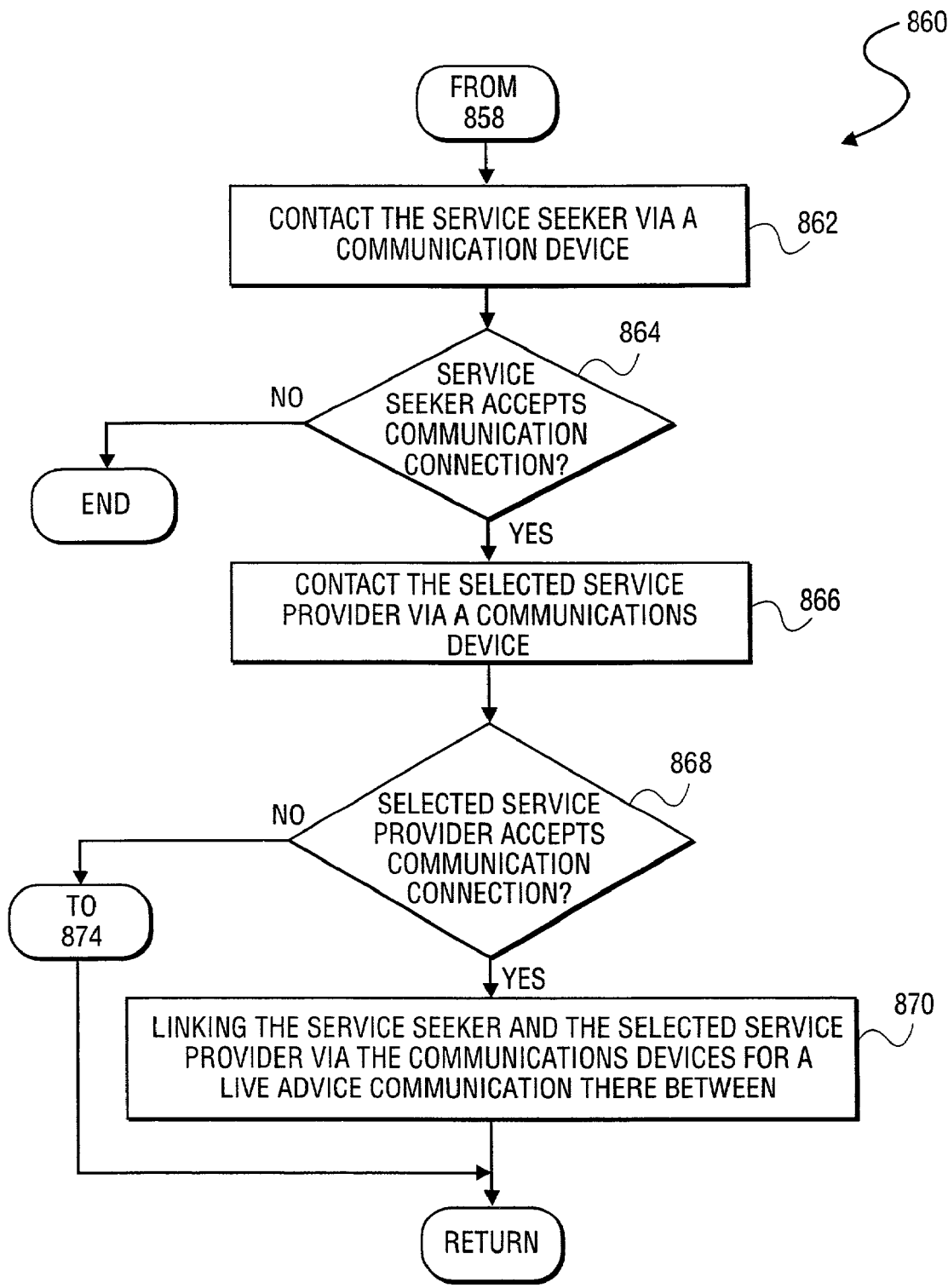
FIG. 24 depicts a flowchart illustrating an additional method for connecting a selected service provider with a service seeker in response to an appointment request and in accordance with an exemplary embodiment of the present invention.

Referring now to FIG. 24, FIG. 24 depicts a flowchart illustrating an additional method 860 for connecting the selected service provider and a requesting service seeker of process block 858, as depicted in FIG. 19. At process block 862, the system will contact the service seeker via a communications device with a communications connection request, such as a recorded greeting. Next, at process block 864, it is determined whether the service seeker accepts the communications connection from the service provider system. In one embodiment, the service seeker is provided with a telephone keypad option for accepting/rejecting the communications connection request.

Figure 25:
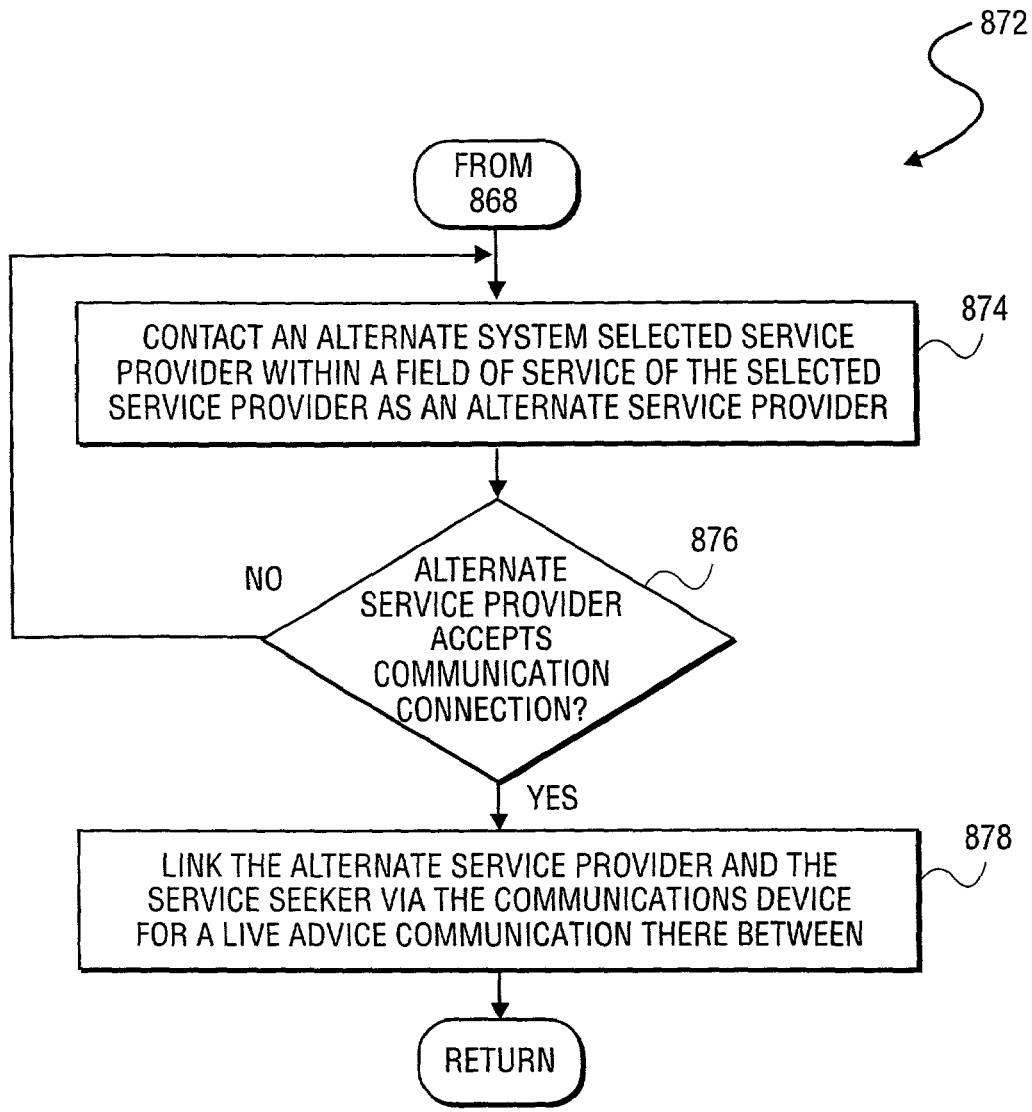
FIG. 25 depicts a flowchart illustrating an additional method for linking a selected service provider and a service seeker in response to an appointment request and in accordance with a further embodiment of the present invention.

Once accepted, at process block 866, the system will contact the selected service provider via a communications device, such as for example, communications interface 308. Next, at process block 868, it is determined whether the selected service provider accepts the communications connection. Assuming the communications connection is accepted, at process block 870, the service provider system will link the communications devices of the service seeker and the service provider for a live advice communication therebetween. Otherwise, control flow branches to process block 874, as depicted in FIG. 25. In one embodiment, dual tone multi-frequency (DTMF) signals are decoded to determine seeker/speaker 102/200 responses. Once affirmative responses are received, the communications interface 308 links the communication devices 104/202.

Referring now to FIG. 25, FIG. 25 depicts a flowchart illustrating an additional method 872 for linking the selected service seeker and service provider of process block 868, as depicted in FIG. 24. At process block 874, the service provider system will contact an alternate system selected service provider within a field of service of the selected service provider. Next, at process block 876, process block 874 is repeated until an alternate service provider accepts a communications connection from the service provider system. Once accepted, at process block 878, the service provider system will link the communications devices of the service seeker and the alternate service provider for a live advice communication therebetween. In one embodiment, when the service provider declines an appointment request and invokes method 872, the system will compensate the service seeker with a gift, which is deducted from the selected service provider.

Figure 26:
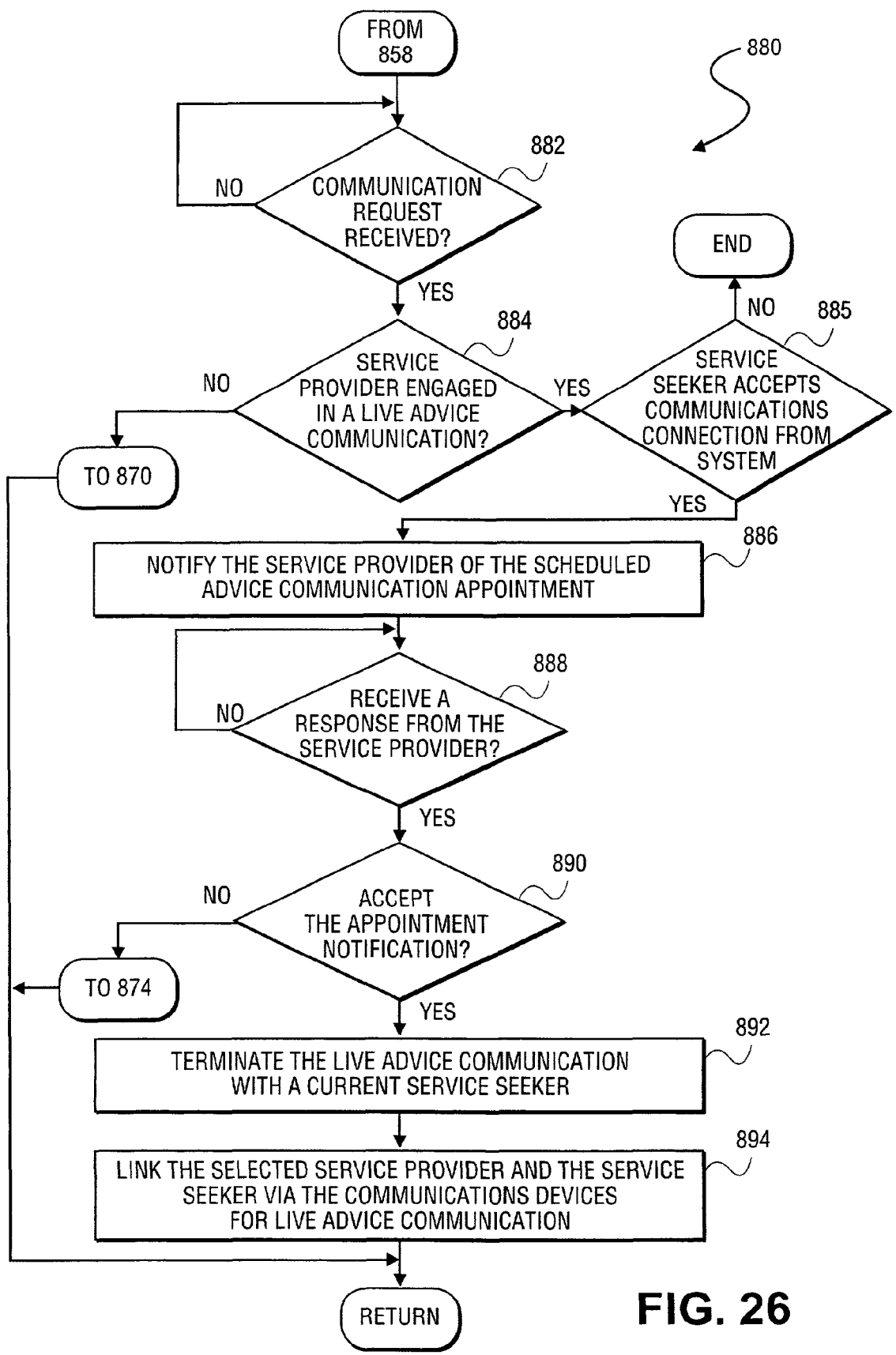
FIG. 26 depicts a flowchart illustrating a method for connecting a service provider with a system-selected alternate service provider when a selected service provider declines a previously-accepted appointment request, in accordance with an exemplary embodiment of the present invention.

Referring now to FIG. 26, FIG. 26 depicts a flowchart for an additional method 880 for linking a service seeker with a selected service provider when the service provider is engaged in an advise communication with a current service seeker, at the requested appointment time. At process block 882, it is determined whether a communications request is received. Once the communications request is received, at process block 884, it is determined whether the service provider is engaged in a live advice communication during receipt of the communications request. When such is the case, at process block 885 it is determined whether the requesting service seeker accepts a communications connection from the system 100 at the selected appointment time. If the service seeker declines the communication connection request, the system will terminate appointment notification with the service provider and allow the speaker to continue with their advice communication. Once accepted, at process block 886, the service provider is notified of the scheduled advice communication appointment.

Next, at process block 888, it is determined whether a response is received from the service provider 200. Once the response is received, at process block 890, it is determined whether the service provider 200 has accepted the appointment notification. When the service provider 200 fails to accept appointment notification, control flow branches to process block 874 of FIG. 25. Otherwise, at process block 892, the live advice communication with a current service seeker is terminated. Finally, at process block 894, the service provider system links the communications devices of the service seeker and the service provider for a live advice communication therebetween.

Figure 27:
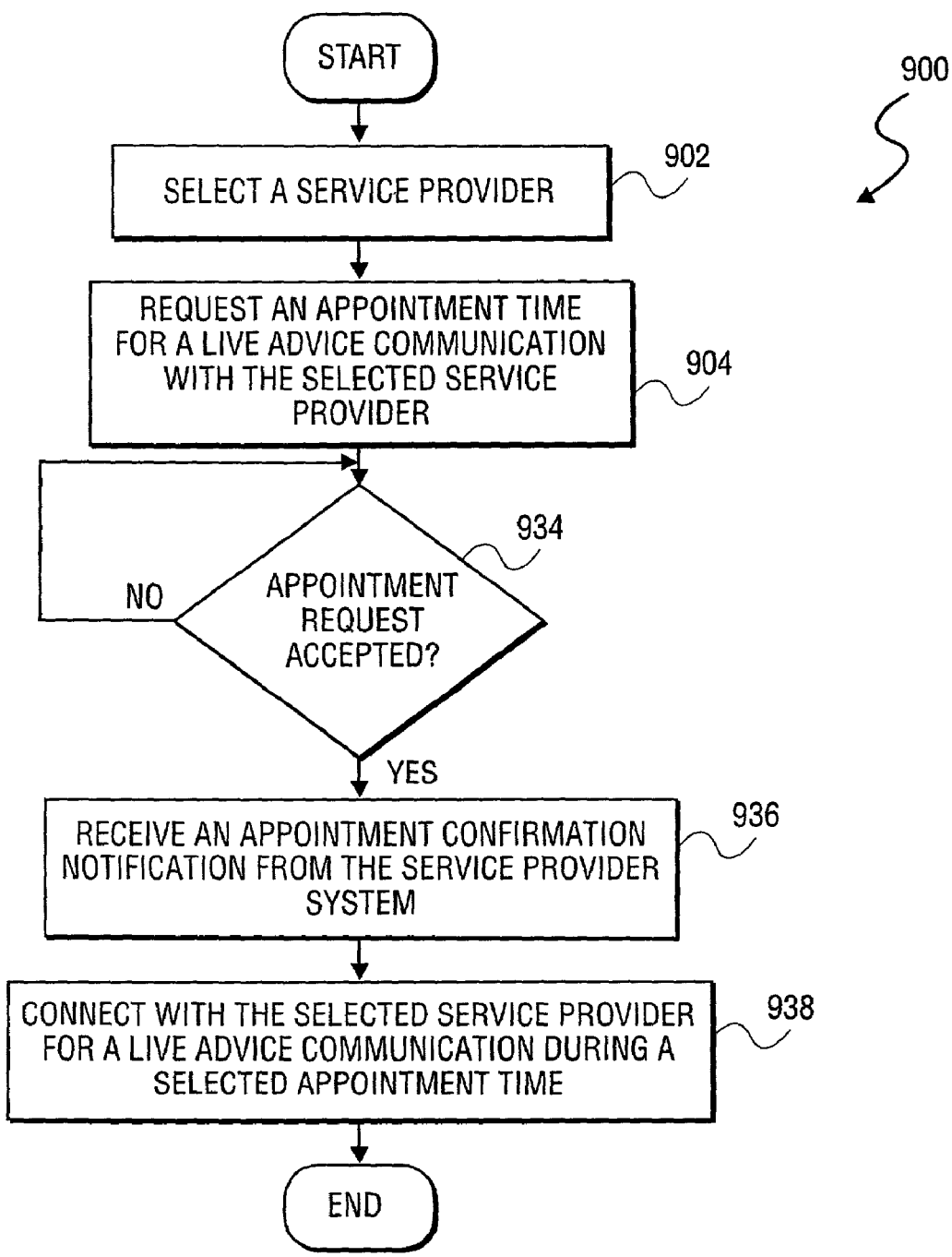
FIG. 27 depicts a method for accessing a service provider system in order to provide an appointment request with a selected service provider and engage in an advice communication with the selected service provider during a selected appointment time, in accordance with one embodiment of the present invention.

Referring now to FIG. 27, FIG. 27 depicts a method 900 for requesting an appointment with a selected service provider from a service provider system and engaging in a live advice communication with the selected service provider during a selected appointment time within, for example, a service provider system as depicted in FIGS. 1 through 2B. At process block 902, a service provider is selected from a field of service available from a service provider system, such as service provider system 100, as depicted in FIGS. 1 through 2B. Once selected, at process block 904, an appointment is requested with the selected service provider during a selected appointment time.

Next, at process block 934, it is determined whether the appointment is accepted by the selected service provider. Once the appointment is accepted by the selected service provider, at process block 936, a service seeker receives an appointment confirmation notification from the service provider system 100. Finally, at process block 938, the selected service provider is connected with the service seeker for a live advice communication via the service provider system during the selected appointment time.

Figure 28:
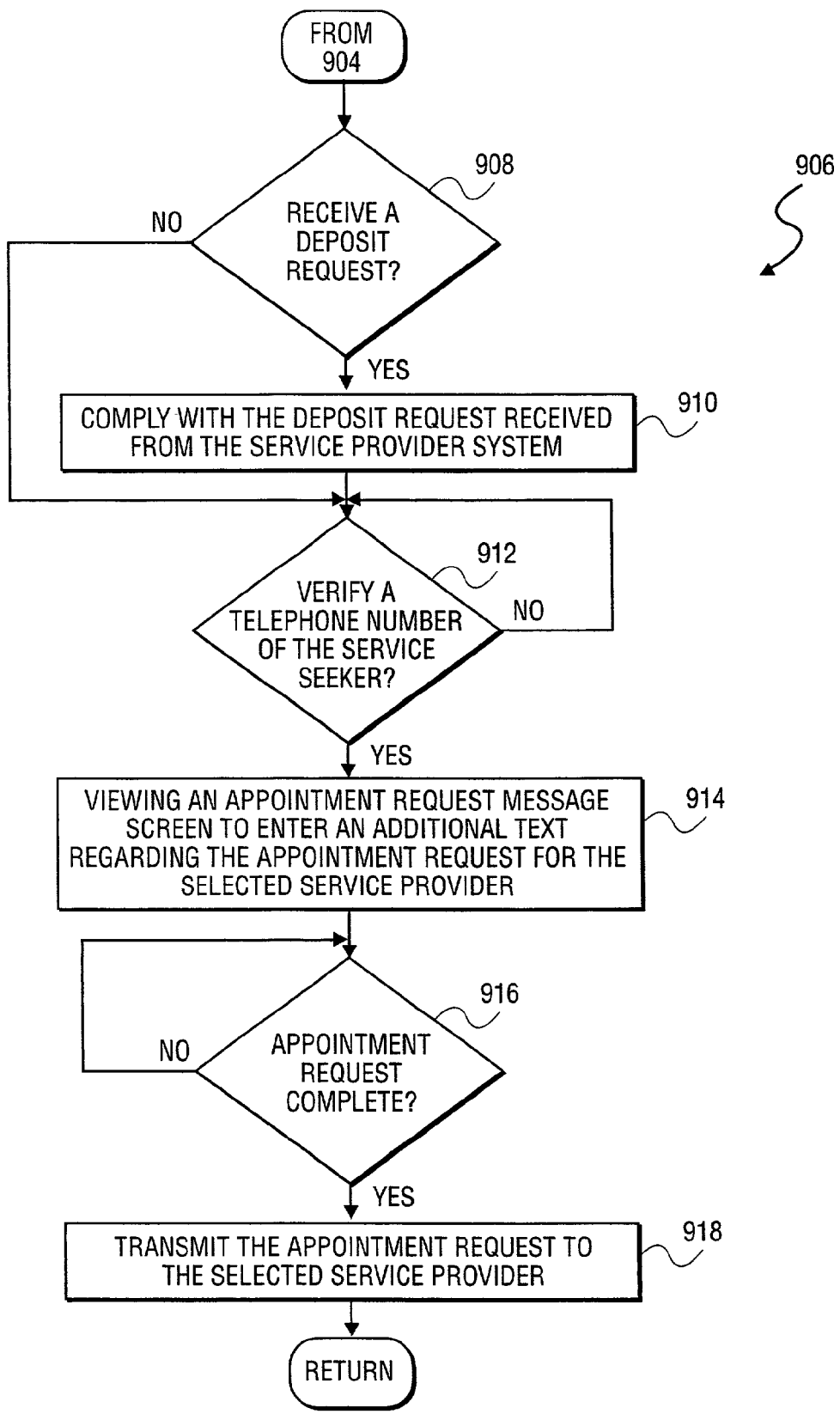
FIG. 28 depicts a flowchart illustrating an additional method for requesting an appointment with a selected service provider in accordance with a further embodiment of the present invention.

Referring now to FIG. 28, FIG. 28 depicts a flowchart illustrating an additional method for requesting an appointment of process block 904 as depicted in FIG. 27. At process block 908, it is determined whether a deposit request is received from the service provider system 100. When the deposit request is received, at process block 910, the service seeker complies with the deposit request received from the service provider system by, for example, providing a credit card deposit to ensure a live advice communication with the selected service provider at the selected appointment time, for example, as depicted in FIGS. 9A and 9B. Next, at process block 914, a telephone number of the service seeker is verified.

Once verified, at process block 914, an appointment request message screen 670 is viewed by the service seeker to enter in additional text regarding the appointment request for the selected service provider, for example, as depicted in FIG. 11A. At process block 916, it is determined whether the appointment request is complete. Once the appointment request has been completed, at process block 918, the appointment request is transmitted to the selected service provider by the service provider system 100. Accordingly, the method of process block 906 is performed in one embodiment utilizing appointment acceptance procedures 346, as depicted in FIG. 2A.

Figure 29:
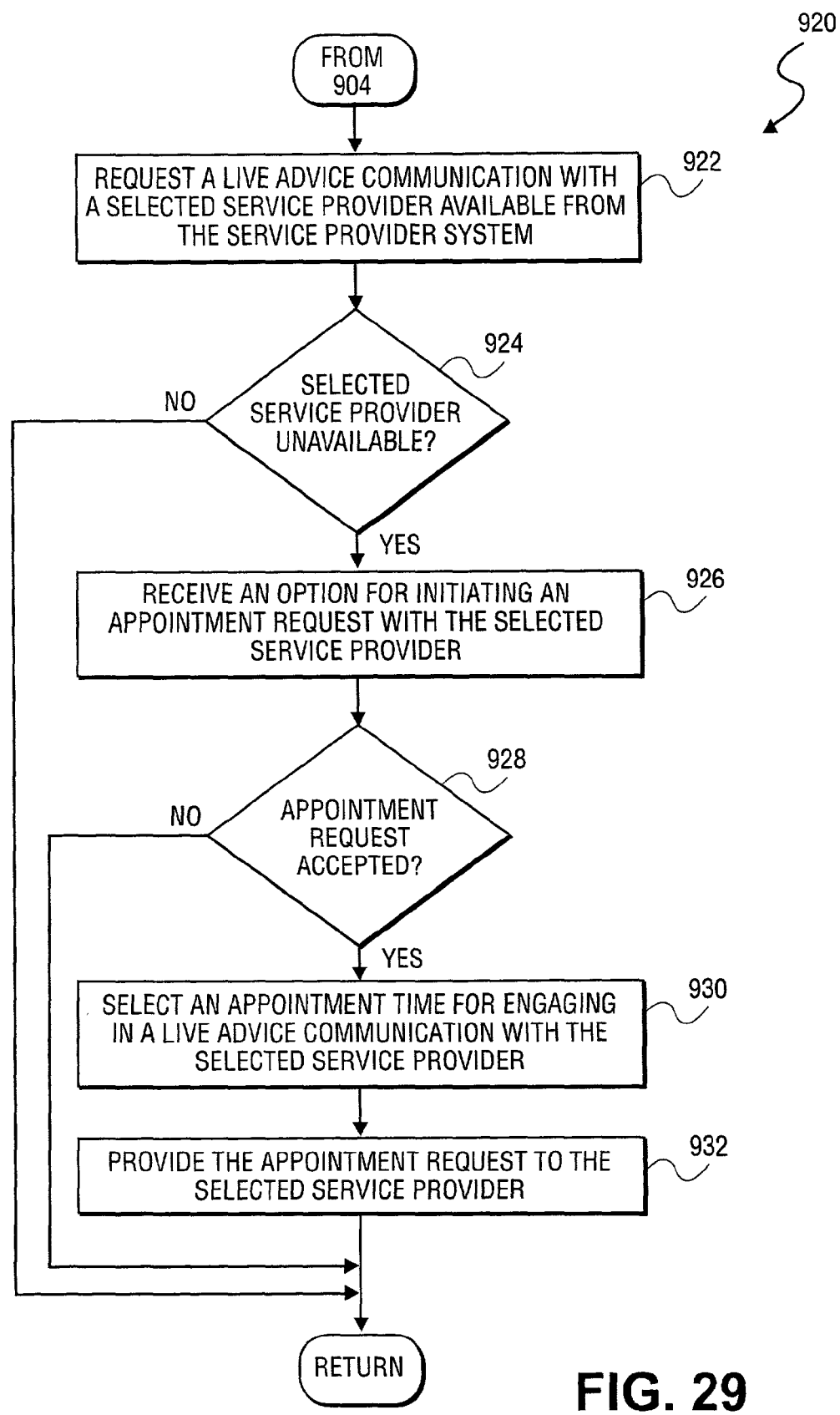
FIG. 29 depicts a flowchart illustrating an additional method for requesting an appointment with a selected service provider in accordance with a further embodiment of the present invention.

Referring now to FIG. 29, FIG. 29 depicts a flowchart illustrating an additional method 920 for requesting an appointment of process block 904, as depicted in FIG. 27. At process block 922, a service seeker requests a live advice communication with a selected service provider available from the service provider system 100. Next, at process block

924, it is determined whether the selected service provider is unavailable at the time of the live advice request. When a service provider is unavailable, at process block 926, the service seeker receives an option for initiating an appointment request with the selected service provider. Otherwise, the service provider can simply engage in the live advice request with the selected service seeker at the time of the live advice request.

Next, at process block 928, it is determined whether the service seeker has accepted the appointment request provided by the service provider system. Once accepted, at process block 930, the service seeker selects an appointment time for engaging in a live advice communication with the selected service provider, for example, as depicted in FIG. 7A through FIG. 8. Finally, at process block 932, the appointment request is provided to the selected service provider, for example, as depicted in FIG. 11B via the appointment confirmation screen 680. As described above, process blocks of the method 920 in one embodiment may be performed using the appointment acceptance procedures 346, as well as appointment request procedures 344.

Figure 30:
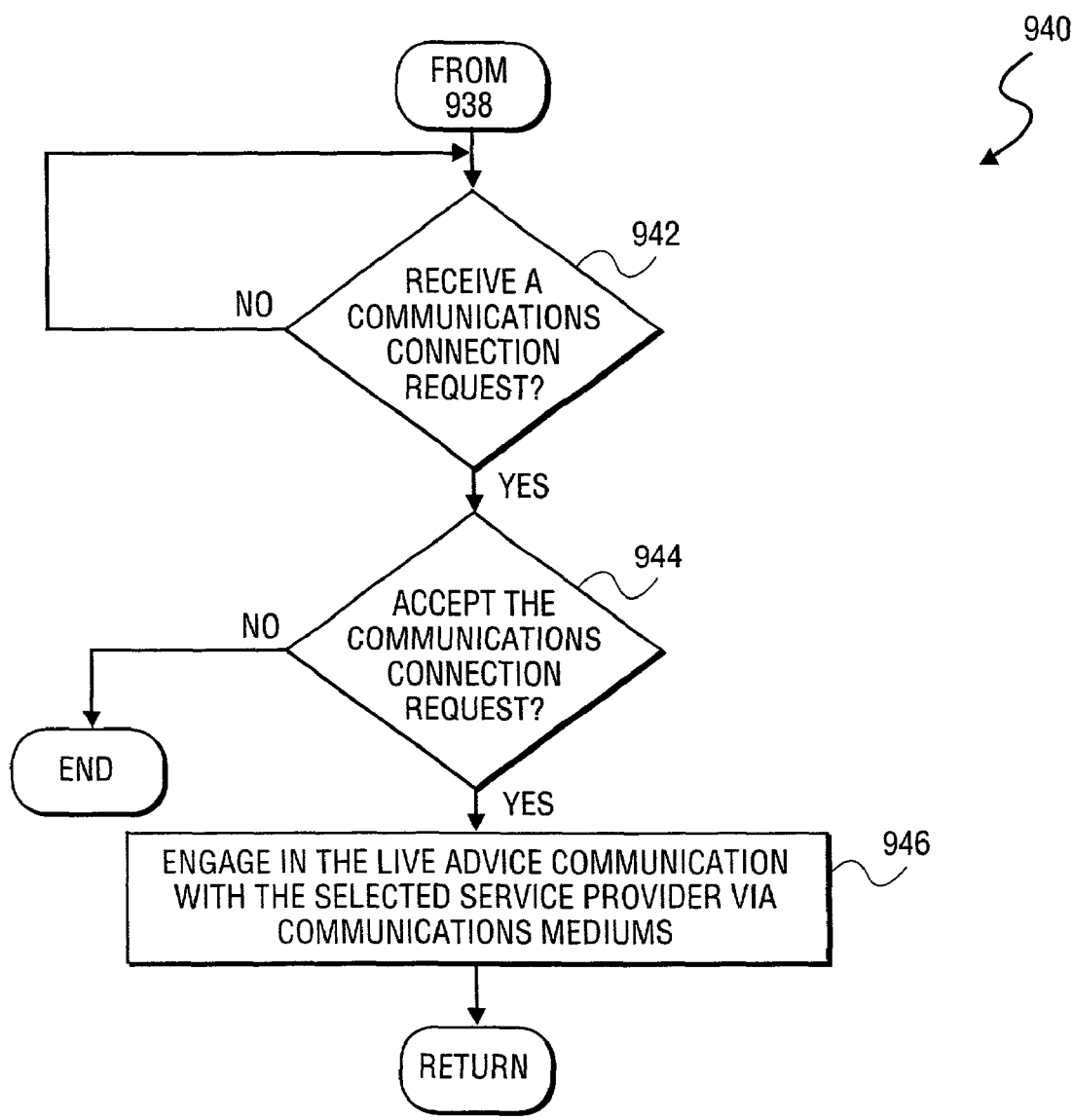
FIG. 30 depicts a flowchart illustrating an additional method for connecting a selected service provider with a service seeker in accordance with a further embodiment of the present invention.

Referring now to FIG. 30, FIG. 30 depicts a flowchart illustrating an additional method for connecting the selected service provider with the service seeker of process block 938, as depicted in FIG. 27. At process block 942, it is determined whether a service seeker has received a communications request from the service provider system 100. Once received, at process block 944, it is determined whether the service seeker accepts the communication request. When the communication request is not accepted, the method terminates. Otherwise, at process block 946, the service seeker engages in a live advice communication with the selected service provider via communications mediums, which are linked by the service provider system, utilizing communications interface procedures 322.

Figure 31:
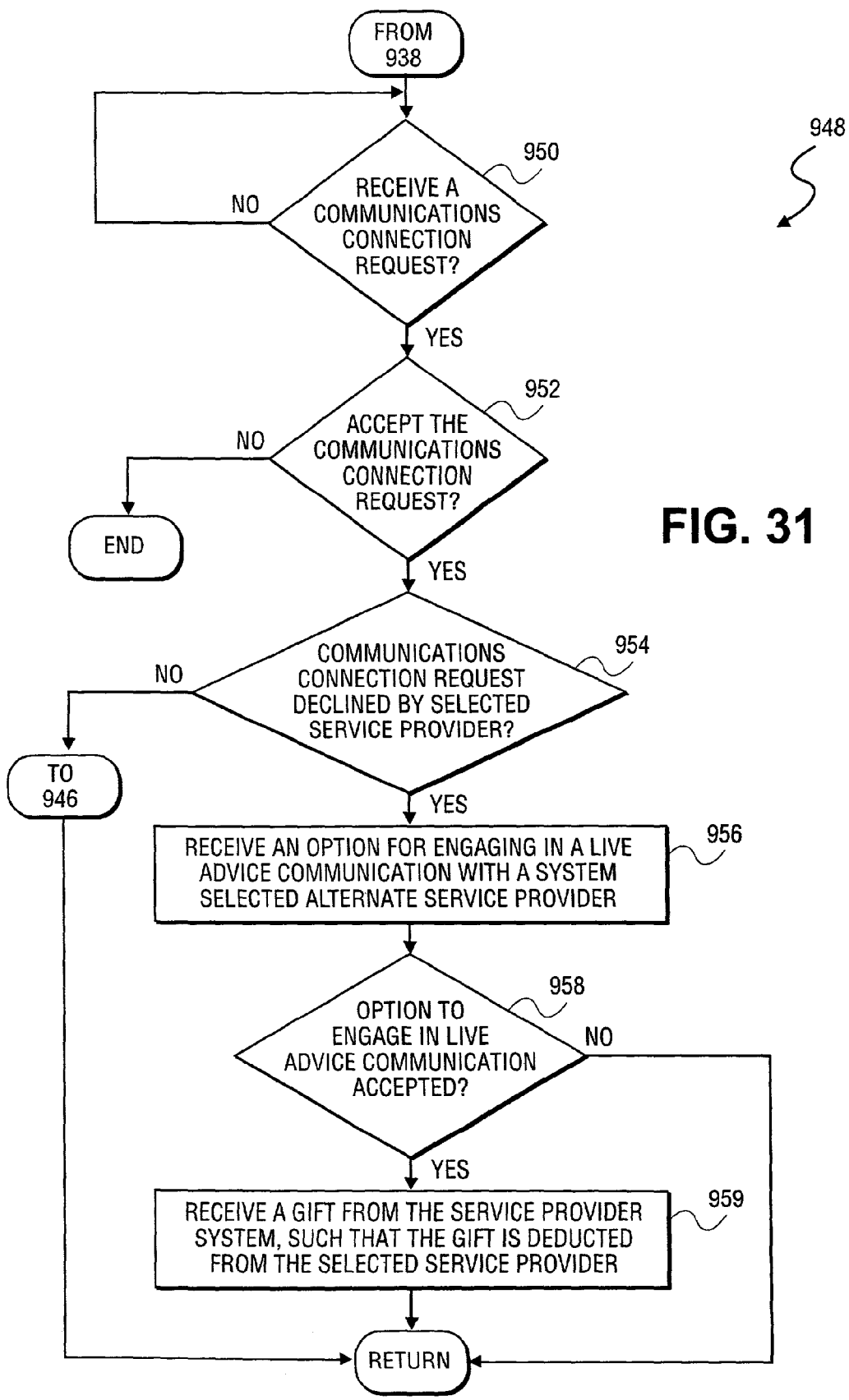
FIG. 31 depicts a flowchart illustrating an additional method for connecting a service seeker with a selected service provider in response to an appointment request and in accordance with a further embodiment of the present invention.

Referring now to FIG. 31, FIG. 31 depicts a flowchart illustrating an additional method 948 for connecting the selected service provider with the service seeker. At process block 950, it is determined whether the service seeker has received a communications request from the service provider system. Once received, at process block 952, it is determined whether the service seeker has accepted the communications request from the service provider system. Once requested, at process block 954, it is determined whether the selected service provider has declined the communications request from the service provider system. When the selected service provider denies or declines a communications request, at process block 958, the service seeker receives an option for engaging in a live advice communication with a systems selected alternate service provider.

Accordingly, at process block 958, it is determined whether the service seeker accepts the option to engage in a live advice communication with the alternate service provider. When the option is selected, at process block 958, the service seeker and the alternate service provider engage in a live advice communication. Finally, at process block 954, the service seeker receives a gift from the service provider system for engaging in the live advice communication with the alternate service provider. In one embodiment, the gift is deducted from the selected service provider initially desired by the service seeker.

Figure 32:
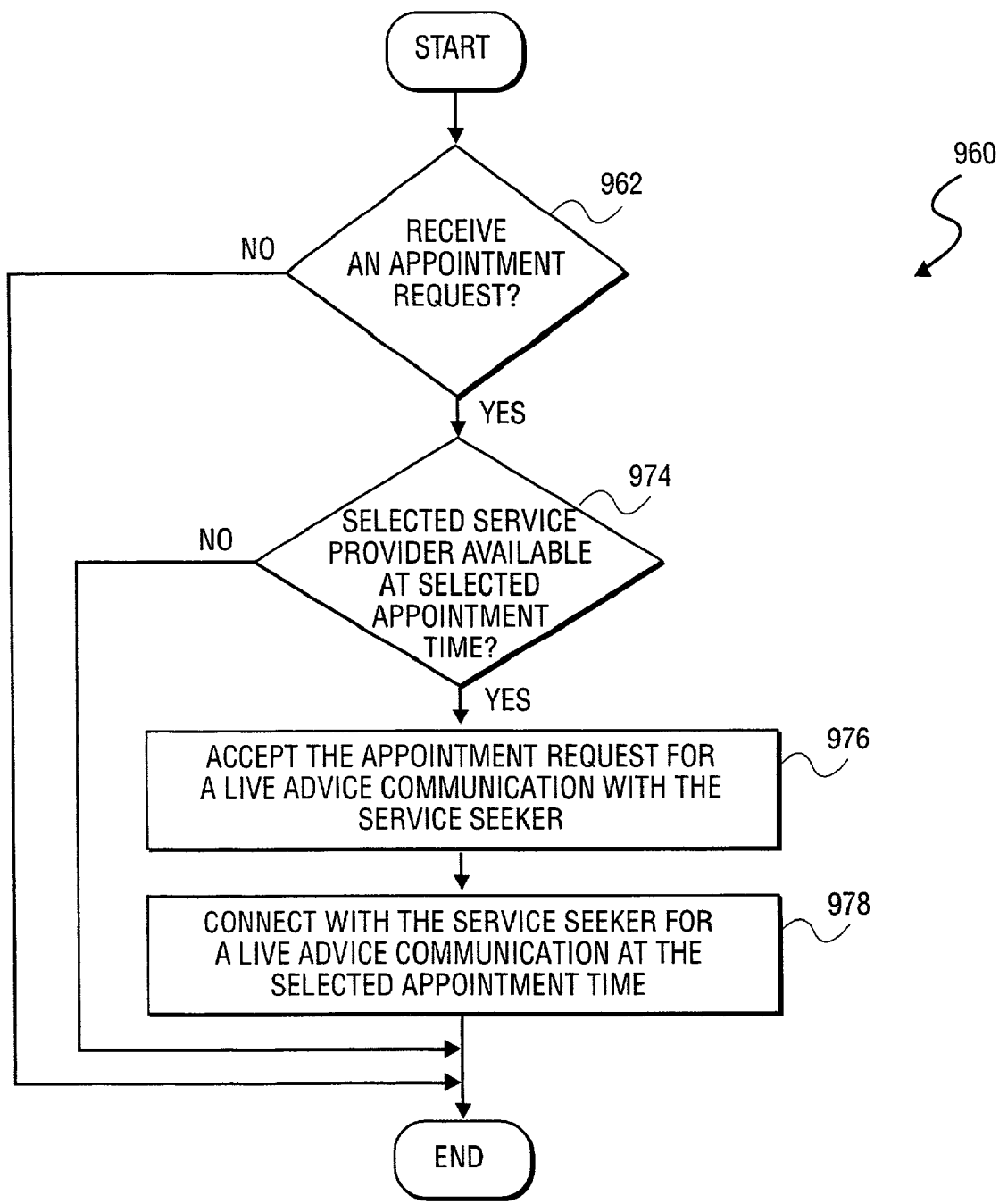
FIG. 32 depicts a flowchart illustrating a method for accessing a service provider system in order to review appointment requests and when an appointment request is accepted, engaging in a live advice communication with a requesting service seeker at a selected appointment time in accordance with one embodiment of the present invention.

Referring now to FIG. 32, FIG. 32 depicts a flowchart illustrating a method 960 for receiving an appointment request from a service provider system, and when the appointment request is accepted, engaging in a live advice communication with a requesting service seeker at a selected appointment time within a service provider system, for example, as depicted in FIGS. 1 through 2B. At process block 962, a selected service provider receives an appointment request for a live advice communication with a requesting service seeker. When a request is received, at process block 974, it is determined whether the selected service provider is available during an appointment time specified in the appointment request. When the service provider is available, at process block 976, the service provider accepts the appointment request for a live advice communication with the service seeker. Finally, at process block 978, the service seeker and the selected service provider are connected via the service provider system for a live advice communication.

Figure 33:
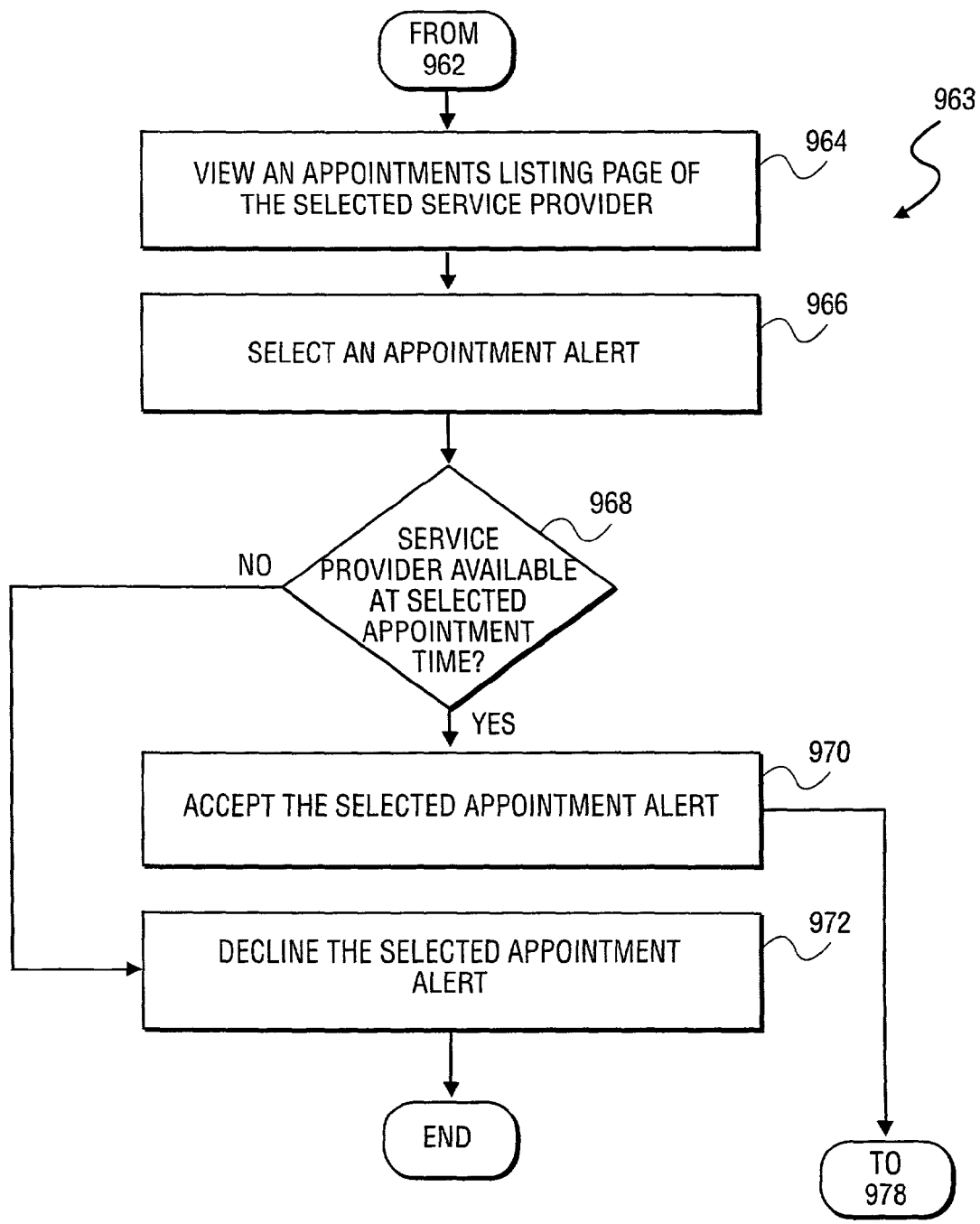
FIG. 33 depicts a flowchart illustrating an additional method for receiving an appointment request in accordance with a further embodiment of the present invention.

Referring now to FIG. 33, FIG. 33 depicts a flowchart illustrating an additional method 963 for receiving the appointment request at process block 962, as depicted in FIG. 32. At process block 964, a service provider views an appointment listing page of the respective service provider. In one embodiment, the appointment listing page, for example, as depicted in FIGS. 16A and 16B, includes a listing of each accepted appointment request and the selected service provider and a listing of one or more appointment alerts for pending appointment requests of the selected service provider.

Accordingly, at process block 966, the service provider selects an appointment alert from the one or more appointment alerts listed in the service provider appointment screen. Next, at process block 968, it is determined whether the service provider is available at the appointment times specified in the appointment alert. When the service provider is available, the service provider accepts the selected appointment alert and generates scheduling of an appointment request by the service provider system 100 at the specified appointment time utilizing, for example, the appointment scheduling procedures 936. Otherwise, at process block 962, the service provider declines the selected appointment request.

Figure 34:
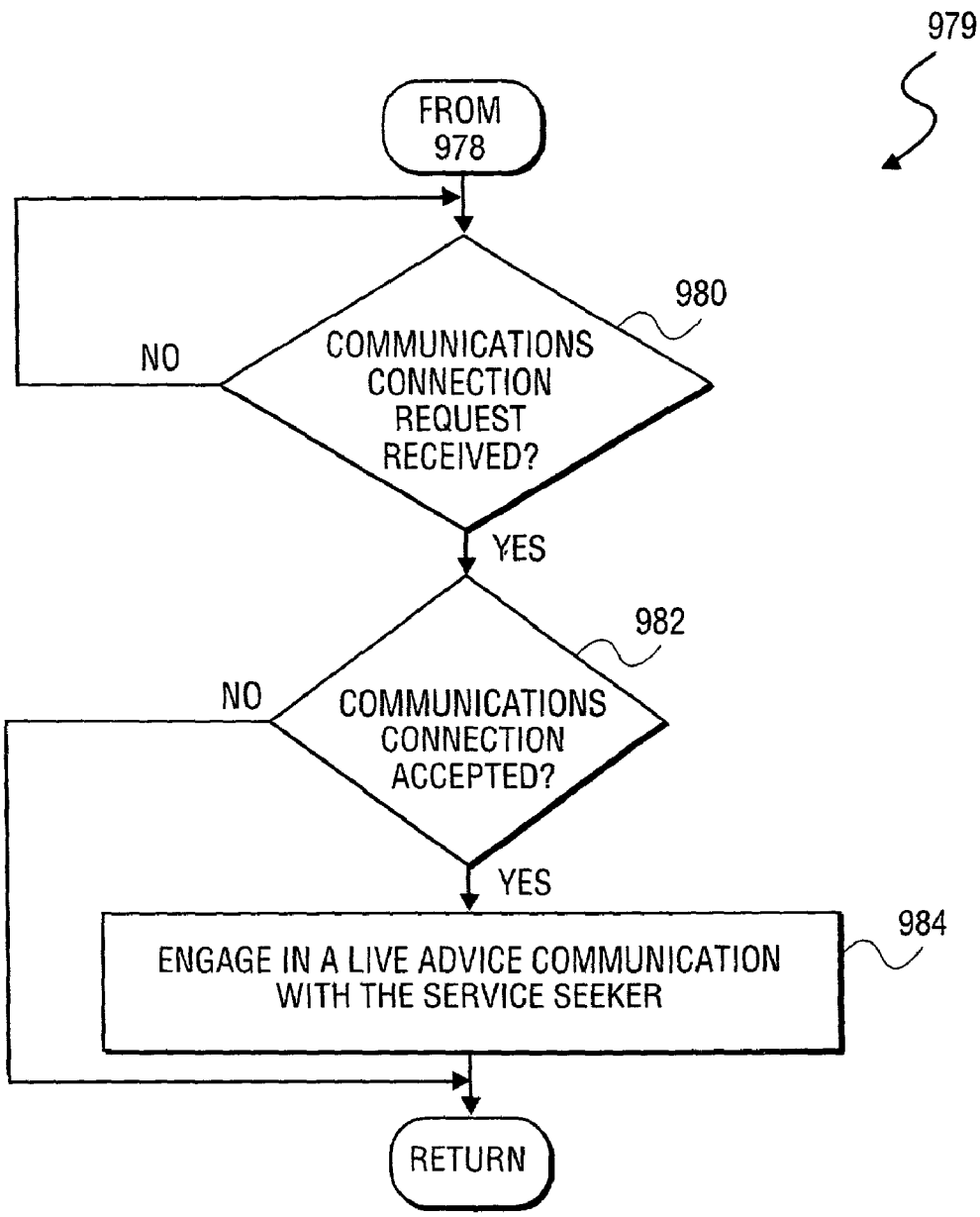
FIG. 34 depicts a flowchart illustrating an additional method for connecting with a requesting service seeker in accordance with a further embodiment of the present invention.

Referring now to FIG. 34, FIG. 34 depicts a flowchart illustrating an additional method for connecting the service provider with the requesting service seeker of process block 978, as depicted in FIG. 32. At process block 980, it is determined whether a communications request is received by the service provider from the service provider system 100 at the specified appointment time. The communications connection is generally received via communications mediums, such as for example, a telephone. Once received, at process block 982, it is determined whether the service provider accepts the communications connection request from the service provider system. When a communications request is not accepted, the method terminates. Otherwise, at process block 984, the selected service provider engages in a live advice communication with the service seeker via the communications mediums, which are linked via, for example, the communications interface 308 of the service provider system, as depicted in FIGS. 1 and 2A.

Figure 35:
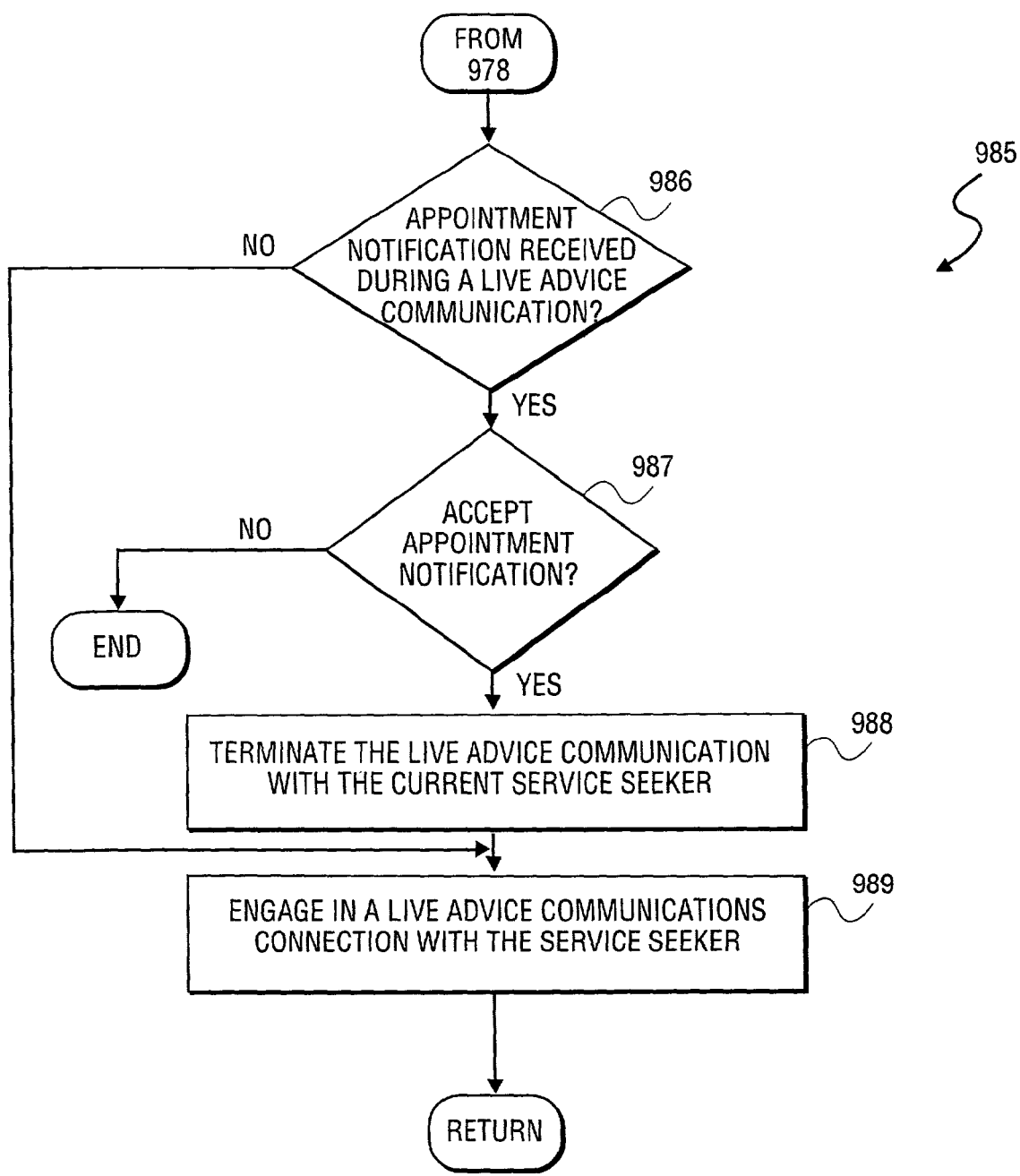
FIG. 35 depicts a flowchart illustrating an additional method for connecting with a requesting service seeker in accordance with a further embodiment of the present invention.

Referring now to FIG. 35, FIG. 35 depicts a flowchart illustrating an additional method 985 for connecting the requesting service seeker with the selected service provider of process block 978, as depicted in FIG. 32. At process block 986, it is determined whether a selected service provider receives an appointment notification during a live advice communication with a current service seeker. When such is the case, at process block 987, it is determined whether the service provider accepts the appointment alert notification.

In one embodiment, the system 100 will generate an audio signal to notify the speaker of the upcoming appointment. However, if the seeker declines a communications connection from the system 100, the system will terminate the appointment notification alert, and allow the speaker to continue with their current advice communication. Otherwise, a subsequent appointment notification alert is provided to the speaker. When appointment alert notification is accepted, at process block 988, the service provider will terminate the live advice communication with the current service seeker. Once terminated, at process block 989, the service provider engages in a live advice communication with the service seeker via the communications medium.

Figure 36:
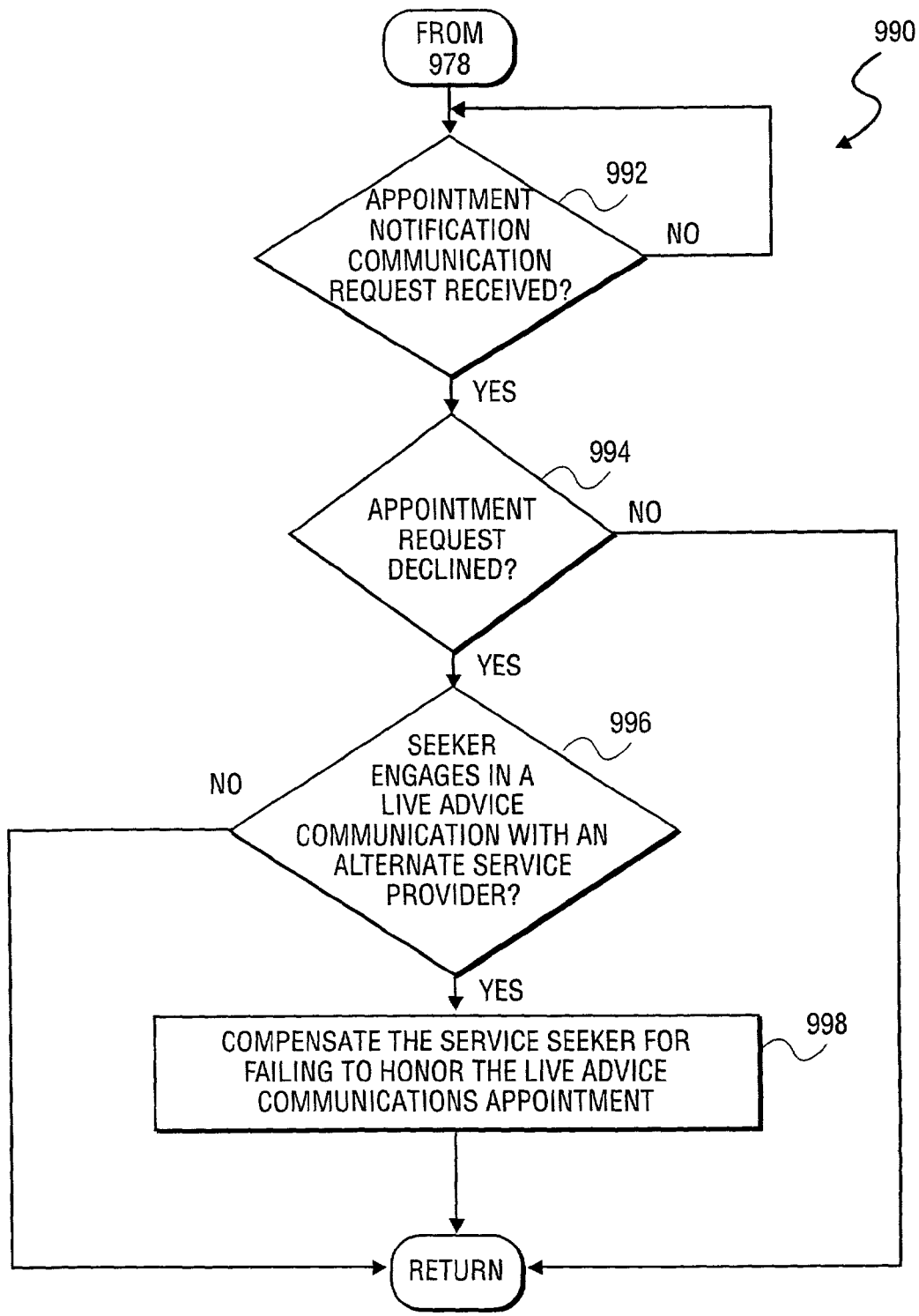
FIG. 36 depicts a flowchart illustrating an additional method for connecting with a requesting service seeker in accordance with an exemplary embodiment of the present invention.

Finally, referring to FIG. 36, FIG. 36 depicts a flowchart illustrating an additional method 990 for connecting the requesting service seeker with the selected service provider of process block 978, as depicted in FIG. 32. At process block 992, it is determined whether an appointment notification communication request is received from the service provider system 100 during a live advice communication with a current service seeker. When such is the case, at process block 994, it is determined whether the service provider declines the appointment request from the service provider system. When a request is declined, at process block 996, it is determined whether the service seeker engages in a live advice communication with a system selected alternate service provider. When such is the case, at process block 998, the service seeker is compensated. In one embodiment, a predetermined amount is deducted from the selected service provider and compensating to the requesting service seeker for agreeing to engage in a live advice communication with the alternate, system selected service provider.

Accordingly, as described herein, the methods enable both service seekers and service providers to engage in live advice communications at a mutually agreed upon appointment time. This provides both service seekers and service providers with the flexibility to engage in live advice communications at mutually beneficial times. This appointment request option can overcome problems with extremely popular service providers which are in high demand from users of the service provider system. In addition, it enables service providers to engage interests in the various fields of service offered from the service provider system. Moreover, the methods ensure that service seekers will be able to communicate with selected service providers during situations where the service provider is unavailable at a time when a service seeker accesses the service provider system. Finally, the method provides a mechanism for penalizing service providers that fail to honor accepted appointments.

Alternate Embodiments

Several aspects of one implementation of the service provider system for providing appointment scheduling of live advice communications have been described. However, various implementations of the service provider system provide numerous features including, complementing, supplementing, and/or replacing the features described above. Features can be implemented as part of the online service provider system or as part of a client server system, Intranet, Extranet or a virtual private network in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a service provider system, it will be appreciated by those skilled in the art that the teaching of the present invention can be applied to other systems. In fact, systems for providing a requesting users with live information communications via telephone are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. Advantages of the invention include a service provider system, which enables customers to select an appointment time for engaging in a live advice communication with the selected service provider. This provides customers with the flexibility to schedule times that are mutually beneficial to both the service seeker and the selected service provider. As a result, in situations where a service provider is extremely popular, a service seeker can ensure that they will engage in a live advice communication with the service provider by scheduling an appointment in order to provide the service provider with incentive for engaging in the appointment. Finally, the method provides a mechanism for penalizing service providers that fail to honor accepted appointments.

Having disclosed exemplary embodiments and the best mode, modifications and variations may be made to the disclosed embodiments while remaining within the scope of the invention as defined by the following claims.

What is claimed is:

1. A method implemented on a data processing system, the method comprising:

storing, in a database coupled to the data processing system, information about a set of service providers, the information including a service offer from each of the service providers to provide a separate service to customers over a communication connection provided by the data processing system and a price specified by a respective service provider for the service;

providing, by the data processing system, a list of service providers, based on the information stored in the database, to a service seeker via an internet connection, the list indicating individually service offers from the list of service providers and whether each service provider in the list of service providers is currently available to provide live advice to the service seeker at a time when the service seeker is viewing the list;

receiving, by the data processing system from a service seeker, an appointment request for a live advice communication with a selected service provider during a service seeker specified appointment time, after the service seeker selects the selected service provider from the list;

communicating, by the data processing system, with the selected service provider to determine whether the selected service provider is available during the service seeker specified appointment time;

scheduling, by the data processing system, a live advice communication appointment between the service seeker and the selected service provider, after the selected service provider accepts the appointment request;

at the service seeker specified appointment time, initiating by the data processing system a first real time communication connection with the selected service provider;

establishing, by the data processing system, a second real time communication connection with the service seeker;

after establishing the first real time communication connection with the selected service provider, connecting the first and second real time communication connections by the data processing system to allow the selected service provider to provide live advice to the service seeker at the scheduled appointment, monitoring, by the data processing system, time spent on the live advice, and billing, by the data processing system, the service seeker on behalf of the selected service provider based on the time spent on the live advice; and if at the service seeker specified appointment time the selected service provider is unavailable for the first real time communication connection, identifying, by the data processing system, a relevant field of service of the selected service provider based on the information stored in the database, determining, by the data processing system, a highest ranking service provider in the relevant field of service as an alternative to the selected service provider when the selected service provider is unavailable, connecting, by the data processing system, the service seeker to the highest ranking service provider in the relevant field of service, wherein the highest ranking service provider is identified, by the data processing system, based on a quantitative rating system, and once the real time communication between the service seeker and the highest ranking service provider is complete, providing the service seeker with a gift from the initially selected service provider.

2. The method of claim 1, wherein scheduling the appointment request further comprises:

requesting a deposit from the service seeker;

once the deposit is received from the service seeker, verifying a telephone number of the service seeker; and once the service seeker telephone number is verified, sending an appointment request confirmation to the service seeker.

3. The method of claim 1, wherein scheduling the live advice communication appointment further comprises:

determining whether an appointment acceptance is received from the selected service provider;

once the appointment acceptance is received from the selected service provider, sending an appointment confirmation to the service seeker; and sending an appointment confirmation to the selected service provider.

4. The method of claim 1, further comprising:

when the selected service provider is engaged in a separate live advice communication during the service provider system communication connection, notifying the selected service provider of the scheduled advice communication appointment;

receiving a response from the selected service provider to accept/reject the appointment notification;

when the selected service provider accepts the appointment notification, terminating the live advice communication with a current service seeker; and once the advice communication is terminated, separately establishing a real time communication connection between the selected service provider and the service seeker for a live advice communication.

5. The method of claim 1, wherein scheduling the appointment request further comprises:

generating a service seeker appointment alert within an appointment screen of the selected service provider, wherein the appointment screen includes a list of each service provider accepted appointment and a list of alerts for each pending appointment request received by the selected service provider.

6. A nontransitory computer readable storage medium embodying instructions, the instructions causing a data processing system to perform a method, the method comprising:

storing, in a database coupled to the data processing system, information about a set of service providers, the information including a service offer from each of the service providers to provide a separate service to customers over a communication connection provided by the data processing system and a price specified by a respective service provider for the service;

providing, by the data processing system, a list of service providers, based on the information stored in the database, to a service seeker via an internet connection, the list indicating individually service offers from the list of service providers and whether each service provider in the list of service providers is currently available to provide live advice to the service seeker at a time when the service seeker is viewing the list;

receiving, by the data processing system from a service seeker, an appointment request for a live advice communication with a selected service provider during a service seeker specified appointment time, after the service seeker selects the selected service provider from the list;

communicating, by the data processing system, with the selected service provider to determine whether the selected service provider is available during the service seeker specified appointment time;

scheduling, by the data processing system, a live advice communication appointment between the service seeker and the selected service provider, after the selected service provider accepts the appointment request;

at the service seeker specified appointment time, initiating by the data processing system a first real time communication connection with the selected service provider;

establishing, by the data processing system, a second real time communication connection with the service seeker;

after establishing the first real time communication connection with the selected service provider, connecting the first and second real time communication connections by the data processing system to allow the selected service provider to provide live advice to the service seeker at the scheduled appointment, monitoring, by the data processing system, time spent on the live advice, and billing, by the data processing system, the service seeker on behalf of the selected service provider based on the time spent on the live advice; and if at the service seeker specified appointment time the selected service provider is unavailable for the first real time communication connection, identifying, by the data processing system, a relevant field of service of the selected service provider based on the information stored in the database, determining, by the data processing system, a highest ranking service provider in the relevant field of service as an alternative to the selected service provider when the selected service provider is unavailable, connecting, by the data processing system, the service seeker to the highest ranking service provider in the relevant field of service, wherein the highest ranking service provider is identified, by the data processing system, based on a quantitative rating system, and once the real time communication between the service seeker and the highest ranking service provider is complete, providing the service seeker with a gift from the initially selected service provider.

7. The computer readable storage medium of claim 6, wherein scheduling the appointment request further comprises:

requesting a deposit from the service seeker;

once the deposit is received from the service seeker, verifying a telephone number of the service seeker; and once the service seeker telephone number is verified, sending an appointment request confirmation to the service seeker.

8. The computer readable storage medium of claim 6, wherein scheduling the live advice communication appointment further comprises:

determining whether an appointment acceptance is received from the selected service provider;

once the appointment acceptance is received from the selected service provider, sending an appointment confirmation to the service seeker; and sending an appointment confirmation to the selected service provider.

9. The computer readable storage medium of claim 6, further comprising:

when the selected service provider is engaged in a separate live advice communication during the service provider system communication connection, notifying the selected service provider of the scheduled advice communication appointment;

receiving a response from the selected service provider to accept/reject the appointment notification;

when the selected service provider accepts the appointment notification, terminating the live advice communication with a current service seeker; and once the advice communication is terminated, separately establishing a real time communication connection between the selected service provider and the service seeker for a live advice communication.

10. The computer readable storage medium of claim 6, wherein scheduling the appointment request further comprises:

generating a service seeker appointment alert within an appointment screen of the selected service provider, wherein the appointment screen includes a list of each service provider accepted appointment and a list of alerts for each pending appointment request received by the selected service provider.

11. A system comprising:

a memory to store a database of information about a set of service providers, the information including a service offer from each of the service providers to provide a separate service to customers over a communication connection provided by the data processing system and a price specified by a respective service provider for the service; and a processor coupled to the memory to:

provide a list of service providers, based on the information stored in the database, to a service seeker via an internet connection, the list indicating individually service offers from the list of service providers and whether each service provider in the list of service providers is currently available to provide live advice to the service seeker at a time when the service seeker is viewing the list;

receive, from a service seeker, an appointment request for a live advice communication with a selected service provider during a service seeker specified appointment time, after the service seeker selects the selected service provider from the list;

communicate with the selected service provider to determine whether the selected service provider is available during the service seeker specified appointment time;

schedule a live advice communication appointment between the service seeker and the selected service provider, after the selected service provider accepts the appointment request;

at the service seeker specified appointment time, initiate a first real time communication connection with the selected service provider;

establish a second real time communication connection with the service seeker;

after establishing the first real time communication connection with the selected service provider, connect the first and second real time communication connections to allow the selected service provider to provide live advice to the service seeker at the scheduled appointment, monitor time spent on the live advice, and bill the service seeker on behalf of the selected service provider based on the time spent on the live advice; and if at the service seeker specified appointment time the selected service provider is unavailable for the first real time communication connection, identify a relevant field of service of the selected service provider based on the information stored in the database, determine a highest ranking service provider in the relevant field of service as an alternative to the selected service provider when the selected service provider is unavailable, connect the service seeker to the highest ranking service provider in the relevant field of service, wherein the highest ranking service provider is identified, by the data processing system, based on a quantitative rating system, and once the real time communication between the service seeker and the alternate service provider is complete, the processor is to provide the service seeker with a gift from the initially selected service provider.

12. The system of claim 11, wherein the processor is to further:

request a deposit from the service seeker;

once the deposit is received from the service seeker, verify a telephone number of the service seeker; and once the service seeker telephone number is verified, send an appointment request confirmation to the service seeker.

13. The system of claim 11, wherein the processor is to further:

determine whether an appointment acceptance is received from the selected service provider;

once the appointment acceptance is received from the selected service provider, send an appointment confirmation to the service seeker; and send an appointment confirmation to the selected service provider.

* * * * *